(12) United States Patent
Ballard et al.

(10) Patent No.: US 7,216,298 B1
(45) Date of Patent: May 8, 2007

(54) SYSTEM AND METHOD FOR AUTOMATIC GENERATION OF HTML BASED INTERFACES INCLUDING ALTERNATIVE LAYOUT MODES

(75) Inventors: Alan Ballard, Vancouver (CA); Laura Steward Akel, San Francisco, CA (US); John Schroeder, Pleasanton, CA (US); Peggy Shafer, Pleasanton, CA (US); Matthew Haavisto, Oakland, CA (US)

(73) Assignee: Oracle International Corporation, Redwood Shores, CA (US)

(*) Notice: Subject to any disclaimer, the term of this patent is extended or adjusted under 35 U.S.C. 154(b) by 758 days.

(21) Appl. No.: 10/165,623

(22) Filed: Jun. 7, 2002

Related U.S. Application Data

(63) Continuation-in-part of application No. 10/040,397, filed on Dec. 28, 2001.

(60) Provisional application No. 60/316,773, filed on Aug. 31, 2001, provisional application No. 60/296,813, filed on Jun. 7, 2001.

(51) Int. Cl.
*G06F 3/00* (2006.01)
*G06F 3/14* (2006.01)

(52) U.S. Cl. ............... 715/760; 715/733; 715/738; 715/744; 715/762; 715/513; 715/517

(58) Field of Classification Search ............ 715/733, 715/738, 744, 760, 762, 764, 765, 777, 810, 715/501.1, 513, 517, 908; 707/1, 104.1
See application file for complete search history.

(56) References Cited

U.S. PATENT DOCUMENTS

| | | | |
|---|---|---|---|
| 5,371,847 A | 12/1994 | Hargrove | |
| 5,385,088 A | 1/1995 | Grabscheid | |
| 5,525,978 A | 6/1996 | York et al. | |
| 5,625,763 A | 4/1997 | Clime | |
| 5,625,783 A | 4/1997 | Ezekial et al. | |
| 5,721,850 A | 2/1998 | Farry et al. | |
| 5,832,481 A | 11/1998 | Sheffield | |
| 5,845,303 A * | 12/1998 | Templeman | 715/517 |
| 5,916,310 A | 6/1999 | McCain | |
| 5,973,688 A | 10/1999 | May | |

(Continued)

OTHER PUBLICATIONS

ResQNet.com, "ResQNet.com Announces the Release of ResQ!Net Version 3.2", Jan. 26, 2001, www.resqnet.com/News/GeneralBar/V32.htm, p. 1-3.*

(Continued)

*Primary Examiner*—Lucila X. Bautista
(74) *Attorney, Agent, or Firm*—Townsend and Townsend and Crew LLP

(57) ABSTRACT

The present invention includes systems and methods for customization of internet applications and HTML based interfaces. Multiple levels of customization are applied to both static and functional aspects of user interface elements including, for example, user interface element order, alternative layout modes, tab-order, tab-over, immediate access keys, and hotkeys. The alternative layout modes included layout modes configured for presentation of an HTML based interface as streaming text and as an audio output. Customization is also achieved with respect to searching over multiple user interfaces, presentation of information on a user interface, the interaction model used by the internet application and user interface element order. Customization is enabled on any client supporting standard browser functionality.

56 Claims, 33 Drawing Sheets

U.S. PATENT DOCUMENTS

| | | | |
|---|---|---|---|
| 6,005,568 A | | 12/1999 | Simonoff et al. |
| 6,014,638 A | | 1/2000 | Burge et al. |
| 6,026,433 A | * | 2/2000 | D'Arlach et al. ........... 709/217 |
| 6,067,552 A | | 5/2000 | Yu |
| 6,122,661 A | * | 9/2000 | Stedman et al. ............ 709/217 |
| 6,134,549 A | * | 10/2000 | Regnier et al. ................ 709/9 |
| 6,167,409 A | * | 12/2000 | DeRose et al. ............. 715/513 |
| 6,181,344 B1 | | 1/2001 | Tarpenning |
| 6,249,284 B1 | | 6/2001 | Bogdan |
| 6,266,675 B1 | * | 7/2001 | Evans et al. ............. 707/104.1 |
| 6,317,143 B1 | | 11/2001 | Wugofski |
| 6,327,628 B1 | | 12/2001 | Anuff et al. |
| 6,362,838 B1 | * | 3/2002 | Szlam et al. ................ 715/762 |
| 6,477,580 B1 | | 11/2002 | Bowman-Amuah |
| 6,483,523 B1 | * | 11/2002 | Feng .......................... 715/745 |
| 6,549,199 B1 | * | 4/2003 | Carter et al. ................ 345/418 |
| 6,601,233 B1 | | 7/2003 | Underwood |
| 6,621,505 B1 | | 9/2003 | Beauchamp et al. |
| 6,631,496 B1 | | 10/2003 | Li et al. |
| 6,643,652 B2 | | 11/2003 | Helgeson et al. |
| 6,934,697 B1 | | 8/2005 | Warren |
| 7,003,560 B1 | | 2/2006 | Mullen et al. |
| 2001/0052910 A1 | * | 12/2001 | Parekh et al. ............... 345/744 |
| 2002/0057298 A1 | | 5/2002 | Wassom |
| 2002/0097264 A1 | * | 7/2002 | Dutta et al. ................. 345/745 |
| 2002/0199190 A1 | * | 12/2002 | Su .............................. 725/37 |
| 2004/0034833 A1 | | 2/2004 | Kougiouris |
| 2005/0114229 A1 | | 5/2005 | Ackley et al. |
| 2005/0160377 A1 | * | 7/2005 | Sciammarella et al. |
| 2005/0223320 A1 | * | 10/2005 | Brintzenhofe et al. |

OTHER PUBLICATIONS

IBM, "Accelerator Definitions", Jan. 1992, IBM Technical Disclosure Bulletin, vol. 34, No. 8, p. 118-120.*

Elizabeth Castro, "HTML for the World Wide Web, Fourth Edition: Visual QuickStart Guide", Oct. 20, 1999, Peachpit Press, Introduction, Chapter 7, Chapter 16. ☐☐☐☐.*

Oracle, "Keyboard Shortcuts", Jun. 23, 2000, http://www.oracle.com/technology/tech/blaf/specs/keyboard.html, p. 1-11.*

U.S. Appl. No. 10/035,413, Ballard et al.

U.S. Appl. No. 10/040,396, Sherwood et al.

U.S. Appl. No. 10/040,397, Ballard et al.

U.S. Appl. No. 10/041,015, Ballard et al.

U.S. Appl. No. 10/041,034, Gassner et al.

Forms in HTML documents, Nov. 15, 2000, http://www.w3.org/TR/WD-html40-970708/interact/forms.html, pp. 1-18.

Oracle, Keyboard Shortcuts, pp. 1-11, Jun. 23, 2000. http://www.oracle.com/technology/tech/blaf/specs/keyboard.html.

Cuenca, Pedro; "Experiences in the use of metadata for web publishing"; 1999, 1 page.

"Using PeopleSoft 7.5 Applications", PeopleSoft 7.5 May 1998, Published by PeopleSoft, Inc. Pleasanton, CA, pp. 1-66.

"Advanced Basics: Visual Studio.Net: Setting Tab Order, Loading the Toolbox with an . . . ," http://msdn.microsoft.com/msdnmag/issues/02/03/Basics0203.asp, printed Jun. 14, 2002, pp. 1-2.

"Macromedia - How is the tab order for form fields in the Flash player determind?," http://www.macromedia.com/support/flash/ts/documents/tab_order.htm, printed Jun. 14, 2002. pp. 1-2.

"Introduction: WAI Web Content Accessibility Curriculum - Slide list," http://www.w3.org/WAI/wcag-curric/overint, printed Sep. 26, 2006, p. 1.

"Guidelines: WAI Web Content Accessibility Curiculum - slide 'Introduction to the Guideline Set'," http://www.w3.org/WAI/wcag-curric/gid1-0.htm, printed Sep. 26, 2006, p. 1.

Checkpoints: WAI Web Content Accessibility Curriculum - slide 'Introduction to the Checkpoint Set',http://www.w3.org/WAI/wcag-curric/chk1-0.htm, printed Sep. 26, 2006.

"Examples: WAI Web Content Accessibility Curriculum - slide 'Introduction to the Example Set'," http://www.w3.org/WAI/wcag-curric/sarn1-0.htm, printed Sep. 26, 2006, p. 1.

U.S. Appl. No. 10/040,397, now U.S. Appl. No. 7,111,243, First Inventor: Alan Ballard, "Customization of Tab-Order Functionality in Internet Applications," filed Dec. 28, 2001.

U.S. Appl. No. 10/040,396, First Inventor: Theresa Sherwood, "System and Method for Searching Data Partially Displayed on a User Interface," filed Dec. 28, 2001.

U.S. Appl. No. 10/041,015, First Inventor: Allan Ballard, Customization of User Interface Presentation in an Internet Application User Interface, filed Dec. 28, 2001.

U.S. Appl. No. 10/035,413, First Inventor: Alan Ballard, "Customization of immediate Access and HotKey Functionality in an Internet Application User Interface," filed Dec. 28, 2001.

U.S. Appl. No. 10/041,034, First Inventor: Peter Gassner, "Customization of Client-Server Interaction in an Internet Application," filed Dec. 28, 2001.

* cited by examiner

Address Detail

*Effective Date: 07/25/2001 — 1310, 1360, 1320

*Status:

*Address Type: Business

Description:

*Address ID:

Country: USA United States — 1350

Address 1: Peoplesoft Parkway

Permission List: ALLPANLS
Description: All Panels

| Menu Name | Edit Components |
|---|---|
| ADMINISTER_SECURITY | Edit Components |
| APPLICATION_ENGINE | Edit Components |
| APPMSGMONITOR | Edit Components |
| CALLCENTER | Edit Components |
| CIC_PAGELETS | Edit Components |
| CNV_SCHEMA_MAP | Edit Components |
| CRM_OPEN_WORKLIST | Edit Components |
| CRM_PORTAL_COMPONENTS | Edit Components |
| CRM_TRANSFORM_UTILITY | Edit Components |
| CTI_CONFIGURATION | Edit Components |
| CUBE_MANAGER | Edit Components |
| EDI_MANAGER | Edit Components |
| ESTABLISH_BUSINESS_UNITS | Edit Components |
| MAINTAIN_PRODUCT_CONFIGURATOR | Edit Components |
| MAINTAIN_SECURITY | Edit Components |
| MAINTAIN_SOLUTION | Edit Components |
| MANAGE_INTEGRATION_RULES | Edit Components |
| MASS_CHANGE | Edit Components |
| NVISION | Edit Components |
| PORTAL_ADMIN | Edit Components |
| PORTAL_COMPONENTS | Edit Components |
| PORTAL_PERS_HOMEPAGE | Edit Components |
| PROCESSMONITOR | Edit Components |
| PROCESS_SCHEDULER | Edit Components |
| QUERY_MANAGER | Edit Components |
| RA_CAMPAIGN_MANAGEMENT | Edit Components |
| RA_CM_STRUCTURE | Edit Components |
| RB_DEFINE_PRODUCTS | Edit Components |
| RB_GENERAL_OPTIONS | Edit Components |
| RB_INTEGRATION_OPTIONS | Edit Components |
| RB_MANAGE_COMPETENCIES | Edit Components |
| RB_MANAGE_CUSTOMER_INFORMATION | Edit Components |
| RB_MANAGE_WORKFORCE | Edit Components |
| RB_PROCESS_INBOUND_TRANS | Edit Components |
| RB_STRUCTURE_SEARCHING | Edit Components |
| RB_WORKER_CALENDAR | Edit Components |
| RC_SELF_SERVICE | Edit Components |
| RC_SOLN_MGMT | Edit Components |
| REPORT_BOOKS | Edit Components |
| REPORT_MANAGER | Edit Components |
| RF_AGREEMENTS | Edit Components |
| RF_DEFINE_ITEMS | Edit Components |
| RF_DEFINE_ITEM_CONTROLS | Edit Components |
| RF_MAINT_ENTITLEMENTS | Edit Components |
| RF_MANAGE_RMA | Edit Components |
| RF_SERVICE_ORDER | Edit Components |
| RF_STRUCTURE | Edit Components |
| RI_CIC_HOME | Edit Components |
| RI_INTERACTION | Edit Components |
| RI_SETUP | Edit Components |
| RM_DELTA_UTILITY | Edit Components |
| RSF_FORECAST | Edit Components |
| RSF_LEADS | Edit Components |
| RSF_OPPORTUNITY | Edit Components |
| RSF_PRTL | Edit Components |
| RSF_SETUP_TABLES | Edit Components |
| RSF_TERRITORY | Edit Components |
| STRUCTURE_PROCESS_AUTOMATION | Edit Components |
| STRUCTURE_RC | Edit Components |
| TRANSLATE | Edit Components |
| EDI_MANAGER | Edit Components |
| TREE_MANAGER | Edit Components |
| UTILITIES | Edit Components |
| WORKFLOW_ADMINISTRATOR | Edit Components |
| WORKLIST | Edit Components |

FIG. 17B

[Screenshot of Person Component - Microsoft Internet Explorer window showing Address Info and Phone Info form]

- 255 (window)
- Address Info section with fields:
  - *Address Seq: 1
  - Address Detail:
    - *Effective Date: 07/25/2001 — 1770
    - *Address Type: Business
    - *Status: Active
    - *Address ID: 1208
    - Description:
    - Country: USA United States
    - Address 1: Peoplesoft Parkway — 1780
    - Address 2:
    - Address 3:
    - City: Pleasanton
    - County:
    - State: CA California
    - Postal: 94505
    - Time Zone: PST Pacific Time, Tijuana
    - Last Modified: 07/25/2001 2:36PM PDT VP1
  - ☐ Submit — 1790
- ☐ Expert Entry — 1760
- Phone Info section:
  - *Phone Type Description Primary Int'l Prefix Telephone Phone Extension
  - Business Desk ☑ 001 925 694 9479

FIG. 20B

PeopleTools Options

Language Settings
Language Code: English ☐ translations Change Last Upstat
*Sort Order Options: Binary Sorting General Options
Background Disconnect Interval  30  — 2015
☐ Multi Company Organization — 2040
☑ Multi-Currency — 2050
☐ Use Business Unit in nVision
☑ Multiple Jobs Allowed
☑ Allow DB Optimizer Trace
☑ Grant Access
☑ Platform Compatibility Mode
☑ Case Insensitive Searching Style Sheet Name: PSSTYLEDEF_U2    Upgrade Project Commit Limit: 50
Temp Table Instances(Total): — 2020
Temp Table Instances(Online):
*Maximum App Message Size: 10,000,000
Base Time Zone: PST
Last Help Context # Used: 130222
*Data Field Length Checking: Others
*Maximum Attachment Chuck Size: 20000    ☐ Allow NT batch when CCSID<>37

2075
2080
2025
2035
2045
2070
2030

⌂ Home   📋 Worklist   Search [      ]   ⊕ Add to Favorites   → Sign Out

SYSTEM AND METHOD FOR AUTOMATIC GENERATION OF HTML BASED INTERFACES INCLUDING ALTERNATIVE LAYOUT MODES

CROSS-REFERENCE TO RELATED APPLICATIONS

This application claims benefit of commonly owned U.S. Provisional Patent Application No. 60/296,813 entitled "System for the Automatic Generation of Web Pages Accessible to the Disabled," filed Jun. 7, 2001, U.S. Provisional Patent Application No. 60/316,773 entitled "Meta Language Control of Complex Network Applications," filed Aug. 31, 2001, and U.S. patent application Ser. No. 10/040,397, entitled "Customization of Tab-order Functionality in Internet Applications," filed Dec. 28, 2001. The disclosures of these patent applications are incorporated herein by reference.

This application is related to co-pending U.S. patent application Ser. No. 10/041,034, entitled "Customization of Client-Server Interaction in an Internet Application," co-pending U.S. patent application Ser. No. 10/035,413, entitled "Customization of Immediate Access and HotKey Functionality in an Internet Application User Interface," co-pending U.S. patent application Ser. No. 10/041,015, entitled "Customization of User Interface Presentation in an Internet Application User Interface," co-pending U.S. patent application Ser. No. 10/040,397, entitled "Customization of Tab-order Functionality in Internet Applications," and co-pending U.S. patent application Ser. No. 10/040,396, entitled "System and Method for Searching Data Partially Displayed on a User Interface."

This application is a continuation-in-part of co-pending U.S. patent application Ser. No. 10/040,397, entitled "Customization of Tab-order Functionality in Internet Applications," filed Dec. 28, 2001.

BACKGROUND

1. Field of the Invention

The invention is in the field of application program development and specifically in the field of development and customization of internet applications.

2. Description of the Prior Art

In current internet design practice the elements, layout, and functionality of user interfaces and associated web pages are intended for casual users. These users typically access applications on an irregular basis and therefore prefer a simple and intuitive interface over more powerful alternatives. This preference has lead to the near universal adoption of a basic point and click interaction model in which navigation and control is accomplished by selecting user interface elements with a pointing device such as a mouse. Current design practice is also limited by outdated conceptions related to bandwidth limitations and portability. The point and click interaction model became dominate during a period of more limited bandwidth than is currently available. Similarly, the range of devices used to access user interfaces has grown significantly. Further, many of the new devices have limited memory and processing power.

Current internet design practice and the associated philosophy are detrimental to the development and use of enterprise application programs in an internet setting. These programs are typically used by consistent users who interact with the application on a regular basis and prefer an interface optimized for the most efficient interaction. Consistent users, therefore, desire features and capabilities beyond those encompassed by current internet design practice. For example, application programs designed for use on a standalone computer typically depend on a keyboard based interaction model. In contrast with the mouse based point and click model favored on the internet, the keyboard based interaction model primarily depends on keystrokes entered by a user to communicate to the application. Utilizing keystrokes can be more efficient than the basic point and click interaction model. For instance, in data entry applications, where a user prefers to keep his or her hands located on the keys, having to reach for and manipulate a mouse is often a significant source of distraction and delay.

A desire to accommodate the greatest number of users has focused current internet design practice towards satisfying casual and/or novice users instead of consistent users. The resulting designs are intuitively simple to use but less powerful or efficient than they would be if customized for each enterprise or personalized for each individual user. Unfortunately, in the prior art, the ability to customize an internet based application is severely limited.

Current customization capabilities are generally a function of application architecture. The available architectures include standalone, client/server, and internet configurations. Standalone applications are the simplest, having just one user operating on one computing device. Standalone applications also typically have full access to the computing device for the purposes of storing and accessing configuration data. Client/server applications include both a client and a server. The application is primarily based on a server system but also relies on client system resources such as processing, memory, and data storage. In order to access these resources some part of the application resides on the client. Customization of client/server applications depends on these resources and may also require additional communications between the server and the client.

In contrast to the client/server architecture, pure internet applications use a standard web browser or browser compatible device as their client, and are generally referred to as thin or small client footprint applications. The internet application architecture provides an advantage in that no application code, other than the browser, need be installed or maintained on the client. Internet applications using standard internet protocols and security mechanisms do not require specialized client side code specific to the internet application and place essentially all the processing-intensive activities on an internet server.

Customization of internet applications that depend on a browser or browser compatible thin client is limited in the prior art to selection and layout of predefined elements on a user interface. These predefined elements include buttons, links, fields, forms, graphics, text, and other distinct parts of a user interface or associated web page. For example, some websites allow a user to design a "personal" web page or choose which news stories should appear on a page and how they should be arranged. Beyond appearance and location of custom text, URLs, or graphics, these websites do not allow customization of the predefined elements themselves. Thus, there are no means available by which a user can customize the functional properties of a user interface element.

Functional properties of a user interface element include operations beyond basic point and click navigation and retrieval of further content using a URL. These properties are important to consistent users. For example, they determine the interaction model between the user and any underlying applications. Customizing and personalizing functionality is, therefore, important to meeting the needs of consistent users. The inability to fully customize or personalize internet applications is a limitation of current design practice and has discouraged the implementation of enterprise application programs as internet applications.

Traditional client/server applications have included customization of elements within the application user interface. However, this customization of element functionality requires additional installed or built-in client-side code (e.g., Java® code, ActiveX®, etc.) on the client system. With the inclusion and execution of this client-side code the application is not a purely HTML based internet application. In addition to issues such as download security, licensing requirements, support, and compatibility, client-side code is disadvantageous because it is dependent on the client environment. This environment includes critical factors and limitations such as available memory, underlying operating system type (Windows®, UNIX, etc.), and operating system features. Client-side code also reduces portability because its execution may require computing power beyond what is available in some internet access devices. The amount of required client-side code and computing power required for a client/server application increases with the size and functionality of the application.

The client/server architecture has also been used to internet enable non-web based applications. In this process a client-side interface is used to access Windows®, UNIX, or Linux applications that are executed on a server. The client-side interface is either a custom application or a browser to which proprietary extensions have been added. The interface functions as a remote terminal accessing a pre-existing application. Interaction between the interface and the server-side application is controlled by computer code (i.e. ActiveX or Java code) downloaded or otherwise installed on the client. This client-side computer code is subject to the disadvantages of the traditional client/server architecture, such as dependence on the client side environment, etc.

Conventional standalone or "client side" applications are executed on a single computer with full access to the resources of the computer's operating system. These resources include a wide variety of personalization tools that are not available in browser-based environments. For example, a computer's operating system includes environmental settings (in registry and system files) that can be accessed and modified by executing programs. Standalone applications can also access and save files, including personalization data, on local drives. These resources are used to provide a high degree of customizability to standalone applications. Unfortunately, these resources and the personalization utilities that depend on them are not directly portable to browser based environments. For example, security protocols prevent server side applications from reading and writing to files larger than a cookie on a client system. The degree of personalization found in large standalone applications requires access to template and registry files at a frequency that is currently impractical and generally undesirable in an internet environment. In addition, this approach results in personalization restricted to the individual user or client level.

The limitations of thin clients have prevented the implementation of true internet enterprise applications and the relative perspective of the standalone and client/server environments likewise prevented even their consideration for this purpose. Features important to implementation of enterprise solutions, such as customization of functionality and transformation to a keyboard based interaction model, are simply not available in prior art internet applications.

SUMMARY OF THE INVENTION

The present invention includes systems and methods for customization of internet applications, their associated user interfaces, and other HTML based interfaces. The user interfaces are typically delivered to a user as a web page, streaming text, audio output, or the like. The customization applies to user interface elements, user interface element order and interface layout.

Some embodiments of the present invention include a system for generating an HTML based interface, the system comprising a data repository configured to store data defining the HTML based interface, and a user interface generator configured to generate the HTML based interface responsive in one of at least two layout modes. These modes including a first layout mode configured for presentation of the HTML based interface as streaming text and a second layout mode configured for presentation of the HTML based interface as a graphical user interface. An order of user interface elements within the first layout mode optionally being different than another order of user interface elements within the second layout mode. The order of user interface elements within the first layout mode also optionally being determined using at least a tab-order or an HTML tag specifying a grouping of user interface elements.

In one embodiment of the invention a user interface generator, optionally supported by an application server, automatically adds text responsive to the first layout mode to the HTML based interface, the added text being optionally configured to indicate relationships between user interface elements or to indicate a row or column associated with a user interface element. The user interface generator also optionally adds the text responsive to the position of the user interface element in a table of an HTML based interface generated responsive to the second layout mode. The user interface generator is optionally user customizable to specify generation of the HTML based interface responsive to the first layout mode or the second layout mode.

In embodiments of the invention the determination of which of the first layout mode or the second layout mode is used to generate the application user interface is responsive to an identity of a user or an identity of a client.

Some embodiments of the invention further include a plurality of ALT text, a member of the plurality of ALT text being included in the generated HTML based interface responsive to the first layout mode or the second layout mode.

Generation of an HTML based interface may occur directly by using data defining the HTML based interface to generate the HTML based interface in a first layout mode. Or, alternatively, by using data defining the HTML based interface to generate the HTML based interface in a second layout mode, and then converting the HTML based interface from the second layout mode to the first layout mode. Some embodiments of the invention therefore include means for converting the HTML based interface from the second layout mode to the first layout mode.

Some embodiments of the invention optionally include a programmable device configured to present the HTML based interface to a user. The programmable device may further include, for example, a handheld device configured to display the streaming text, a text reader configured to convert the streaming text to audio output, or a Braille reader configured to convert the streaming text to Braille. Embodiments of the invention include converting a streaming text presentation of the HTML based interface into audio output using a text reader or to a Braille output using a Braille reader.

In various embodiments of the invention, the HTML based interface is an application user interface configured to access an internet application supported by an internet application system. Some embodiments of the invention include a system for developing the application user interface. These embodiments include an integrated development environment configured for a developer to specify a first layout mode and a second layout mode, for the application user interface, the application user interface being an interface between a user and an internet application. They further include a data repository including a data record configured to store a value used to determine which of the first layout mode or the second layout mode to use when generating the application user interface in response to a user request, the value being user modifiable, and an application designer configured to produce metadata for accessing the data record.

Some embodiments of the invention include an internet application comprising (1) a computer program configured to run on an internet application system, (2) an application user interface being customizable for generation using an accessible layout mode and being further customizable for generation using a standard layout mode, (3) a user modifiable data record configurable to determine which of the accessible layout mode or the standard layout mode is to be used to generate the application user interface, and (4) means for the user interface generator to access the user modifiable data record. In this internet application, the accessible layout mode is optionally configured for presentation of the application user interface as streaming text and the standard layout mode is optionally configured for presentation of the application user interface as a graphical user interface. Also, in the internet application the data record is optionally configurable using a configuration interface.

Some embodiments of the invention include a method of developing an HTML based interface, the method comprising the steps of (1) selecting a user interface element for incorporation in the HTML based interface, (2) defining an accessible layout mode and a standard layout mode, configured for presenting the HTML based interface, (3) associating the accessible layout mode and the standard layout mode with a user modifiable data record, and (4) configuring the HTML based interface to be presented using the accessible layout mode or the standard layout mode responsive to the user modifiable data record. The HTML based interface may be configured for presentation to a user or to a device that converts the HTML based interface to an alternative format such as streaming text or audio. In these embodiments the accessible layout mode is optionally further configured for presentation of the HTML based interface as streaming text and an order of user interface elements in the streaming text is optionally responsive to at least a tab-order in the HTML based interface. In addition, the standard layout mode is optionally further configured for presentation of the HTML based interface as a graphical user interface. The inclusion and alteration of ALT text in the HTML based interface is optionally responsive to the accessible layout mode or the standard layout mode.

Some embodiments of the invention include a method for generating an HTML based interface, the method comprising (1) accessing a page definition stored in a data repository, the page definition being for the HTML based interface, (2) determining a layout mode for the HTML based interface, the determined layout mode being one of an accessible layout mode or a standard layout mode, and (3) generating the HTML based interface responsive to the determined layout mode.

In various embodiments, the accessible layout mode is configured for presentation of the HTML based interface as streaming text and the standard layout mode is configured for presentation of the HTML based interface as a graphical user interface. Also, in various embodiments an order of interface elements, within the accessible layout mode, is determined responsive to an HTML tag configured to specify a grouping of user interface elements, to tab-order, to the arrangement of elements within an HTML table, or to positions of the user interface elements within the HTML based interface when generated responsive to the standard layout mode. Typically, an order of user interface elements within the accessible layout mode is different than another order of user interface elements within the standard layout mode.

Some embodiments of the invention include a step of user customizing the tab-order. Since the order of interface elements is optionally responsive to tab-order, a user may thereby customize the order of interface elements in an HTML based interface.

Some embodiments of the invention include a step of automatically adding text to the HTML based interface responsive to the accessible layout mode, the added text being configured to indicate relationships between user interface elements. This added text is optionally configured to indicate a row or a column associated with a user interface element. The step of automatically adding text is optionally responsive to the position of the user interface element in a table of an HTML based interface generated responsive to the standard layout mode.

Some embodiments of the invention include a step of converting the HTML based interface from the standard layout mode to the accessible layout mode.

Some embodiments of the invention include a step of customizing data within the data repository, the customized data being configured for use in the step of determining a layout mode to select the accessible layout mode or the standard layout mode. A user or privledged user may thereby customize the layout mode used for presenting a HTML based interface.

Some embodiments of the invention include a method of customizing an HTML based interface, the method comprising the steps of (1) accessing a configuration system, the configuration system including a configuration engine and a configuration interface, (2) selecting, using the configuration interface, a layout mode from a plurality of layout modes, the plurality of layout modes including an accessible layout mode and a standard layout mode, the selected layout mode being used to present the HTML based interface, and (3) specifying configuration data using the configuration interface, the configuration data characterizing the selected layout mode and being stored in a data repository. These embodiments optionally further include a step of converting the streaming text to an audio output.

Some embodiments of the invention include a computer readable medium including an internet application, the internet application comprising (1) metadata defining an application user interface including a plurality of layout modes, the application user interface configured for delivery to a client and configured to operate as an interface between a user and the internet application, the plurality of layout modes including layout modes with differing order of user interface elements, (2) a user interface generator configured to generate the application user interface using a member of the plurality of layout modes, the user interface generator being further configured to select the member of the plurality of layout modes using a user modifiable data record; and (3) means for a user to modify the user modifiable data record.

Some embodiments of the invention include a computer readable medium including an application development system comprising an application designer configured to develop an application user interface for delivery to a client using a first layout mode configured for presenting the application user interface as streaming text, the application user interface being further for delivery to a client using a second layout mode configured for presenting the application user interface as a graphical user interface.

Some embodiments of the invention include an application execution system comprising (1) means for supporting an internet application, (2) means for generating an application user interface using a user modifiable data record configured to store data characterizing a layout mode, the layout mode being one of a plurality of layout modes having different order when presented as streaming text, and (3) means for presenting the application user interface to a user.

Some embodiments of the invention include a method of determining user interface element order in an HTML based interface, the method comprising the steps of (1) setting a tab-order by modifying a user modifiable data record, (2) accessing a page definition characterizing the HTML based interface, (3) determining a layout mode having an user interface element order responsive to the tab-order, (4) generating the HTML based interface responsive to the page definition and the determined layout mode, and (5) delivering the HTML based interface as streaming text. In these embodiments the determined layout modes is optionally a member of a plurality of layout modes having different order when presented as steaming text. These embodiment optionally further including a step of converting the streaming text to an audio output.

BRIEF DESCRIPTION OF THE VARIOUS VIEWS OF THE DRAWING

FIG. 13A illustrates an address entry form, such as may be found in an order entry application component;

FIG. 13B illustrates the focus of a user interface located on a calendar button;

FIG. 13C is an expanded view of a portion of FIG. 13B.

FIG. 13D illustrates the focus of a user interface located on a status drop down list;

FIG. 14C illustrates an example result of executing a view all command;

FIG. 17B illustrates an example of an option that allows a user to change the interaction model while the internet application is running.

FIG. 20B illustrates an embodiment of the interface of FIG. 20A displayed in an accessible layout mode;

DISCLOSURE OF THE INVENTION

Figure 1:
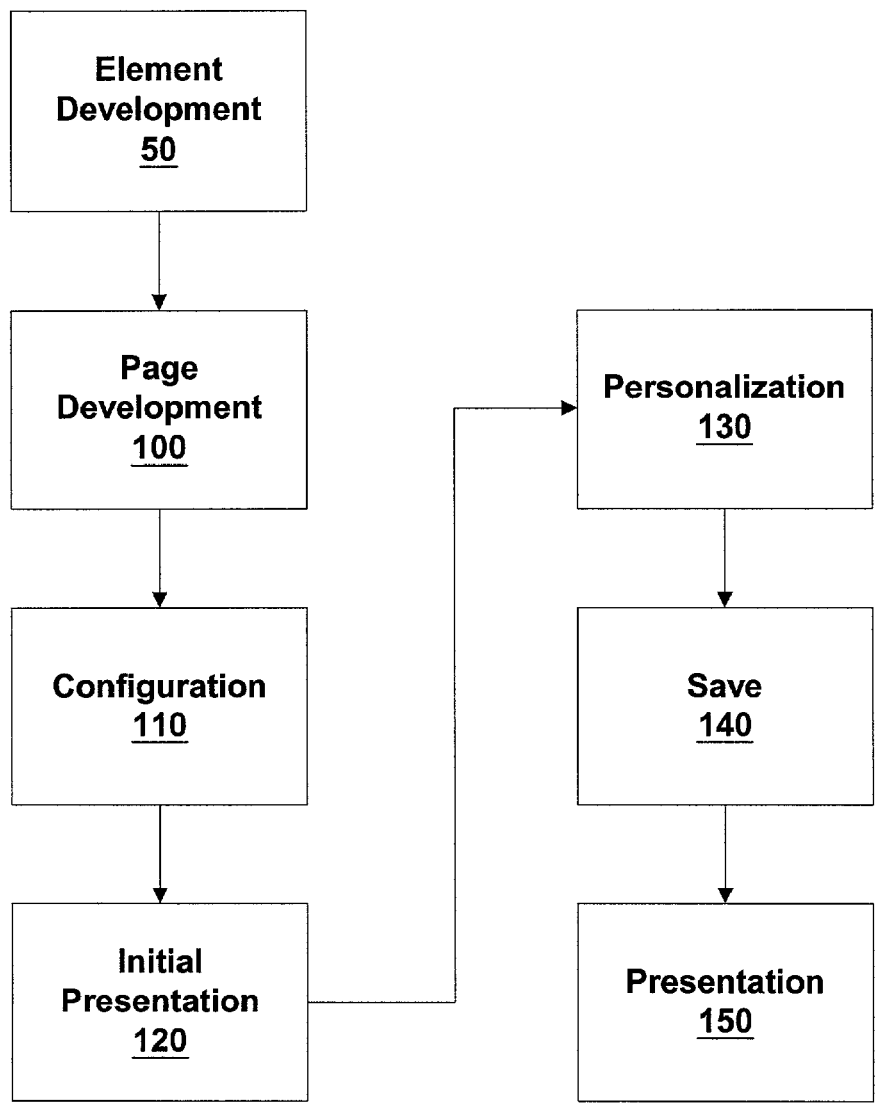
FIG. 1 illustrates an embodiment of a user interface configuration and personalization process representative of the present invention.

A new approach to designing, implementing and using user interfaces is disclosed. This approach overcomes restrictions imposed by prior art technology and philosophy and includes new design methods that permit implementation of user interfaces more appropriate for use as interfaces between consistent users and application programs. In particular, user interfaces developed using these methods are no longer constrained by the basic point and click interaction model. The new approach includes a unique system architecture, useable by user interface developers to provide advanced customization and user control within an HTML environment. The provided features include user modification of page element functionality and are thus important to the development, deployment and use of enterprise solutions as internet applications.

The unique system architecture of the present invention allows internet application developers to include customizable user interface elements in application user interfaces. The customizable properties of these elements include, but are not limited to, alternative functionality, arrangement and visibility. Customization of user interface elements includes both "configuration" that is applicable to multiple users and "personalization" that is applicable to an individual user. Personalization is a special case of configuration wherein information is modified by or for individual users and saved in an individual user profile. Configuration information is modified by a privileged user, such as a supervisor, and saved in a database associated with an internet application. Both the user profile and configuration information are stored at a location physically remote from client-side access systems, such as client web browsers. These aspects of the system architecture avoid substantial client side processing or storage and thereby eliminate dependence on client-side environments. The advantages inherent in this system architecture are achievable through an HTML based browser interface.

The new approach to user interface and web page design and interaction satisfies needs of consistent users through a browser compatible interface. These needs include giving users the ability to customize the functionality of user interface elements associated with underlying internet application programs. For example, using the present invention a user is able to control methods of data input and output, the presentation of requested information, logical operations, or characteristics of communication between the browser compatible interface and servers. Configuration and personalization can be applied to individual user interface elements, individual user interfaces and associated web pages, all internet application user interfaces accessed by a user, or groups of user interfaces within a specific internet application. Control of functionality is particularly important in applications designed as enterprise solutions. These types of applications are often used by consistent users who benefit significantly from interfaces evolved beyond the basic point and click interaction model.

Interaction between a user and an application includes input the user supplies to the application and output presented to the user by the application. For example, a user may select user interface elements with a pointing device (e.g., a mouse), enter data in a field using a keyboard or voice recognition software, or use keystrokes to control an application. Configurable properties of user interaction include defining the function of "hotkeys" and automatically placing a cursor in a preferred data entry field. Providing customization of this type allows a user to choose between the basic point-and-click interaction model and a keyboard based interaction model. Under many circumstances the keyboard based interaction model enabled by the present invention is more efficient and preferred.

The presentation of application output is customized with regard to the style of presentation, the amount of data presented on a single page, the order in which the data is shown, and the aspects of the data made visible, among others. For example, in some circumstances it is preferable to display just enough data to fill the viewing area available to a browser. In other circumstances it is preferable to display data in a style suitable for users with diminished eyesight.

A functional property of a user interface element can include logic, data processing, and responsiveness to user input. For example, checking that data entered in a form field has an acceptable format is a functional property of the form field element. This type of syntactic processing is typically performed by scripts included within the user interface. Likewise, responsiveness to a hotkey can be a functional property of a menu item. The functionality of user interface elements also includes the underlying processes associated with each element. For example, in an application interface, the underlying processes can include "business logic" typically executed on a server and designed to assure the validity of entered data. Business logic routines apply business rules such as range checking. This type of business logic may, for instance, be used to check that a start date is on or before a finish date. Other examples of user interface element functionality include displaying error messages, modifying the order of element focus, and controlling when data is passed from a client to business logic processes performed on a server. Providing customization of functional properties of user interface elements is an advantage derived from embodiments of the present invention.

FIG. 1 illustrates an embodiment of a user interface configuration and personalization process representative of the present invention. The method begins with an element development step 50. In this step one or more individual user interface elements are designed or selected from a library of predefined user interface elements. These elements are configured for inclusion in an application user interface. In step 50, each element is optionally associated with an underlying internet application. For example, in one embodiment a predefined data entry field is selected and associated with a procedure of the internet application configured to receive data entered in the field. In another example, a menu item on a user interface is associated with an underlying procedure that performs the process referred to by the menu item.

The user interface elements developed in step 50 are optionally specified as having customizable properties. These properties are either attributes of a predefined user interface element or are selected during the design of the element by the user interface developer. For example, in one embodiment the specification process is simplified by accessing a library of user interface elements including properties that are customizable by default. In another embodiment a user interface element, including at least one configurable property, is designed from basic elements or a preexisting template. Step 50 optionally includes determination of a data record used to hold a value characterizing a customizable property of the user interface element and generation of metadata including a reference to the data record. Default values are typically stored in the data record.

In a page development step 100 an application user interface, incorporating a user interface element developed in step 50, is designed. The design process includes positioning of user interface elements, with configurable features and definition of default values for these features and their configurable aspects, with respect to the application user interface. Step 100 is typically performed by a developer involved in the creation and/or publication of the application user interface. The developer can include programmers, designers, graphic artists, publishers, and other parties involve in producing the application user interface and associated web pages. For example, in one embodiment a programmer designates initial user interface elements and layout, while a specialist familiar with a specific application sets default values. The information collected and generated in step 100 is stored in the form of metadata such as PeopleCode®, page definitions, and other data formats. This information includes data records and metadata prepared in step 50 and defines the application user interface. The storage is in a location separate from the browser compatible system (client) of a user.

PeopleCode, developed by PeopleSoft, Inc., is a well-known program specification language used in the development of enterprise applications. It may, for example be used to implement business logic related to the internet application. The metadata approach enhances the maintenance of internet applications, simplifies upgrade processes and, as described herein, enables multiple layers of customization in an internet environment. In addition, the use of metadata also enhances portability, by enabling support of various database systems, server environments, and browsers.

In an optional configuration step 110, customization of the application user interface developed in step 100 is performed by a privileged user, such as a system administrator, application specialist, or the like. This customization is the basis for a hierarchical set of configuration and personalization layers each typically having a narrower scope and taking priority over more general layers. For example, in one instance a supervisor selects which application user interfaces are available to sales personnel and a member of the sales team specifies how a specific application user interface should function when the member accesses it. In this example, personalization specified by the member of the sales team takes priority over configuration specified by the supervisor. The configuration data provided by the supervisor in step 110 is stored for retrieval during application user interface generation. In alternative embodiments customization is responsive to the identity of a client rather than the identity of a user. Thus, users accessing the internet application from a client located in the sales department are presented with a user interface customized for that department.

Each configuration and personalization layer may apply to a different scope within an internet application. For example, in one embodiment a configuration specification applies to a specific application component. An application component is a collection of user interface elements, associated application code, and other aspects of an internet application that perform a specific task or set of related tasks as part of an internet application. For instance, an application component may include a set of user interface elements and underlying application code used to accept a sales order or, alternatively, to generate a sales report. An application component optionally includes one or more application user interfaces that further include personalized user interface elements. These application user interfaces are part of an internet application including the application component and are used to communicate with a user. In other examples, customization applies to an entire internet application, users or clients who are members of a group, groups of application user interfaces, and the like.

In an optional initial presentation step 120, the application user interface developed in step 100 is presented to a user through a browser compatible interface such as a web browser. The application user interface is typically served as part of a web page over a computer network such as the Internet or an intranet. Since in preferred embodiments the system architecture relies only on the features available in a standard web browser, the presentation does not depend on additional client side resources such as direct access to significant storage or processing of additional client side computer code. The application user interface is presented through any web browser compatible system and the browser compatible system does not require add-ons, plug-ins, or extensions to support additional features.

In a personalization step 130 the user optionally customizes elements of the application user interface presented in step 110. The user accesses a personalization utility associated with their user profile. The personalization utility is typically but not necessarily integrated as part of the internet application. This utility is used by the user to select and modify one or more personalization options available to the user. In a save step 140, any modifications made in step 130 are saved as personalization data associated with the application user interface and the user's profile. The personalization data is preferably saved at a location separate from the browser compatible system of the user and is accessed using a user-associated key such as a user ID and/or password.

In a presentation step 150 the application user interface is again presented to the user through a browser compatible interface. During presentation step 150 the configuration data developed in step 110 and the personalization data saved in step 140 is used to modify the presented application user interface. The modification is performed by a user interface generation engine that accesses the saved configuration and personalization data and default page information defined in step 100. The output of the page generation engine is markup-language data, such as HTML data, suitable for presentation as a web page, JavaScript®, and the like, that is presented through a browser compatible interface without requiring browser add-ons or plug-ins. The output of the page generation engine is differentiated from Java® code, ActiveX®, and other add-ons, plug-ins, or tools used to extend browser functionality, in that the output is downloaded to a client as an integral part of an associated user interface and thus does not reside on the client independently from the associated user interface.

A detailed description of the unique system architecture, used to support the method illustrated by FIG. 1, is presented herein. This discussion includes several illustrative examples in which the system architecture is used to configure and personalize functional properties of user interface elements associated with an application. In one example, a user modifies means of user input and ways in which the application responds to this input. In another example, a user selects how requested data is presented to a user. In yet another example, a user selects between interaction models used for communication between the browser interface and server-side components of an application. These examples are meant to be illustrative. The systems and methods disclosed are optionally used to provide user customization of any functional or non-functional property of a user interface.

In the preferred embodiment of the present invention, the unique system architecture uses a standard web browser as a client and does not require additional client-side application software. Internet application programs supported by the invention can use a standard web browser for user interaction because the user interface (web page) generated by the present invention is based on HTML and JavaScript that is independent of proprietary browser extensions such as vendor-specific Dynamic HTML, Java Code based user interface extensions, or other client-side controls and code. The generated interface also takes advantage of the capabilities of browsers and the internet, such as hyperlinks, and is thus not merely an emulation of a Microsoft Windows® interface.

The internet application user interface is generated at a server, delivered to the client web browser in HTML/JavaScript form, and rendered for the user at the client device. Nothing is required of the client other than the ability to support standard browser protocols such as HTTP and HTML. No additional executables are required on the client.

The system supporting the browser client does not have to be a traditional web browser, such as Microsoft Internet Explorer® or Netscape Navigator®, running on a personal computer. The client is alternatively a handheld wireless device such as a cellular phone or some other browser compatible device. Wireless applications use an architecture, known as Wireless Access Protocol (WAP), that is similar to that used by traditional internet-based applications accessed through a web browser running on a personal computer. The WAP application standard is based on internet standards, such as Extensible Markup Language (XML), HyperText Transfer Protocol (HTTP) and Secure Sockets Layer (SSL). The architecture of the present invention is well suited to the characteristics of limited functionality (e.g., available memory and processing power) systems including many wireless and non-wireless devices.

Figure 2:
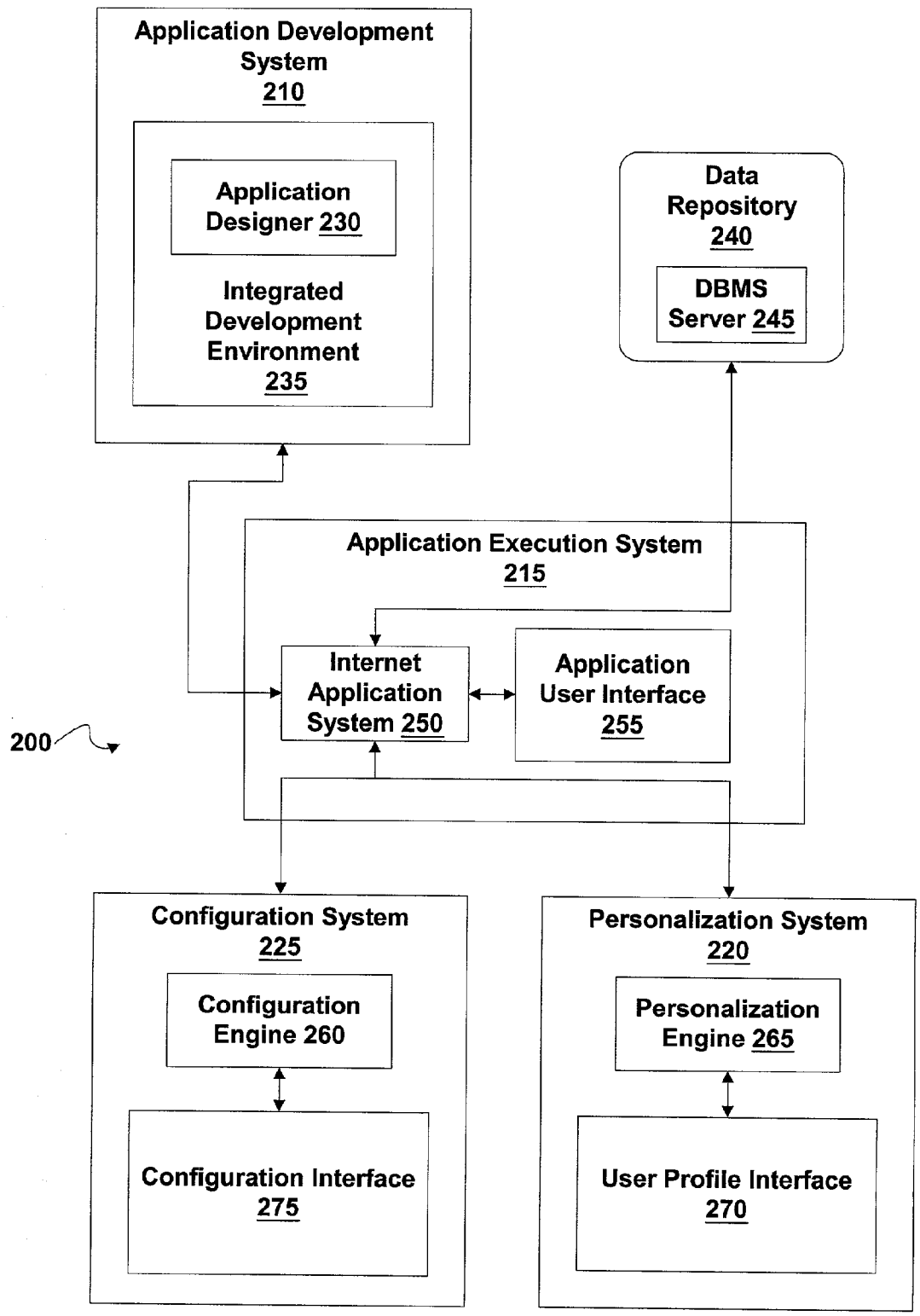
FIG. 2 illustrates elements of a customizable application system in accordance with an embodiment of the present invention.

FIG. 2 illustrates elements of a customizable application system, generally designated 200, in accordance with an embodiment of the present invention. These system elements include an application development system 210, an application execution system 215, and at least one or both of an optional personalization system 220 and an optional configuration system 225.

Application development system 210 is used by application developers to develop user interface elements in step 50 (FIG. 1) and to layout these elements in a user interface in step 100. In one embodiment the user interface is integrated into the internet application associated with the user interface elements. Steps 50 and 100 of FIG. 1 are preferably accomplished using an application designer 230 accessed through an integrated development environment (IDE) 235.

IDE is optionally used for user interface development without requiring that a user interface developer directly write HTML or JavaScript. As shown herein, HTML and JavaScript are subsequently generated automatically. IDE 235 has many features and commands in common with graphical software development systems such as Visual Basic® as well as HTML page design tools found in systems such as Microsoft FrontPage®. Thus IDE 235 is both a program development tool and a design tool for designing browser compatible user interfaces (web pages). For example, in one embodiment IDE 235 is used to develop a user interface element, associate the user interface element with an internet application, position the element on a user interface, and designate the generation of PeopleCode for checking the validity of data entered using the user interface element. IDE 235 is used to perform steps 50 and 100 as illustrated in FIG. 1.

Application designer 230, is responsive to user input received by IDE 235 and generates metadata defining a user interface, customizable elements within the user interface, and the association between elements of the user interface and processes and application data of an underlying application. Metadata is definitional data that provides information about or documentation of other data managed within a data processing application. Metadata is used, for example, to define object definitions within the system, such as business processes, components, fields, file layouts, indexes, menus, messages, pages, PeopleCode programs, queries, and other records. This metadata is stored in a data repository 240 typically including a database management server (DBMS) 245. Metadata is modified using application development system 210.

Application execution system 215 includes an internet application system 250 arranged to support an application program and manage an associated HTML/JavaScript based application user interface 255. Internet application system 250 receives data generated using IDE 235 and stores it in Data Repository 240. During internet application execution internet application system 250 retrieves data from data repository 240 and uses the retrieved data to generate a customized application user interface 255 displayed to a user in one or more web pages. Application user interface 255 is an HTML based interface typically generated in response to a user request. The retrieved data optionally includes information that has been modified by a user as part of a customization. Application execution system 215 is used during initial presentation step 120 and presentation step 150 of FIG. 1.

Personalization system 220 is accessed through a user profile interface 270 and includes a personalization engine 265 configured for a user to modify information stored in data repository 240. As with other elements of the invention, personalization engine 265 and user profile interface 270 are optionally integrated directly into internet applications supported by and accessed through the invention. Personalization system 220 is used during personalization step 130 of FIG. 1.

Configuration system 225 includes a configuration engine 260 and a configuration interface 275. Configuration system 225 is typically arranged to modify an entire application, a part thereof, or the preferences of more than one user. Use of configuration system 225 generally requires greater access permissions than personalization system 220. Configuration system 225 is typically used to set group, department (sales, accounting, etc.) or enterprise wide preferences in configuration step 110 of FIG. 1.

Figure 3:
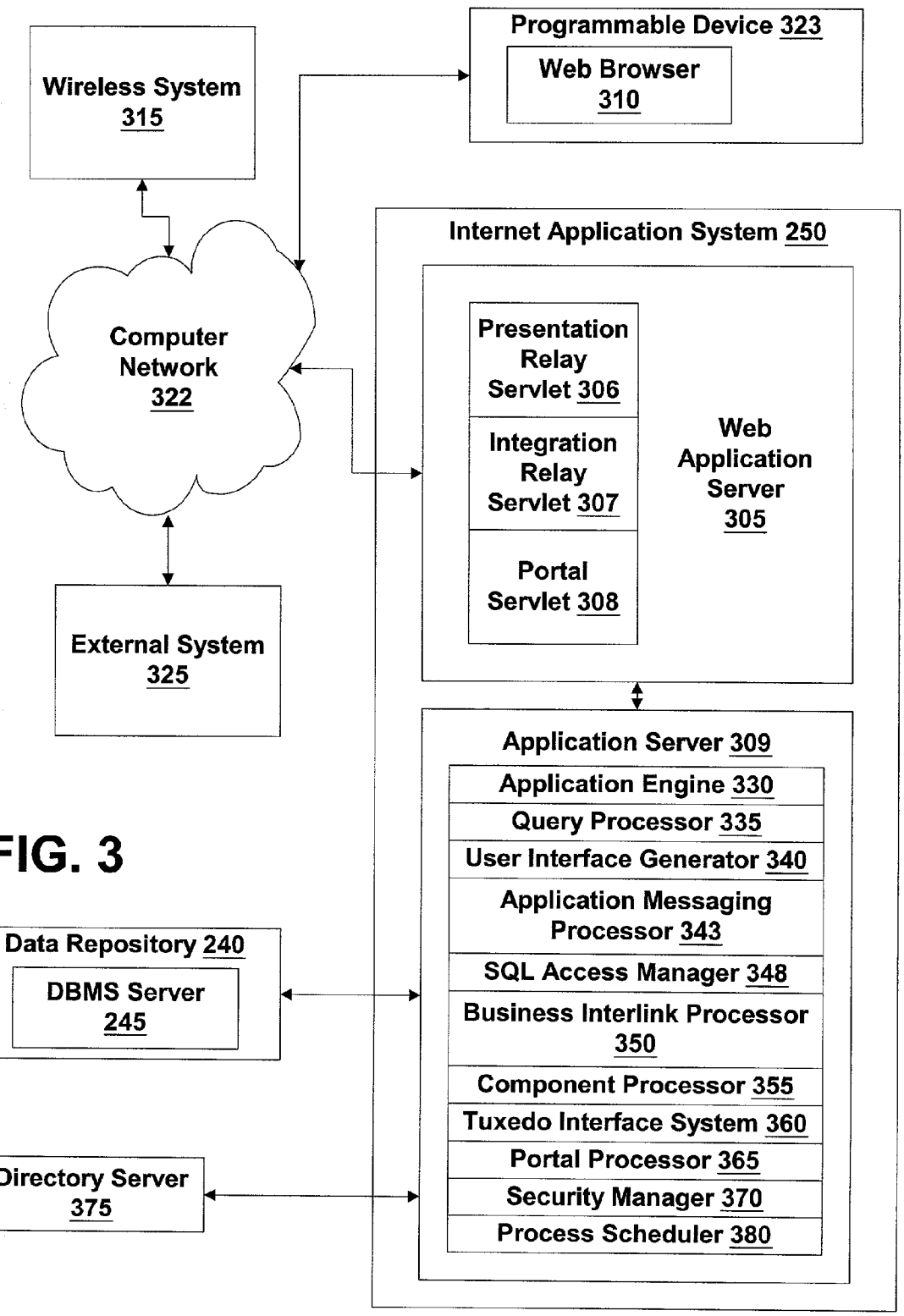
FIG. 3 illustrates an embodiment of an internet application system and associated components of the invention.

FIG. 3 illustrates an embodiment of internet application system 250 and associated components of the invention. Internet application system 250 typically includes a web application server 305 configured as an interface to outside systems and an application server 309 configured to support the execution of internet applications and generate application user interface 255 (FIG. 2). One embodiment of web application server 305 includes subsystems well known in the art such as presentation relay servlet 306, integration relay servlet 307, and portal servlet 308.

Web application server 305 communicates, using standard protocols, with outside systems such as a web browser 310 within programmable device 323, a wireless system 315, and an external system 325. This communication is typically through a computer network 322, such as a local network, a wireless network, a wide area network, the internet, or the World Wide Web. Web browser 310 executes on a programmable device 323 such as a workstation, personal computer, personal digital assistant, or the like. Alternatively, web application server 305 communicates with a wireless system 315 using HTTP and WAP. Web application server 305 optionally includes utilities, such as WebSphere® (International Business Machines, Armonk, N.Y.), and WebLogic® (BEA Systems, Inc., San Jose, Calif.), that are well known in the art. These utilities serve to perform the functions expected of a web server and as interfaces between web application server 305 and components of application server 309.

Application server 309 is configured to support and execute the internet application program. These tasks include the generation of HTML/JavaScript based application interface 255. In one embodiment internet application system 250 uses an application engine 330 to execute application logic. Application engine 330 is a batch processing program optionally used to execute business logic developed by a designer of an application. Query processor 335 is used to execute queries that are generated by a system user. In some embodiments aspects of application server 309 are configured to make use of external code such as program modules written in C++ or the like. Application messaging processor 343 is used to send and receive messages between applications for application to application integration. User interface generator 340 produces customized application user interface 255 (FIG. 2). Interface generator 340 and query processor 335 are supported by SQL access manager 348. In support of interface generator 340, SQL access manager is used to form queries for the retrieval of data, such as configuration data, from data repository 240 (FIG. 2). These queries are applied to databases, such as DBMS server 245 (FIG. 2).

Application server 309 further includes a business interlink processor 350 configured to facilitate communication with and execution of third party applications that are optionally used to add functionality to the internet application as is well known in the art. A component processor 355 is configured to execute aspects of the internet application. Application server 309 also includes server utilities well known in the art, such as a Tuxedo® interface system 360 from BEA Systems (San Jose, Calif.) which is used in the execution of business logic. Application server 309 contains other elements well known in the art such as an optional portal processor 365 that is used to handle the processing of data requests and instructions passed to and from user-application interface 255 (FIG. 2) when user-application interface 255 works inside a portal, a security manager 370, a directory server 375, and a process scheduler 380.

DBMS server 245, within data repository 240, stores personalization data associated with each user profile and configuration data associated with each internet application supported by the present invention. Information associated with the internet application and each user is held in DBMS server 245 or elsewhere within data repository 240. This information can include, for example, application data tables, metadata, configuration data, and the like.

Figure 4:
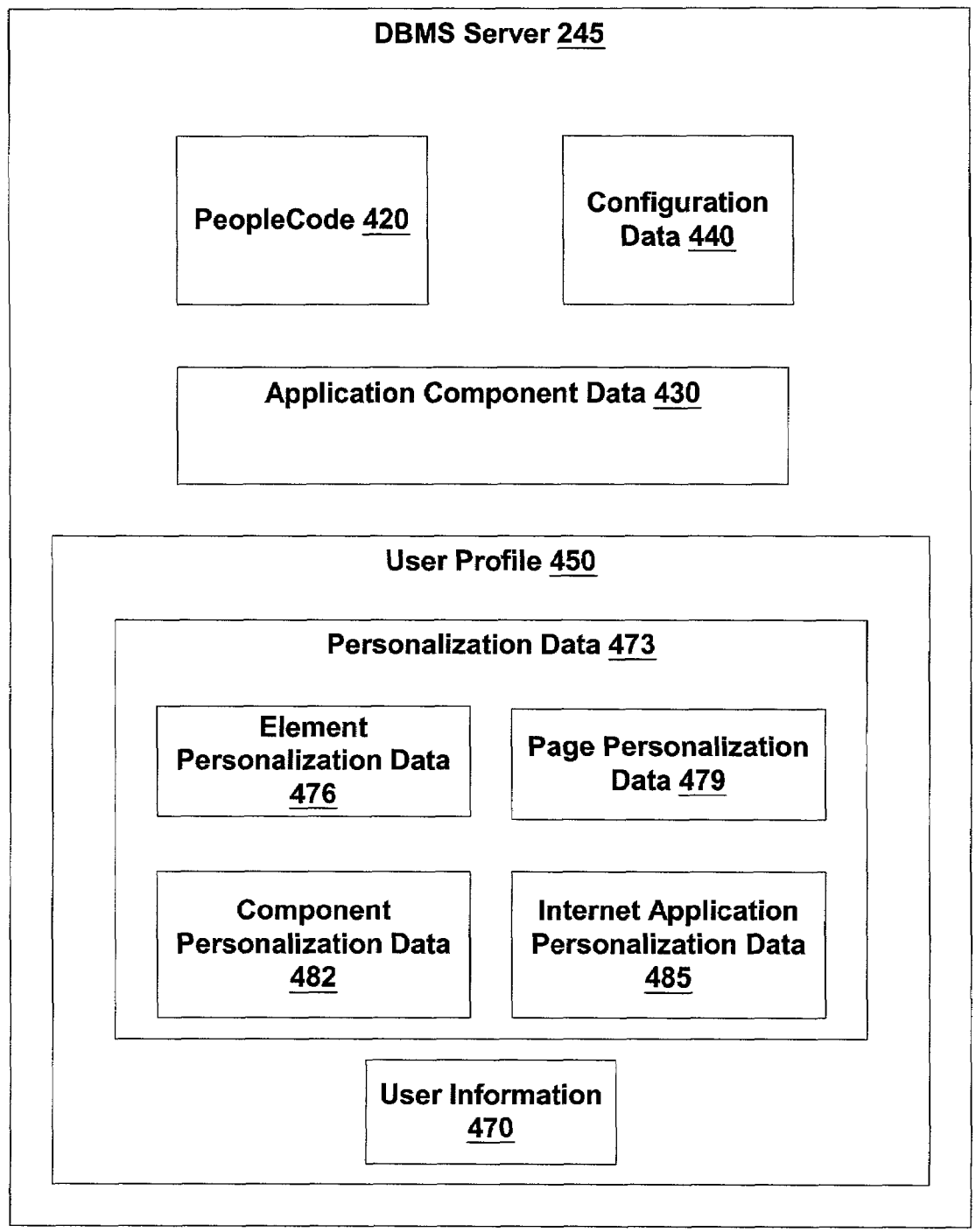
FIG. 4 illustrates an embodiment of a DBMS server.

FIG. 4 illustrates an embodiment of DBMS server 245 (FIG. 2). DBMS server 245 includes system data, metadata such as PeopleCode 420 and application component data 430, configuration data 440, and user data such as a user profile 450. Application component data 430 includes information associated with specific application components, such as the relationships between user interfaces and underlying application code, application data, application processes, PeopleCode, and the like. DBMS server 245 is optionally located on one or more computing devices physically separate from internet application system 250 (FIG. 2).

One embodiment of an application component is arranged for order entry. This application component is associated with application component data 430 specifying properties of user interfaces arranged to allow users to enter buyer and product information relating to an order. These user interfaces are included in several embodiments of application user interface 255 (FIG. 2) and are configured for entering account information, items being ordered, and such.

Application component data 430 optionally includes aspects of configuration data 440, and aspects of supporting PeopleCode 420 (FIG. 3), and is typically developed using application development system 210 (FIG. 2). Configuration and personalization at the application component level is advantageous because user interaction with an internet application is often characterized by performance of a specific task or set of related tasks. Configuration data 440 is therefore optionally included as an aspect of application component data 430.

Configuration data 440 includes information used to customize a user interface before the user interface is included in an embodiment of application user interface 255. Configuration data 440 optionally is populated with default values using application development system 210 during page development step 100 (FIG. 1) and is also modified using configuration system 255 during configuration step 110. In alternative embodiments configuration data 440 is specific to the internet application, groups of users, individual user interfaces, geographic locations, or the like. In these embodiments configuration data is also optionally stored in association with specific application components or other aspects of an internet application.

Personalization data 473 is configuration data 440 that is specific to an individual user and is optionally found in association with a user profile 450. In alternative embodiments user profile is associated with a specific user, a class of users, a specific client or a class of clients. In addition to personalization data 473, user profile 450 includes user information 470 which is composed of data such as a user's name, a user ID, user privileges, and the like. Personalization data 473 includes element personalization data 476, page personalization data 479, component personalization data 482 and internet application personalization data 485. These data are used for personalization at the element, component, individual application web page, and internet application levels respectively.

Metadata stored in DBMS server 245 are used by processes on application server 309 to generate the application user interface 255. These metadata are used to define HTML and JavaScript data included in an embodiment of application user interface 255. Specifically these metadata include data defining specific user interface elements, such as data records containing specific fields used to store properties of the user interface elements. The metadata also include menu definitions, page definitions, PeopleCode, business process definitions, and the like. The use of metadata in the user interface generation process is a property of the present invention that simplifies the incorporation of customized information in the resulting user interface. Metadata includes references, such as queries or pointers, to data records holding user defined data customized using configuration system 225 and/or personalization system 220. As shown herein, metadata is used by processes on application server 309 to retrieve appropriate configuration and personalization data at the time of user interface generation.

In an alternative embodiment of data repository 240 (FIG. 2) the metadata further includes information defining the type of data that can be found in a specific data record. This feature allows an individual data record within DBMS server 245 to hold data of variable type. For example, a record may hold a specific value, or alternatively, an SQL query configured to retrieve a specific value from another part of DBMS server 245 or another location. In this embodiment user interface generator 340 (FIG. 3) uses information associated with the metadata to determine the type of data stored in the data record and process it accordingly.

In various embodiments of the present invention, metadata is edited or generated as a result of a developer using application development system 210 (FIG. 2). For example, during page element development step 50 (FIG. 1) a developer defines or selects a user interface element and associates it with a procedure (function) of an internet application. This results in the definition of metadata fields used to store properties of the user interface element. These fields are included in data records stored in data repository 240. In one embodiment the developer specifies specific aspects of the user interface element to be customizable. During Page Development step 100 the user interface element is included in a specific application user interface 255. As a result, metadata is generated indicating properties such as the relative location of the user interface element in the specific application user interface 255. If a property of the user interface element is customizable, the metadata is used by the SQL access manager 348 to generate means, such as an SQL query, for accessing values stored elsewhere, such as configuration data 440 or personalization data 473. In practice, these values stored elsewhere are adjustable using configuration system 225 and/or personalization system 220 (FIG. 2).

Using metadata to define properties of a user interface element, an entire application user interface 255 or an application component, and using the metadata in combination with the customization data to generate application user interface 255 when needed, allows any property, both functional and static, of a user interface element to be customizable. In addition, since configuration data 440 and personalization data 473 are optionally separate from other aspects of an internet application, various users can be subject to various sets of configuration (and personalization) data. Therefore, two users can see different customized versions of the same application component, as presented through application user interface 255. This can occur even while both users are accessing the component at the same time.

Figure 5:
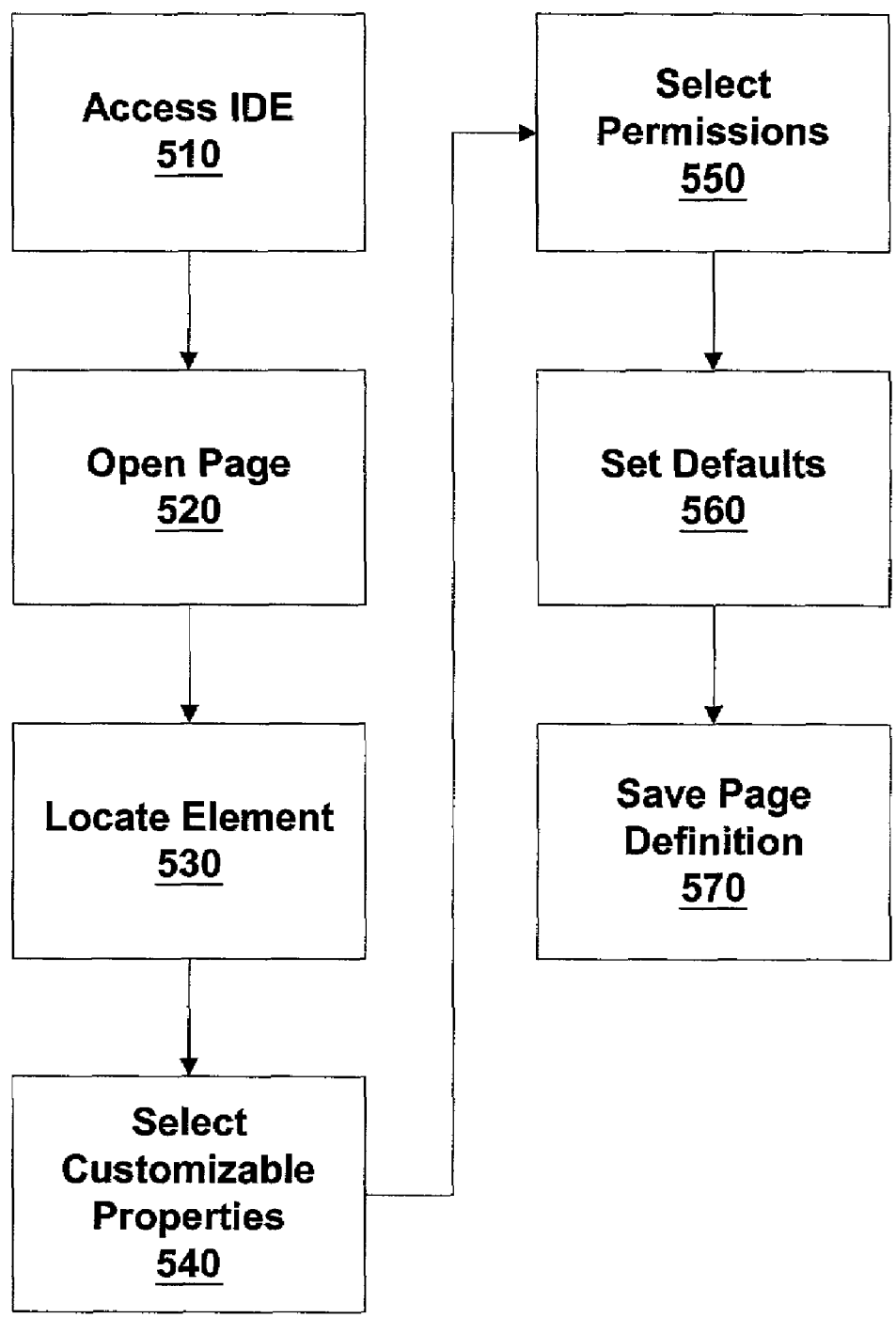
FIG. 5 illustrates an embodiment of a page development step that includes generation of metadata.

FIG. 5 illustrates an embodiment of page development step 100 (FIG. 1) that includes generation of metadata. As discussed with reference to FIG. 1, in step 100 a developer uses IDE 235 (FIG. 2) to add or modify user interface elements on an application user interface 255. In addition to selecting and positioning user interface elements, a developer can optionally specify default values for a user interface element. The process begins in an access IDE step 510 wherein a developer accesses application designer 230 using IDE 235. In an open page step 520 a new or existing application user interface 255 is opened in IDE 235. In some embodiments step 520 includes opening a group of application user interfaces 255, related to an application component, to be developed as a single unit. In a locate element step 530 a user interface element is selected and located (positioned) on the user interface opened in step 520. The user interface element may include text, graphics, images, fields, buttons, and the like.

In a select customizable properties step 540 a property of the selected user interface element is selected by the developer using IDE 235. This property is a customizable property of the user interface element by default if the user interface element was selected in step 50 (FIG. 1) from a library of previously defined customizable elements. Alternatively, if the user interface element was developed by a developer in step 50, then the property is customizable because it was specifically specified as being customizable by the developer. This specification is used to generate metadata that enables administrators or other users to later change (customize) the property of the selected user interface element.

In an optional select permissions step 550 permissions for performing configuration or personalization of the property selected in step 540 are determined. The ability to customize a property is optionally dependant on security aspects such as a password and/or the identity of a user or client. The permissions set in step 550 are default values that may later be changed by a supervisor or other privileged user. In an optional set defaults step 560 further default values associated with the configurable property are determined. For example, if the configurable property is a number of columns to show in a table, then an actual value for the number of columns is set in step 560. In alternative embodiments step 560 is performed as part of a separate process, for example during installation of the internet application.

Page development step 100 (FIG. 1) is concluded with a save page definition step 570 that makes the developed application user interface 255 (FIG. 2) and associated internet application functionality accessible to users. In this step metadata associated with the application including customizable and static aspects of application user interface 255 are generated and saved in metadata and optionally non-metadata formats. Information saved can include the application user interface 255, PeopleCode 420, application component data 430, and the like. Metadata optionally includes segments of HTML and JavaScript as well as information about attributes of specific data records. These attributes optionally include the data format of the data record, information about a configurable property or a reference to customization data such as page personalization data 479. In an alternative embodiment a data record includes metadata indicative of the data format found in a specific metadata field. For example, in one instance a data record includes information indicating that the next data field contains a URL. Characteristics of the metadata indicate to a process accessing the metadata record that the next data field is to be treated accordingly. Data saved in step 570 is saved in a location, such as data repository 240, that is accessible to internet application system 250.

Figure 6:
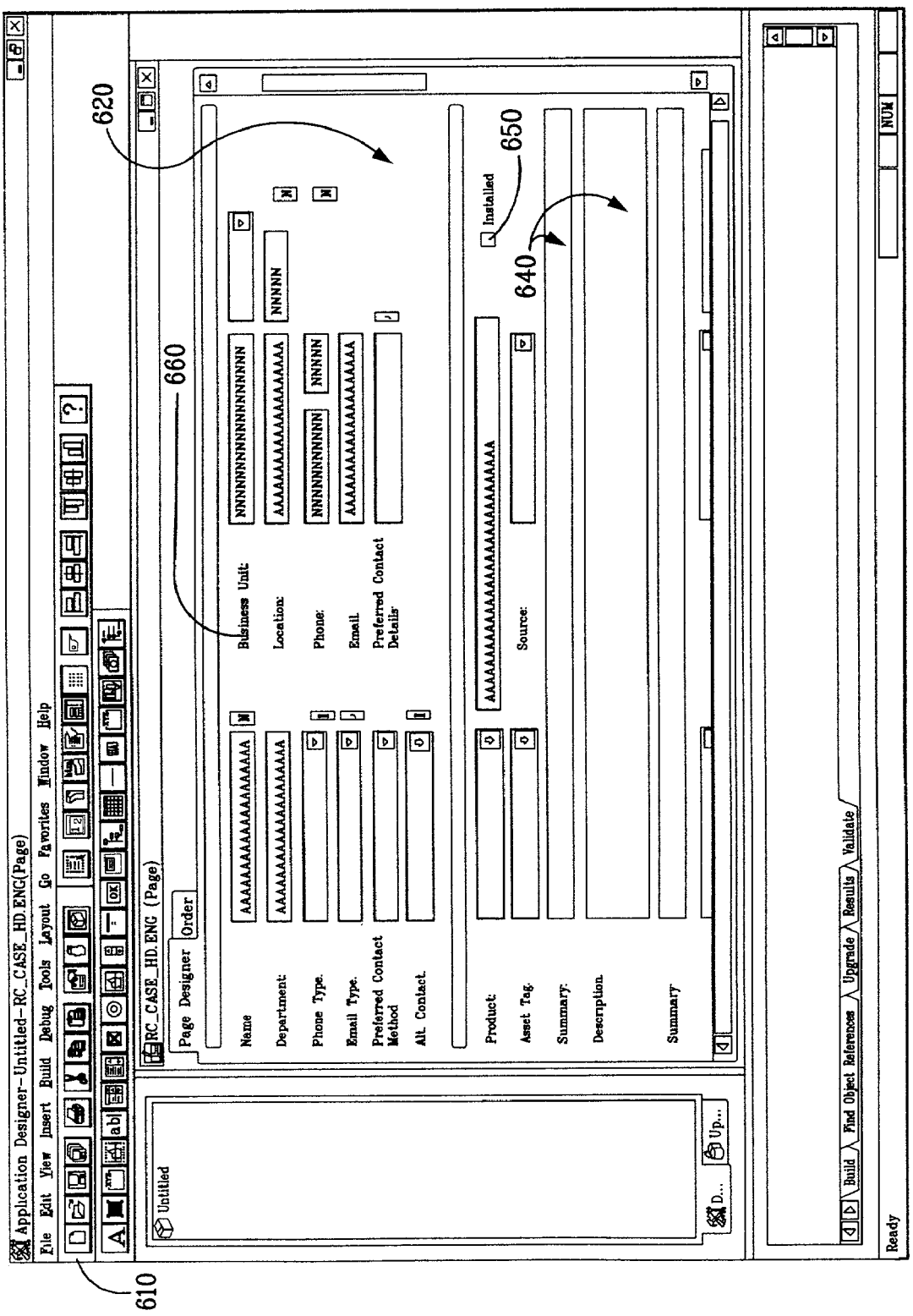
FIG. 6 illustrates an embodiment of an IDE.

FIG. 6 illustrates an embodiment of IDE 235 (FIG. 2) as used in page development step 100 (FIG. 1). The embodiment shown includes a new page button 610 and a user interface being developed 620. The user interface being developed 620 includes data entry fields 640, check boxes 650, and text elements 660. While the ability to position user interfaces elements such as these on a user interface is found in standard web development environments, IDE 235 includes features specific to the present invention. Following save page definition step 570 (FIG. 5), user interface being developed 620 may be presented to a user as an instance of application user interface 255.

Figure 7:
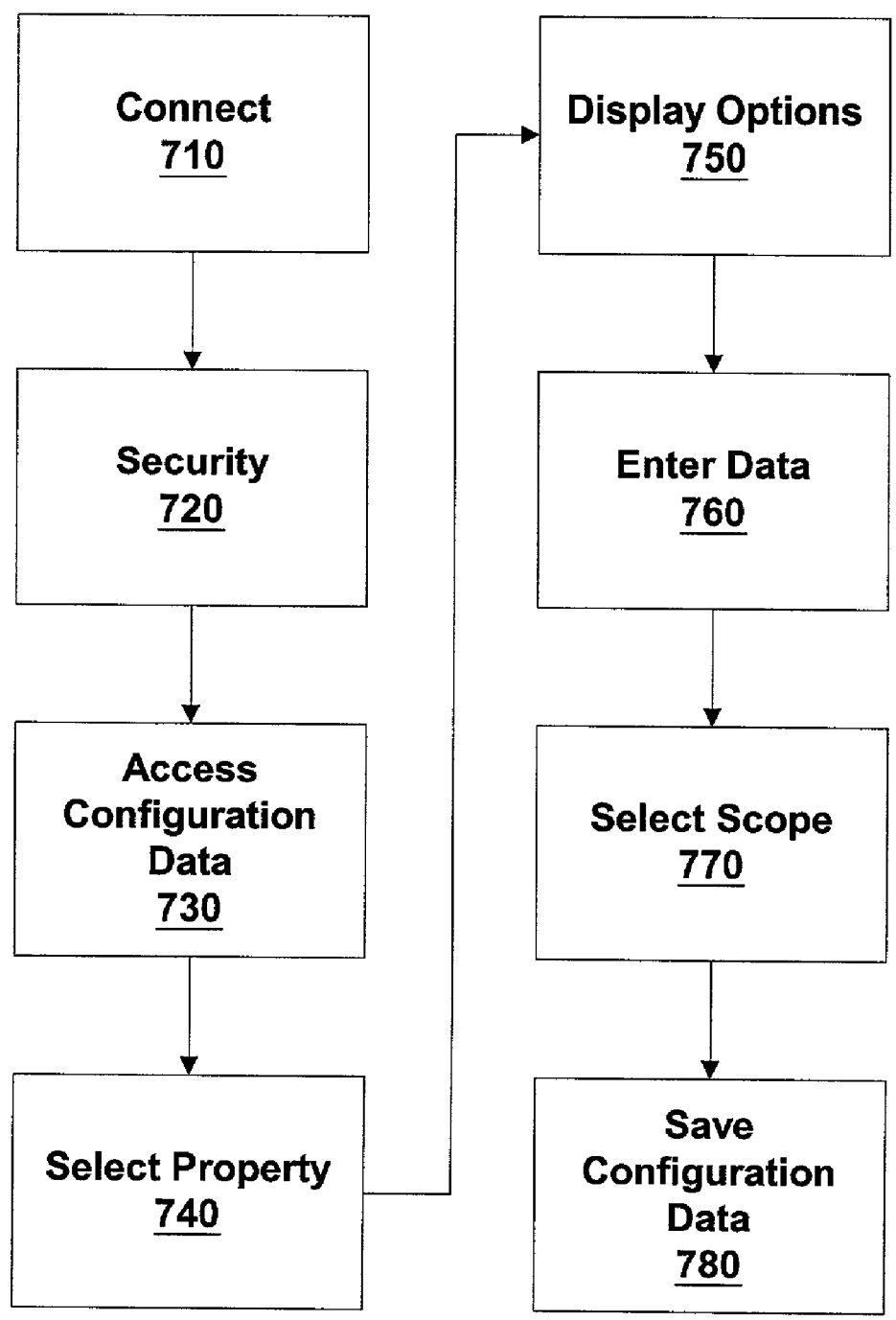
FIG. 7 illustrates one example of a configuration step in which a developed user interface is customized to meets the needs of a particular user or group of users.

FIG. 7 illustrates an example of configuration step 110 (FIG. 1) in which an application user interface 255 (FIG. 2) developed in step 100 is customized to meets the needs of a particular user or group of users. Configuration step 110 is initiated when an administrator, supervisor, or similarly privileged user connects to internet application system 250 (FIG. 2) in a connect step 710. This connection provides the privileged user access to configuration system 225. Permission to use configuration system 225 is optionally responsive to a security step 720 wherein the privileged user must pass a security protocol that establishes their identity and/or authorization and results in appropriate access privileges. In step 720 security manager 370 (FIG. 3) accesses optional directory server 375. Directory server 375 includes data such as usernames, passwords, privileges, and the like, that are used to authenticate users or clients and determine the privileges held by each. In alternative embodiments this information is saved in data repository 240 instead of directory server 375.

In an access configuration data step 730 the privileged user uses configuration system 225 to access configuration data 440 (FIG. 4) associated with an internet application. The ability to access and modify configuration data 440 is dependant on the specified privileges of a user. For example, in one embodiment a supervisor responsible for accounting department processes is only able to access application components related to this department.

In a select property step 740 the privileged user selects a property of the user interface element to customize. The selected property is a functional or static property that was made configurable during page development step 100 or element development step 50. The selected property is also, in various embodiments, specific to an entire internet application or to a part of an internet application such as an individual user interface element, a specific application user interface 255, an application component, or the like. For example, in one embodiment the selected property is static text to be displayed on a button whenever that button is used in an internet application. In another embodiment the selected property is specific to an application component and is a functional "immediate access" keystroke combination that will cause a cursor to move to a specific field.

In an optional display options step 750 the privileged user views one or more options available for the property selected in step 740. These options are typically determined during page development step 100 or element development step 50. For example, in one embodiment a developer specifies ten possible columns that can be included in a table. In this embodiment of step 750 descriptions of the ten possible columns are displayed to the privileged user as a list. By specifying limited configuration options, the developer can assure that configuration is restricted to reasonable choices.

In an enter data step 760 the privileged user selects one of the options displayed in step 750 or alternatively enters other data relating to the property selected in step 740. For example, in one embodiment the privileged user selects four of the ten possible columns displayed in step 750 to be included in a table. In an alternative embodiment, the privileged user enters a keystroke combination to be used for immediate access. In an alternative embodiment, the privileged user sets a value used to determine a layout mode for presentation of an HTML based interface. The selection made in step 760 is reflected in a customized application user interface 255.

In an optional select scope step 770 the privileged user determines the scope of the selections made in steps 740 through 760. For example, in one embodiment the configuration is applied to only one user interface element on a specific user interface for a specific user. In an alternative embodiment the configuration is applied to all of an internet application (or applications) irrespective of user or client identity. In other embodiments scope is specified with respect to application components, individual user interfaces, particular groups of users, classes of user interface elements (field, button, image, etc.), and the like.

In a save configuration data step 780 the information generated in steps 740 through 770 is saved to DBMS server 245. As described further herein, this information is used in the generation of customized user interfaces, such as a customized application user interface 255.

Figure 8:
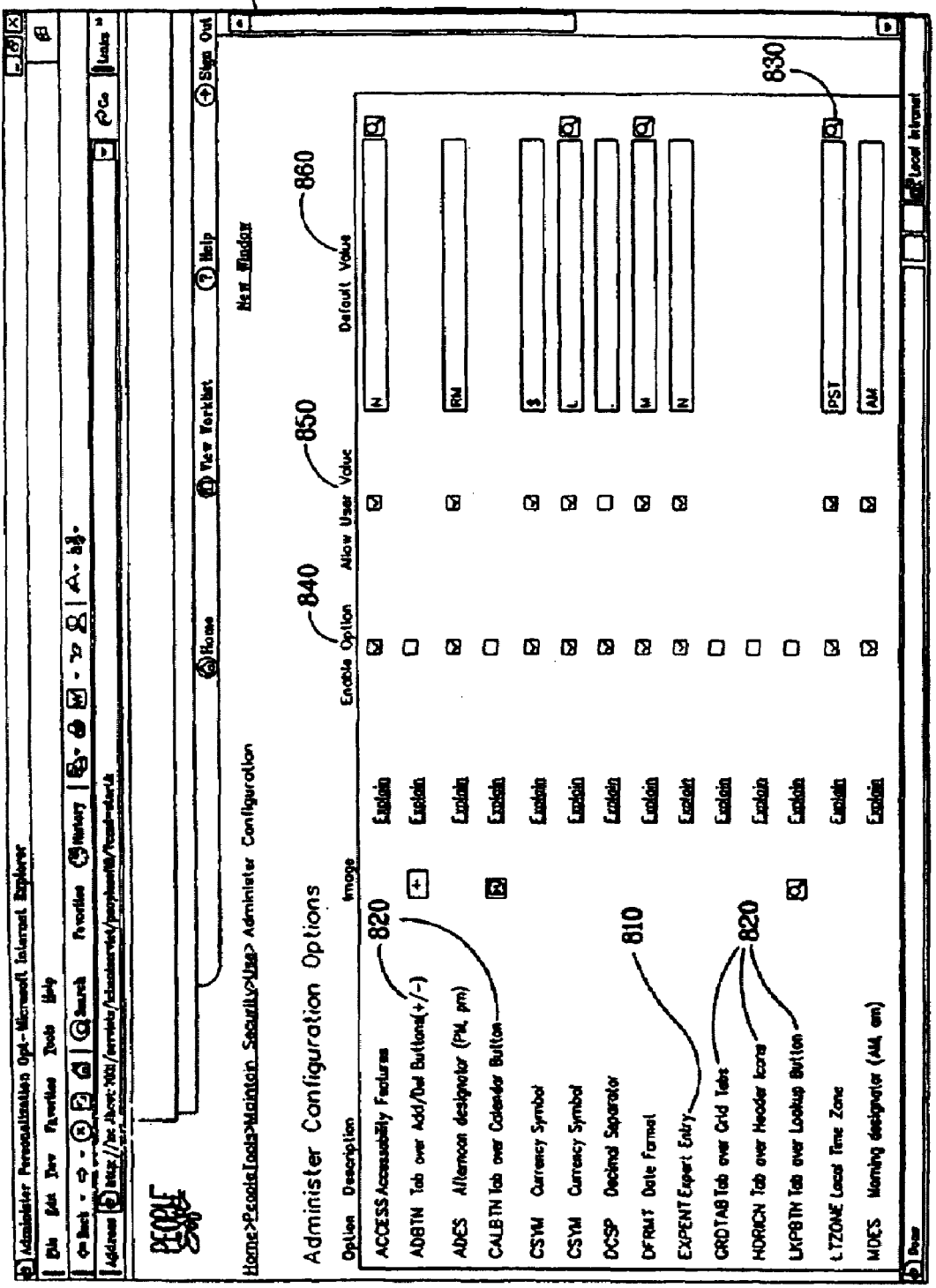
FIG. 8 illustrates an embodiment of a configuration interface.

FIG. 8 illustrates an embodiment of configuration interface 275 (FIG. 2) used by a privileged user to perform configuration step 110 (FIG. 1). The configuration options available in configuration interface 275 are determined by selections, such as specification of configurable properties of a user interface element, made in page development step 100. In this embodiment, configuration interface 275 includes rows associated with customizable properties such as an "expert entry" property 810 and various "tab" properties 820 as further described herein. Each property is further associated with an "enable option" checkbox 840 and an "allow user value" checkbox 850. The state of the enable option checkbox 840 determines whether an option is used. Similarly, the state of the allow user value checkbox 850 determines whether a user can enter their own (personalized) values for the option. Each property listed in configuration interface 275 is also associated with a default value 860. Magnifying glass buttons 830 are used to display lists of allowed values as explained in display options step 750 (FIG. 7).

Figure 9:
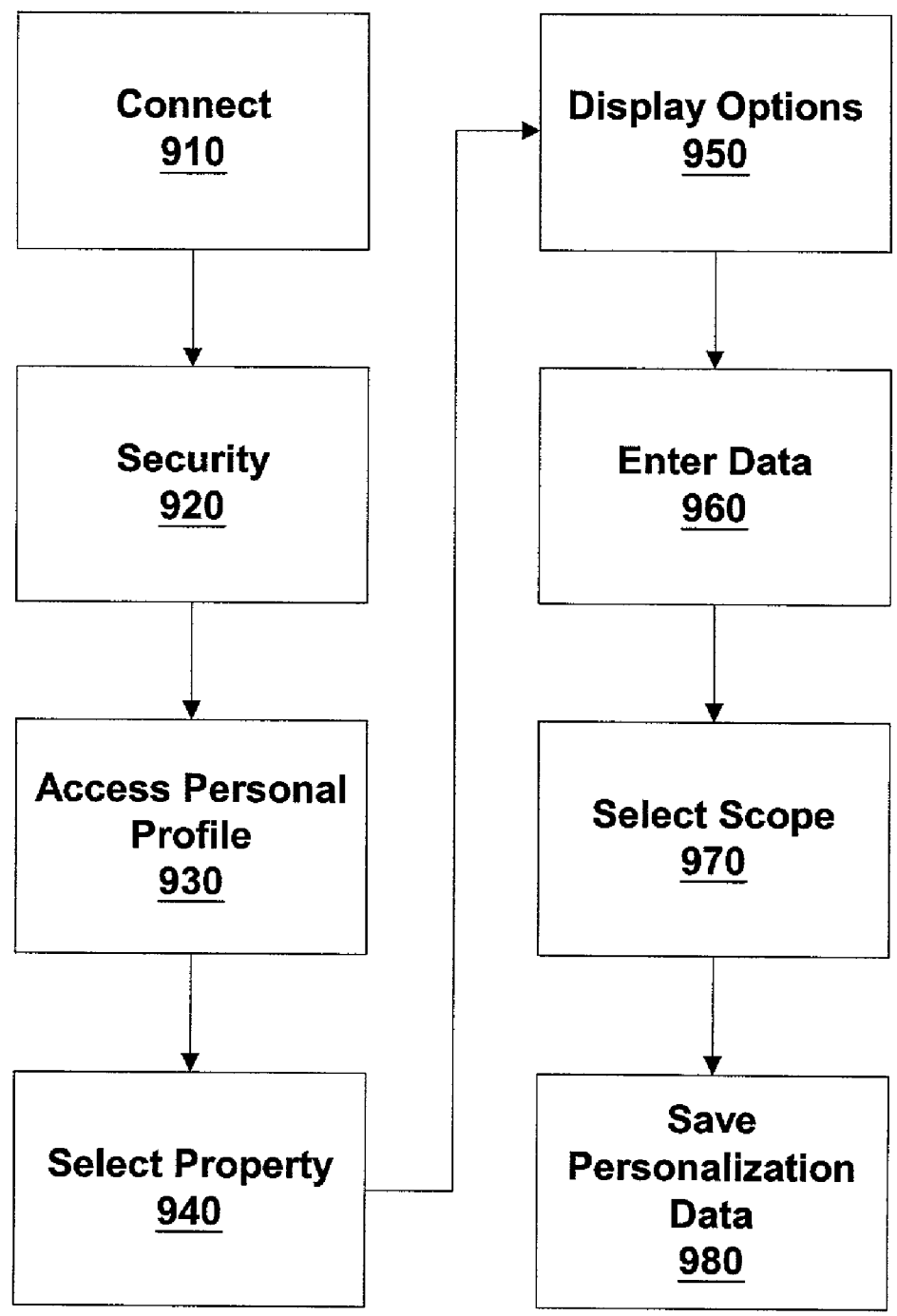
FIG. 9 illustrates details of a personalization step.

FIG. 9 illustrates details of personalization step 130 (FIG. 1) in which aspects of an internet application are personalized. In contrast with configuration, personalization is performed using personalization system 220 (FIG. 2) at the level of a single user and, therefore, typically affects only that user. Except for factors relating to these changes in customization level, steps 910 through 980 of FIG. 9 are similar to steps 710 through 780 of FIG. 7. For example, an optional security step 920 differs from security step 720 in that the permission required to access personalization settings of a single user is generally less than the permission required to modify the customization settings of multiple users. In a typical implementation each user has default permission to modify their own personalization settings.

In another example of difference between the steps of FIG. 7 and FIG. 9, access personal profile step 930 typically includes accessing the personal profile 450 (FIG. 4) of a user rather than configuration data 440. In one embodiment the properties available for modification in a select property step 940 and the options displayed in a display options step 950 are limited by the permissions held by the user. The data that a specific user is permitted to enter in an enter data step 960 may be similarly limited. In a select scope step 970 the allowed scope is typically limited to the current user and a save personalization data step 980 is optionally part of save step 140 (FIG. 1).

Figure 10A:
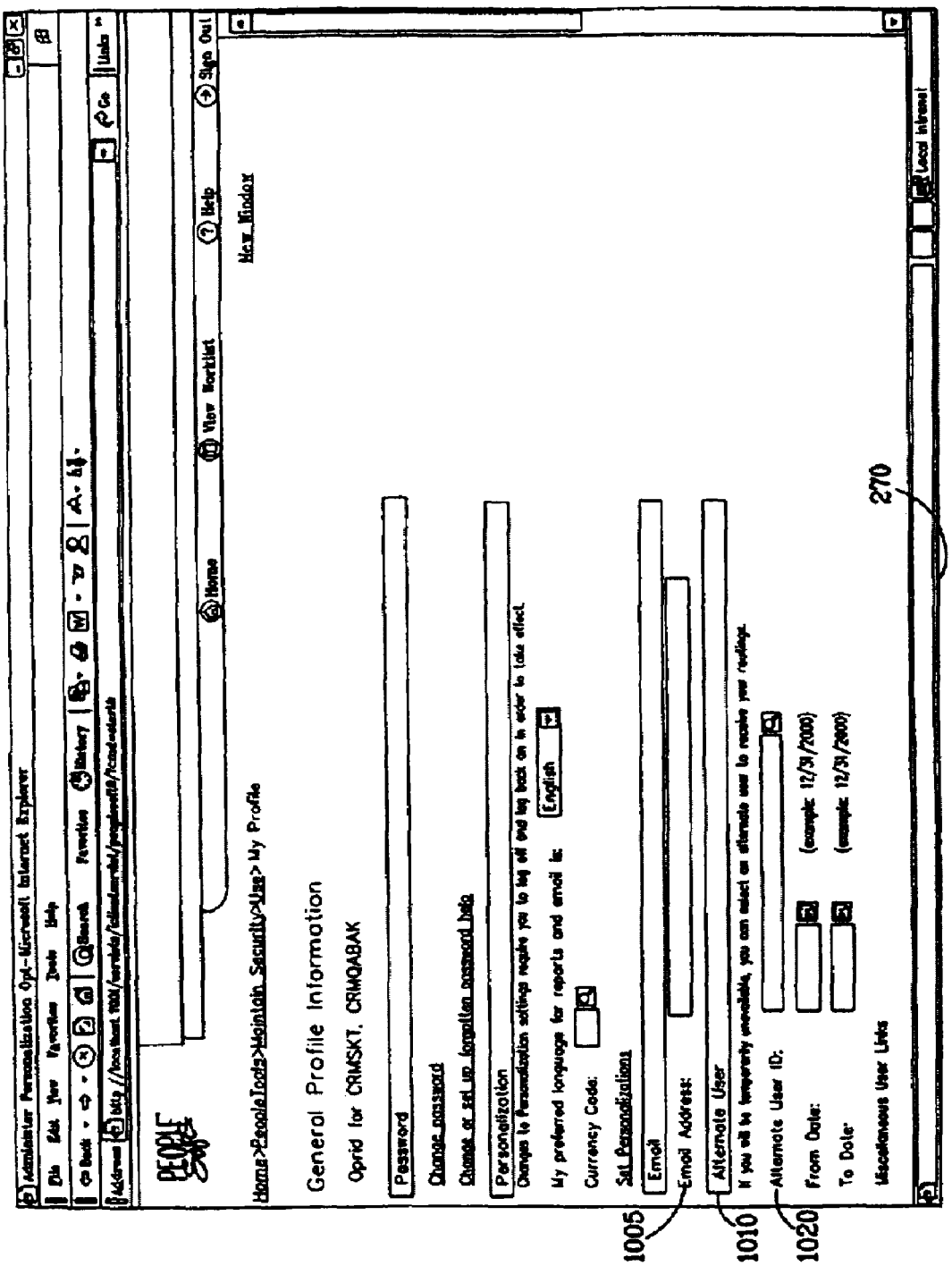
FIG. 10A illustrates an embodiment of a user profile interface.
Figure 10B:
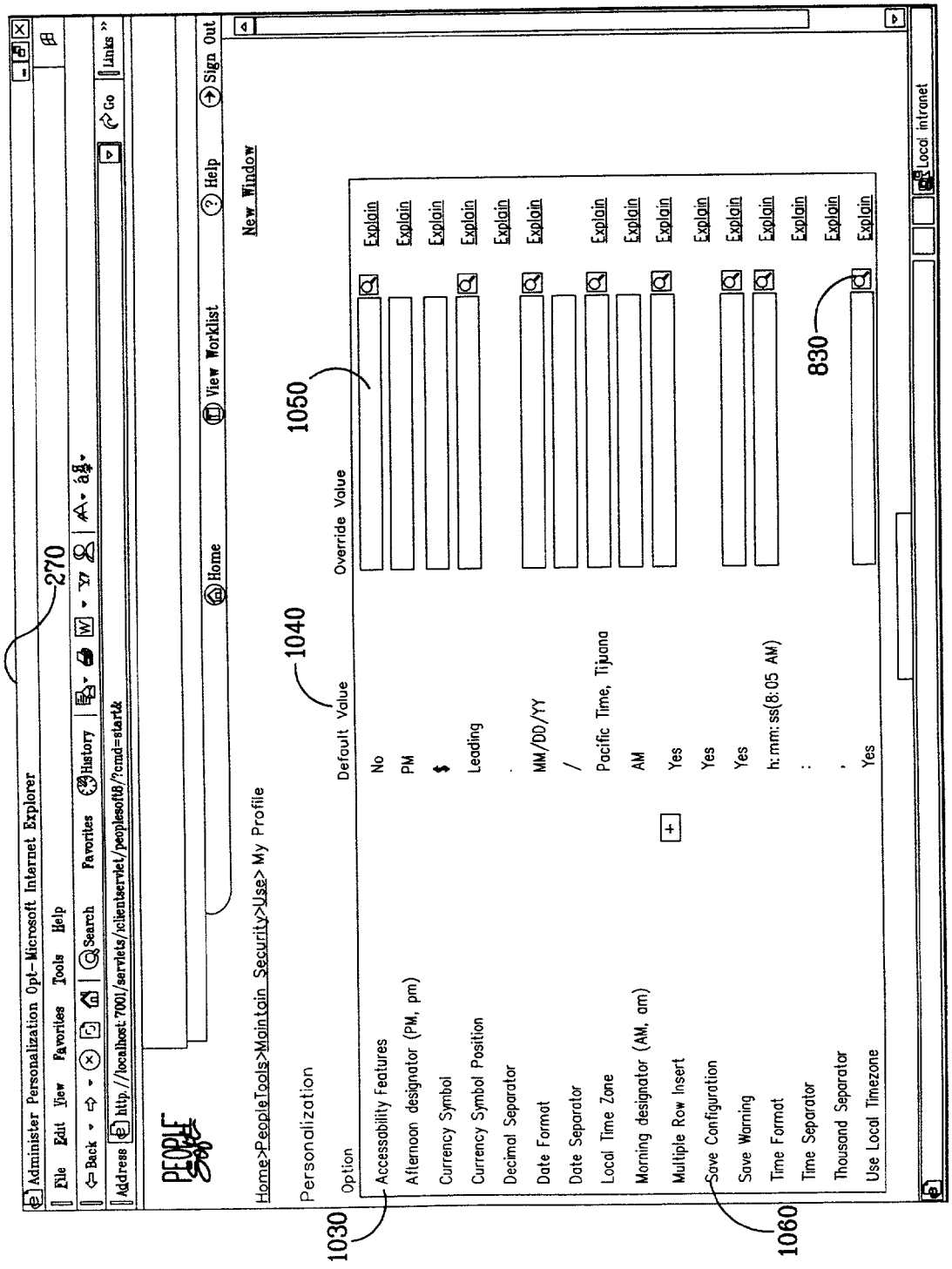
FIG. 10B illustrates another embodiment of the user profile interface.

FIGS. 10A and 10B illustrate two embodiments of user profile interface 270 (FIG. 2) that are used to perform personalization step 130 (FIG. 1). User profile interface is typically an embodiment of application user interface 255. The embodiment of user profile interface 270 illustrated in FIG. 10A includes facilities for changing general aspects, such as an e-mail address 1005 associated with a user. This embodiment also includes facilities for changing an alternate user property 1010 by providing an alternate user ID 1020. The embodiment of user profile interface 270 illustrated in FIG. 10B includes a table of customizable properties 1030, their default values 1040, and a field 1050 for entering personalized values.

Figure 11:
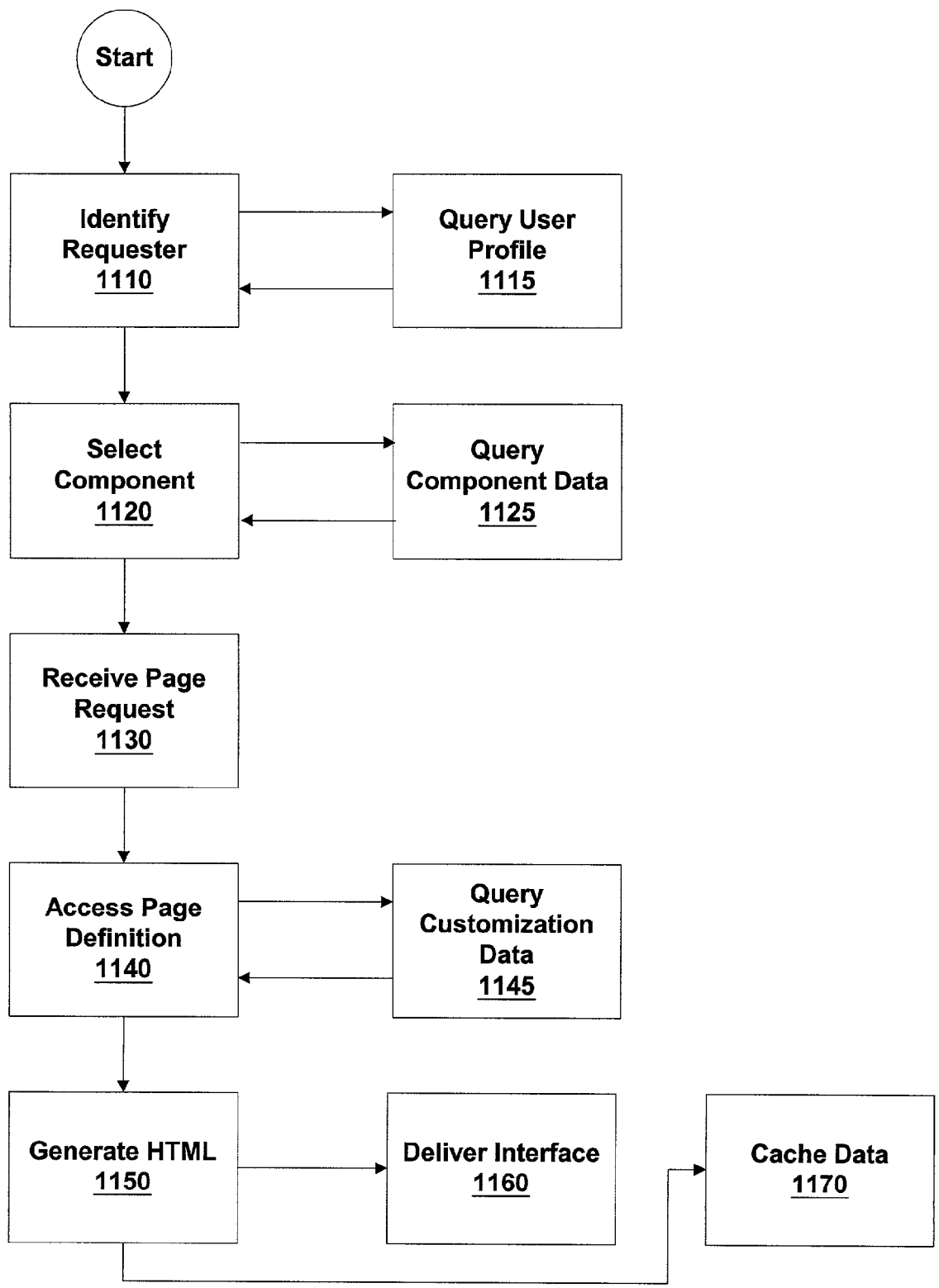
FIG. 11 illustrates examples of an initial presentation step and a presentation step.

FIG. 11 illustrates examples of initial presentation step 120 and presentation step 150 of FIG. 1. These steps both include generation of a customized user interface yet differ with respect to the availability of user modified personalization data 473 (FIG. 4). User modified personalization data 473 is available only after personalization step 130 and is therefore not always available during initial presentation step 120. Instances of customized application user interface 255 generated in steps 120 and 150 are delivered to a client for display to a user. The present invention anticipates that the steps illustrated by FIG. 11 are alternatively executed in a variety of sequences.

In an identify requestor step 1110 a user initiates communication with internet execution system 215. Identification is optionally made with respect to a specific user, class of users, specific client or class of clients. The requester may be a specific external client, a human user or, in some embodiments, an external process. In various implementations identity is established through a user ID provided from the client, by accessing a standard browser cookie (or similar data) on the client, by virtue of an established secure session, or by a similar approach as is well known in the art. The identity established in step 1110 is used by other processes whose function is user or client dependent.

For example, the identification made in step 1110 is optionally used to perform a query user profile step 1115. In step 1115 information relating to the requestor is retrieved from user profile 450. Once retrieved this information is typically available for personalization of application user interface 255 until the current session between the requestor and application execution system 215 is completed. In alternative embodiments query user profile step 1115 is performed as part of subsequent query operations, such as steps 1125 and 1145 discussed herein.

In a select component step 1120 the requestor selects one or more application components available through the current internet application. In some embodiments step 1120 is optional. For example, when only one application component is available or if all application components are to be made available. In some embodiments step 1120 is performed using a menu of application components.

Select component step 1120 may include an optional query component data step 1125. In step 1125 application component data 430 and/or configuration data is retrieved from data repository 240. Data retrieved in step 1125 may include all the metadata associated with each application user interface 255 associated with the application, metadata associated with components slected in step 1120, only page definitions relating to selected instances of application user interface 255, or some variation thereof. In alternative embodiments this data is collected during other query operations, such as step 1115 or step 1145.

In a receive page request step 1130 application execution system 215 receives a request for an instance of application user interface 255 from an external client such as web browser 310, wireless system 315, or external system 325 of FIG. 3. This request optionally includes a universal resource locator (URL) or similar locating information used to identify the particular application user interface 255 being requested. In some embodiments step 1130 includes a request for application data corresponding to values provided by the user. For example, step 1130 optionally includes search terms, keys or commands entered by a user in a field and used to retrieve application data. The search terms may be used as database keys that initiate the execution of processes related to the application component or are used to retrieve application data corresponding to the keys. Web application server 305 passes the page request to application server 309 that in turn initiates processes to fulfill the request. Receive page request step 1130 is typically performed each time the execution of the application component requires a new instance of application user interface 255.

Another process initiated by application server 309 performs an access page definition step 1140. Step 1140 is optionally performed prior to step 1130 and includes collection of information required to generate an instance of application user interface 255. The collected information includes data developed during page development steps 100 and 50 (FIG. 1) as well as data specifying customized properties such as configuration data 440 and personalization data 473. The collected data includes metadata defining characteristics of the instance of application user interface 255 and/or characteristics of individual user interface elements. The completion of step 1140 may be followed by execution of query customization data step 1145 wherein personalization data 473 or configuration data 440 is queried. Query customization data step 1145 is used to retrieve any additional data, such as configuration or personalization data, required to generate the application user interface 255.

In a generate HTML step 1150 application server 309 uses the metadata and other information collected to generate HTML. User Interface Generator 340 generates HTML by interpreting the metadata and using data collected from data repository 240 as required. Generate HTML step 1150 is concluded when references to required data are resolved and the data required to display a customized application user interface 255 is generated. This data optionally includes browser compatible formats such as JavaScript, HTML, WAP, and the like. Resulting valid HTML constructs are serialized, optionally packaged as a web page, and delivered to the client in deliver interface step 1160. Incorporation of personalization data 473 and/or configuration data 440 in the HTML results in an instance of application user interface 255 personalized or configured according to the wishes of a user. This instance optionally includes JavaScript or other data compatible with a standard (unmodified) web browser. Steps 1130 through 1160 are typically performed one or more times during the execution of an application component.

Metadata relating to specific user interface elements optionally specifies personalized or configured aspects of the requested page. In these cases relevant values from the customization data collected in the above steps are used in generate HTML step 1150. For example, in one embodiment a required user interface element is a button and user interface generator 340 uses personalization data associated with tab-over to decide whether the button should be included in the tab-order. In another embodiment the use interface element includes run time processing, such as when an application developer has specified that an expert entry mode is allowed. In this case user interface generator 340 uses personalization data specific to an individual user to generate responsive HTML and JavaScript.

In alternative embodiments the metadata includes or is used to construct a value or a reference, such as a pointer, URL, or a query, to another location. This may include a numerical value, such as a font size, or alternatively include more complicated data such as a segment of JavaScript or an e-mail address. This may also refer to, and be used to access, data records within configuration data 440, personalization data 473, directory server 375, or other aspects of Data Repository 240. Data records within configuration data 440 and personalization data 473 include supervisor or user modified information that becomes incorporated in a customized application user interface 255 delivered to the requester.

Access page definition step 1140, generate HTML step 1150 and the use of metadata are further illustrated by the following examples. In one embodiment of step 1140 a requested user interface includes a configurable user interface element with a user customizable text property (e.g., string or format) used to label the configurable user interface element. Application server 309 accesses a user interface definition related to the requested application user interface 255 that was developed in page development step 100 (FIG. 1). The user interface definition is retrieved during steps 1125 or 1145 and includes a specification indicating where on application user interface 255 the customizable user interface element should be located. The user interface definition also includes a reference to a data location where the text property of the configurable user interface element may be found.

A customized application user interface 255 optionally includes a number of configurable user interface elements, each further including a number of configurable properties. Data required to generate individual user interface elements is optionally collected at different times, even when the user interface elements are included in the same instance of application user interface 255. For example, in one embodiment the customizable order of columns in a table are determined when the application component using the table is selected in step 1120. In an alternative embodiment the order is determined when the information is first required in an instance of step 1140. Data relating to user interface elements responsive to the run time requirements of the application component, such as those including JavaScript, are typically collected in step 1145 shortly prior to generate HTML step 1150. The HTML and/or JavaScript generated in step 1150 is delivered to a client in deliver interface step 1160.

Once the HTML or JavaScript defining a user interface element is generated the generated data is optionally cached in a cache data step 1170. When possible the cached data is retrieved when the user interface element is next required. Retrieving a cached copy prevents unnecessary repetition of generate HTML step 1150. In addition, cache data step 1170 may include storage of other static aspects of the generated application user interface 255, such as page definitions, style sheets, images, and JavaScript.

The user interface generation process optionally operates independently from the type of data stored within DBMS Server 245 and the number of query operations required to generate a requested page. This independence enables the inclusion of references to customization data, such as configuration data 440 and personalization data 473, and inclusion of this data in the generated application user interface 255, without modification of the user interface design developed in page development step 100. The ability to include customized data without modifying page design is thereby achieved in an HTML/JavaScript interface supported by a standard browser.

An alternative embodiment includes multiple and/or recursive execution of query steps 1115, 1125 or 1145. Through the use of multiple query steps multiple levels of configuration and personalization are possible. For example, in one embodiment the result of a query step includes further metadata requiring a subsequent query to retrieve further data.

Steps 1125 and 1145 optionally use the requester identity determined in step 1110 to determine permissions and develop appropriate queries. For example, requester identity is used to determine which personalization data 473 to query and to resolve configuration data 440 whose scope is user dependent. In many instances the requestor identity is included as a parameter in a query.

Embodiments of the invention include configuration of user interface properties that include keystroke functionality. This allows users or supervisors to modify the response of user interface elements to keystroke combinations. Examples of keystroke configuration include customization of "tab-order," "tab-over," "hotkey," and "immediate access key" functionality.

Tab-order functionality determines the order in which the tab key changes "focus" among user interface elements. With respect to application user interface 255, the "focus" is the user interface element on which the cursor rests or to which action is directed. For text entry fields focus is usually indicated by the presence of a text cursor or highlighting of the text entry field. For buttons, other graphical objects and links the focus is typically indicated by a dotted line highlighting the object. Tab-order is typically determined by the sequential order in which elements are placed on a user interface or by the order of an original web page design. Customization of tab-order includes altering this default order. For example, in one embodiment the tab-order is changed to match the order in which data is preferably added to a form.

Tab-over is a particular case of tab-order that allows a user interface designer, supervisor, or user to indicate that certain user interface elements should be skipped in the tab-order. For example, a user can personalize an application component such that the tab-order ignores all buttons and graphic objects, stopping only at text entry fields where the user wishes to enter data. Alternatively, application user interface 255 is optionally customized such that the tab-order only includes text entry fields and a "next" button that is used to request the next required user interface.

A hotkey is a keystroke combination that results in the execution of an operation. For example, the Ctrl-C keystroke combination is often used to copy something to an electronic clipboard. Likewise, the Ctrl-S keystroke combination is often used to execute a "save" command. The inclusion of hotkeys in an internet application greatly increases the utility of the application. For example, including a Ctrl-N keystroke combination to automatically request the next page in an application component. In further examples, the Ctrl-K keystroke combination is optionally customized to display a help screen containing information relating to the user interface element with the current focus and Ctrl-5 is optionally customized to prompt a user for input. Hotkeys are generally used to save the user the trouble of using a pointing device to move a cursor to a graphical button, a potentially time-wasting action for an experienced user. Because hotkeys can have different meanings in various environments and to different users it is helpful for a user to be able to customize the hotkeys associated with an internet application. For example, the Ctrl-N keystroke sequence will cause the Microsoft Internet Explorers browser, in its standard configuration, to reload the existing page. Thus, this sequence would be a poor choice for requesting the next page when using this browser. Since hotkeys are either not available or not standardized in browser environments it is an important aspect of portability to be able to configure these keystroke combinations such that conflicts found in the different environments can be avoided.

Immediate access key functionality allows the focus on an application user interface 255 (FIG. 2) to be directed to a specific user interface element associated with an immediate access keystroke combination. For example, in one embodiment an immediate access keystroke combination is used to place a text cursor in a specific text entry field. The focus is changed to this text entry field upon typing of the immediate access keystroke, regardless of the prior focus location.

Figure 12:
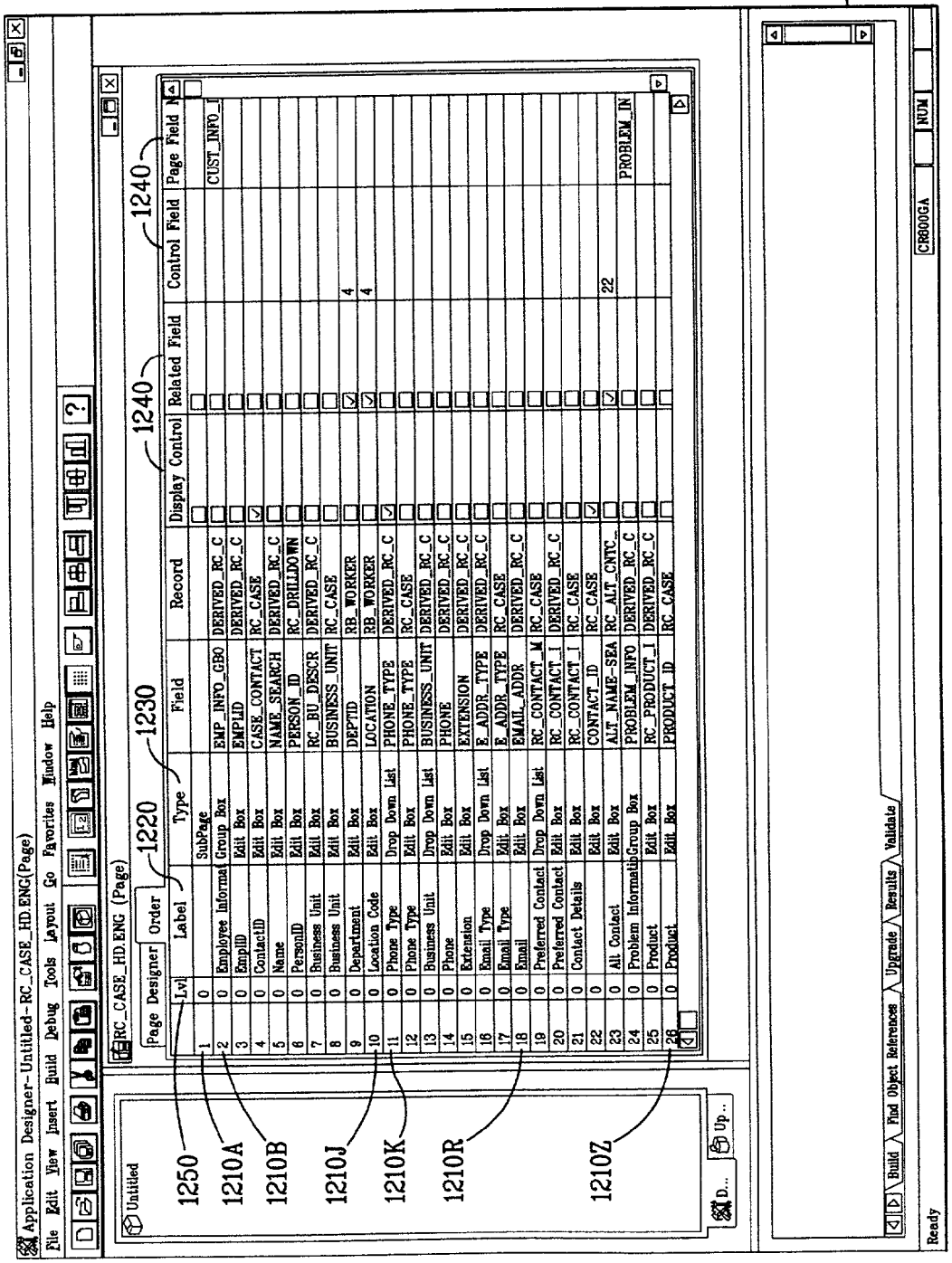
FIG. 12 illustrates a tab-order interface used for specifying tab-order.

FIG. 12 illustrates a tab-order interface 1200 used for specifying tab-order, and found in various embodiments of IDE 235 and, optionally, configuration interface 275. Tab-order interface 1200 includes a row 1210A–1210R for each user interface element on an associated application user interface 255. The columns of tab-order interface 1200 include a label 1220 identifying the user interface element and a user interface element type 1230, such as "EDIT BOX" or "DROP DOWN LIST," that describes a class of the user interface element. The columns also include various user interface element control settings 1240, and a user interface element level 1250. These entries are used to establish relationships and interdependencies between user interface elements. The tab-order is determined by the order of rows 1210, and optionally the level 1250 value or a control setting 1240. For example, in one embodiment the user interface element associated with row 1210J will be followed by the user interface element associated with row 1210K in the tab-order. Customization is accomplished by changing the order of the rows 1210. A similar interface is used to customize other keystroke functionality.

The row 1210A–1210R order illustrated in FIG. 12 is used during save page definition step 570 (FIG. 5) to generate metadata. This metadata references information about the tab order of various user interface elements, which in turn are used by components on application server 309 to generate the appropriate HTML code. Specifically, the metadata optionally includes either an appropriate value for a TABINDEX attribute of various user interface elements within the user interface, or includes JavaScript that "traps" the tab key when the focus is on the last object to which the user wishes to tab. This JavaScript is used to move the focus from the last object back to the first object. TABINDEX is an HTML parameter introduced in recent HTML standards and used to specify tab-order. The configuration of other aspects of keystroke functionality makes similar use of JavaScript or HTML keywords.

Figure 13A:
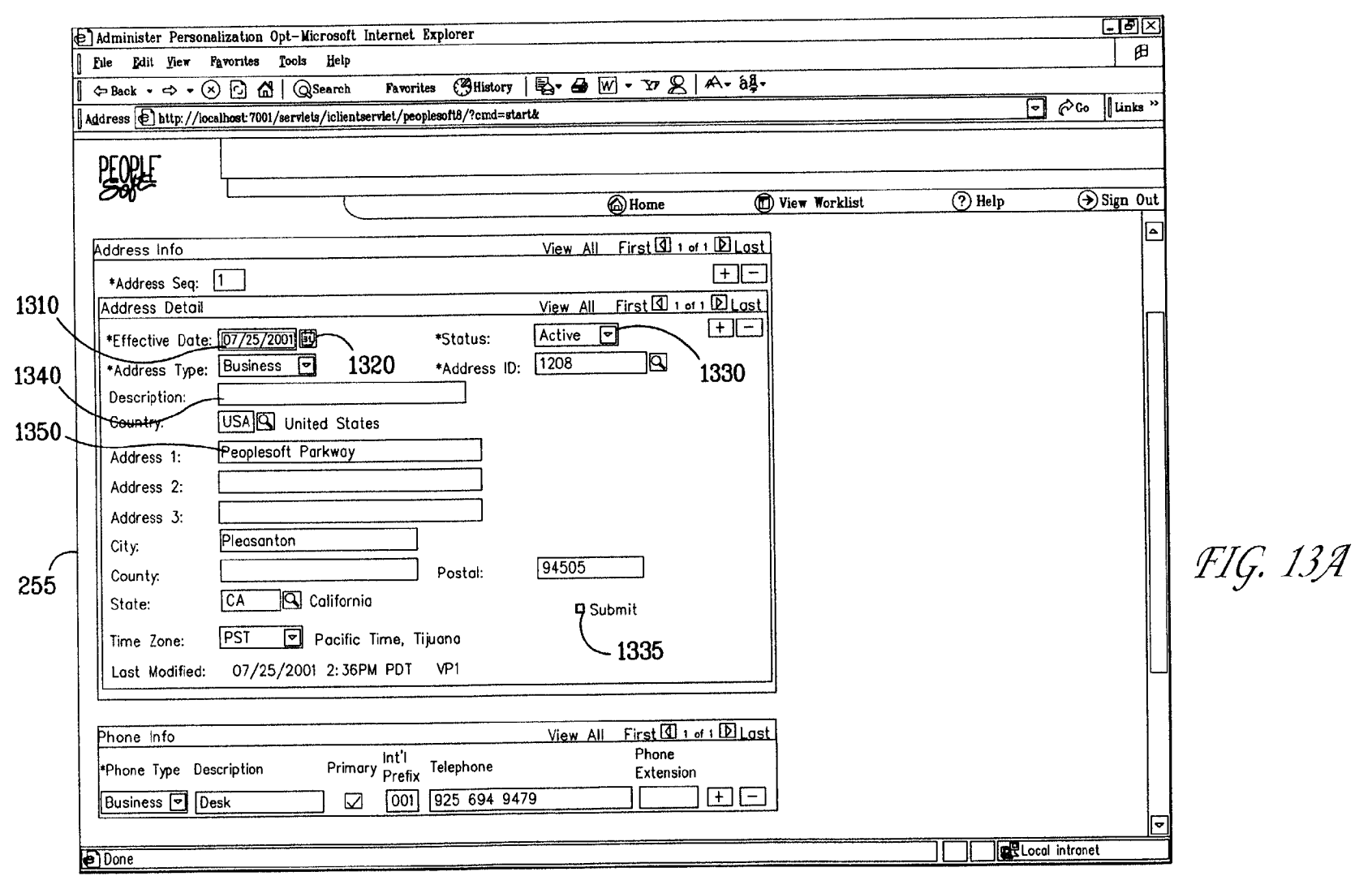
Figure 13B:
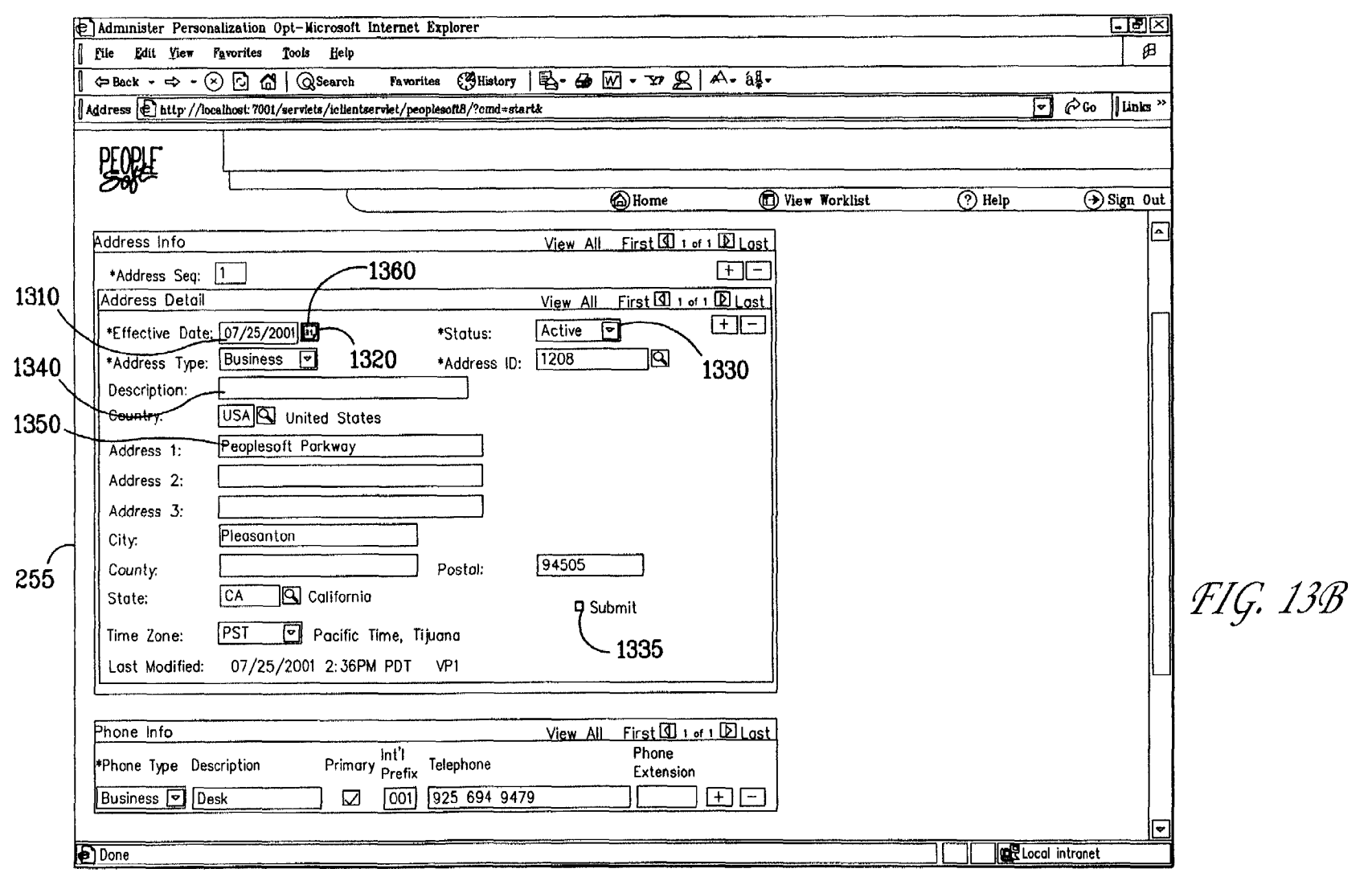
Figure 13D:
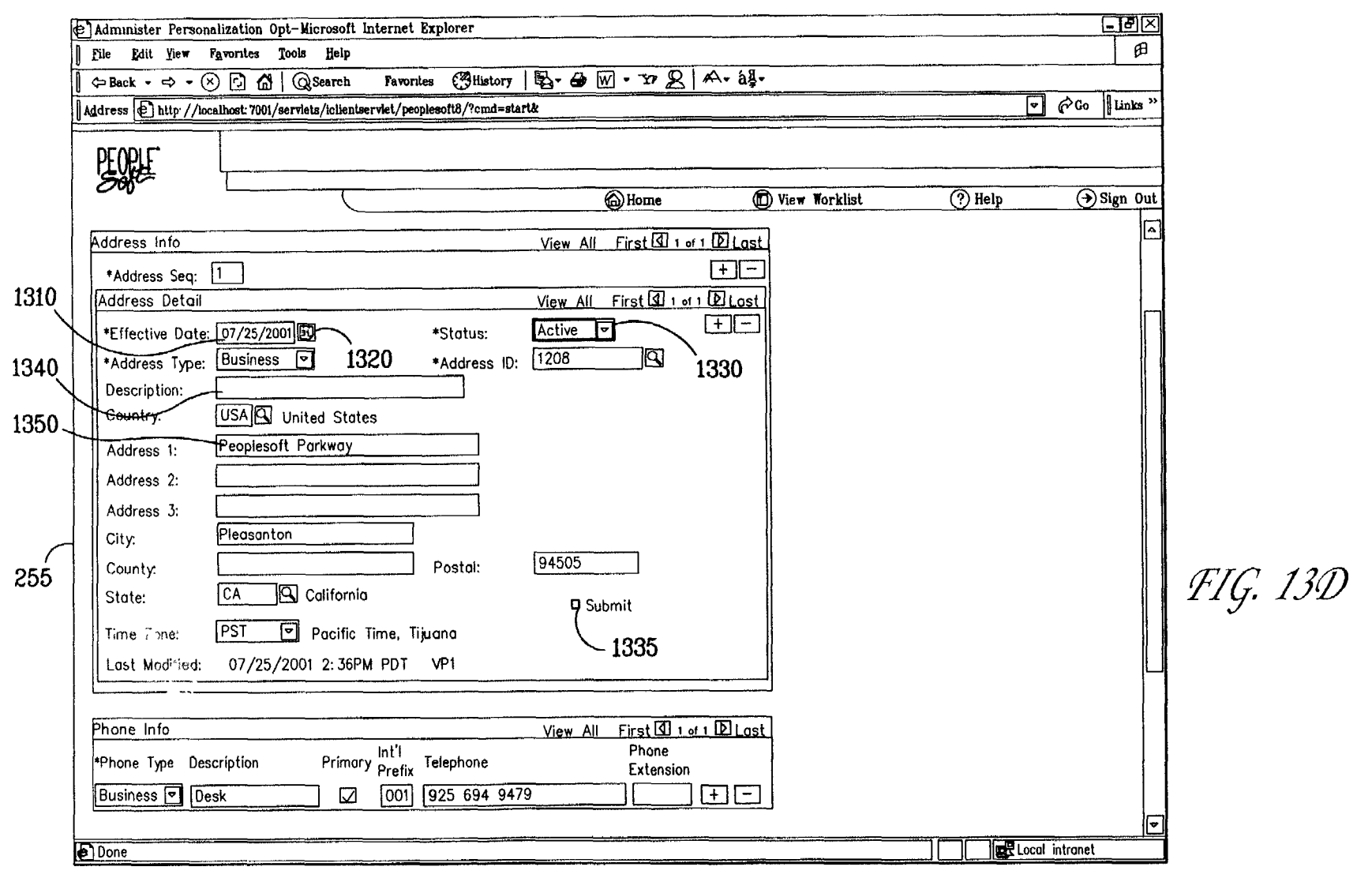
Figure 13E:
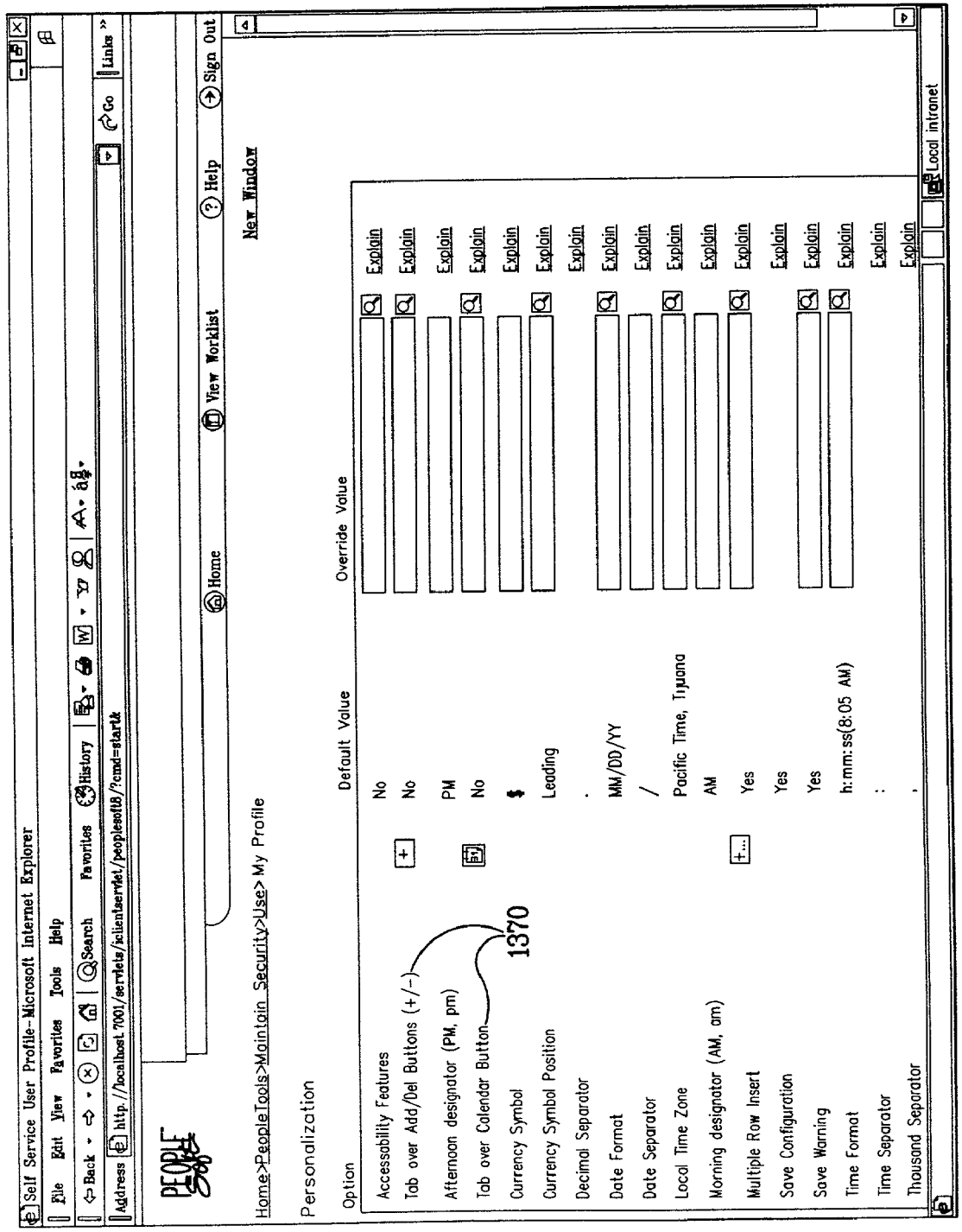
FIG. 13E illustrates an embodiment of a user profile interface including two options relating to tab-over.

FIGS. 13A through 13E illustrate customization of keystroke functionality in an embodiment of application user interface 255. FIG. 13A illustrates an address entry form, such as may be found in an order entry or customer management application component. The address entry form includes a date field 1310, a calendar button 1320, a "Status" drop down list 1330, a submit check box 1335, a description field 1340 and an "Address" field 1350 among others. In FIG. 13A the focus is on date field 1310 as indicated by the highlighting. By default, pressing the tab key moves the focus to calendar button 1320, as illustrated in FIG. 13B. FIG. 13C is an expanded view of a portion of FIG. 13B showing detail of a dotted line 1360 that indicates the presence of the focus on calendar button 1320. Pressing the tab key again moves the focus to status drop down list 1330, as shown in FIG. 13D. In one instance of tab-order configuration, the tab-order is changed such that the first pressing of the tab key moves the focus from the date field 1310 (as shown in FIG. 13A) to the status drop down list 1330 (as shown in FIG. 13D) and the second pressing of the tab key moves the focus from the status drop down list 1330 to description field 1340.

In one embodiment of tab-over customization, all button objects, such as calendar button 1320, are skipped in the tab-order. In this instance pressing the tab key for the first time moves the focus from the date field 1310, as shown in FIG. 13A, directly to status drop down list 1330, as illustrated in FIG. 13C. Using tab-over customization to skip calendar button 1320 in the tab-order reduces the number of keystrokes required for a consistent user to enter data in the address entry form. As with other tab-order customization, an individual user can typically turn on and off a button object skipping feature. FIG. 13E illustrates an embodiment of user profile interface 270 that includes two options 1370 relating to tab-over functionality.

Immediate-access keys and hotkeys are customized using methods similar to those used for customization of tab-over functionality. For example, in one instance of an order entry application component, a user interface element is configured to respond to a Ctrl-D hotkey combination by changing the state of submit checkbox 1335 (FIG. 13A) and generating a request for the next application user interface 255 (FIG. 2). In this instance JavaScript designed to handle the Ctrl-D key combination is generated using configuration data 440 (FIG. 4) and/or personalization data 473 along with the metadata associated with customized application user interface 255. Through a similar approach, a Ctrl-T immediate-access keystroke combination may be designated to change the focus from any other element to address field 1350.

The present invention provides significant customization of the ways in which data is presented to a user and the ways a user can interact with an application. For example, in one embodiment the stylistic properties of tables (grids) are customized. These stylistic properties include column titles, column widths, and similar aspects. In some embodiments customization of tables includes column order, sorting by a specific column, display of selected columns, and determination of the number of rows and/or columns to display.

Figure 14A:
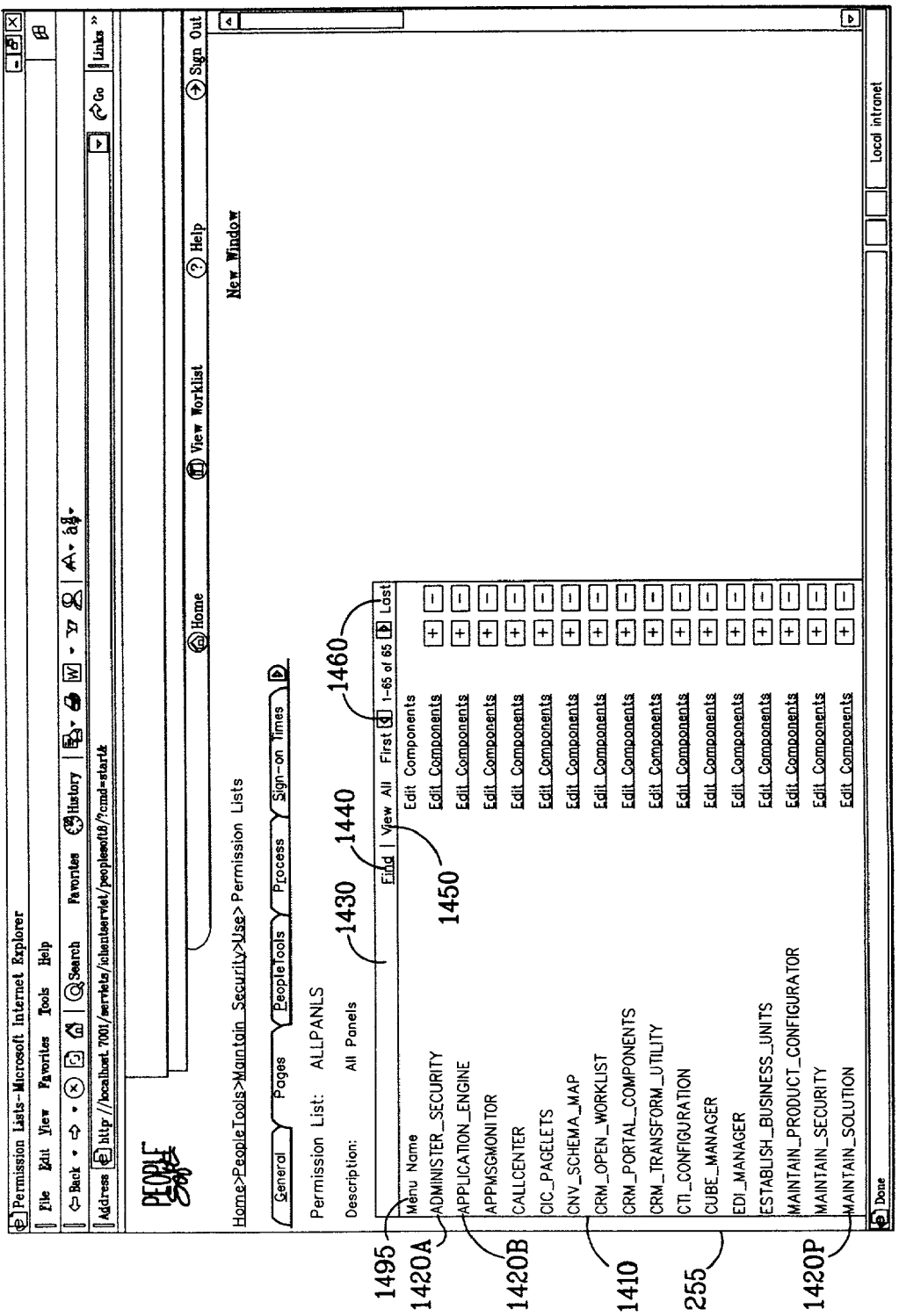
FIG. 14A illustrates an embodiment of an application user interface including a table showing the results of a query.

FIG. 14A illustrates an embodiment of application user interface 255 (FIG. 2) including a table 1410 showing the results of a query. Table 1410 includes multiple data rows 1420A–1420P and a customized menu bar 1430 with find command 1440, view all command 1450, and other navigation commands 1460 associated with the table. The commands included in customized menu bar 1430 are optionally selected using configuration interface 275. Menu bar 1430 is an example of an application component typically found in a library of application components accessed in step 50 (FIG. 1). The number of rows 1420 shown on a single application user interface 255 is customizable. Since the number of rows in a table 1410 is often more than is convenient to display on a single user interface, the table 1410 may be distributed across several application user interfaces 255. Navigation between these user interfaces is accomplished using navigation commands 1460.

Figure 14B:
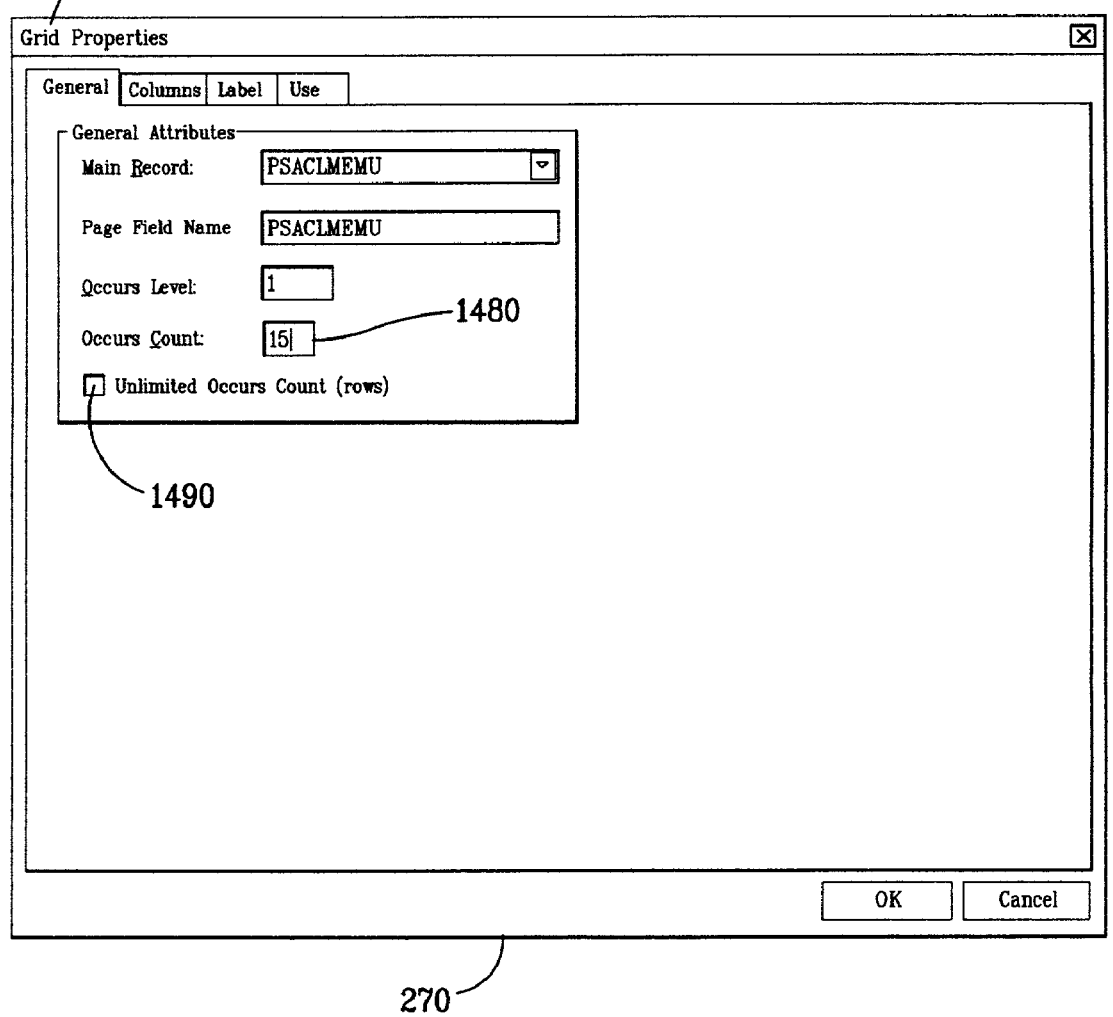
FIG. 14B illustrates an interface that is included in various embodiments of the IDE.

FIG. 14B illustrates an interface 1470 that is included in various embodiments of IDE 235, configuration interface 275, and user profile interface 270. Interface 1470 includes an occurs count field 1480 whose value determines the maximum number of rows 1420 displayed in an instance of application user interface 255. Interface 1470 also includes an unlimited occurs checkbox 1490. If this box is checked all available rows 1420 will be displayed on one application user interface 255 when the data is displayed. The configuration of table 1410 specified using interface 1470 is retained and used when application user interface 255 is revisited. Thus, a state of the customizable view all command persists between the present and any subsequent uses of application user interface 255.

The View All command 1450 (FIG. 14A) is a default aspect of menu bar 1430 when all rows 1420 in table 1410 are not visible in a single instance of application user interface 255 and instead are distributed over several instances of application user interface 255. FIG. 14C illustrates the result of executing the View All command. In this instance all of rows 1420 in table 1410 are shown in a single application user interface 255. These include rows, such as row 1420Q, not shown in the instance of application user interface 225 illustrated in FIG. 14A.

The number of rows 1420 (or columns) visible in an embodiment of application user interface 225 is resolved in presentation step 150 (FIG. 1). In step 150 application server 309 has access to all rows 1420 and a value is retrieved from DBMS server 245 to determine which of rows 1420 should be displayed in a particular instance of table 1410. This value is optionally retrieved from configuration data 440 or personalization data 473. In a typical embodiment all rows 1420 are temporarily cached in web application server 305 for immediate access.

The find command 1440 of menu bar 1430 (FIG. 14A) takes advantage of the access that application server 309 has to all rows 1420. Since this information is available, even though not displayed, the find command can search across all rows, including those that are not shown in the current interface 225. For example, in one embodiment a query returns a list of 100 results and occurs count field 1480 (FIG. 14B) is set to 20. When the results are returned, the first 20 rows 1420 are shown in table 1410. A user can use find command 1440 to search all 100 rows returned by the query, even if all results are not displayed on the current user interface. If the find command 1440 locates a result that is not shown in the current table 1410 a new application user interface 225 is generated that includes a new table 1410 with the found record. The find operation typically operates on the copy of all rows 1420 cached in web application server 305. The scope over which find command 1440 searches is user customizable. A user may choose to search over all rows, a fixed number of rows or only those rows displayed.

An optional sort operation takes advantage of the copy of all rows 1420 cached in DBMS server 245 in a manner similar to find command 1440. For example, in one embodiment of table 1410 a column heading 1495 is selected to display rows 1420 sorted by that column. The invention is able to perform this sort and display a new instance of table 1410 quickly by using the cached copy that includes all rows 1420.

An embodiment of the invention includes customization of the interaction models used for communication between internet application system 250 and the client displaying application user interface 255. These communications include complete delivery of user interfaces, web pages, user input from the client, and other messages between the client and web application server 305.

Figure 15:
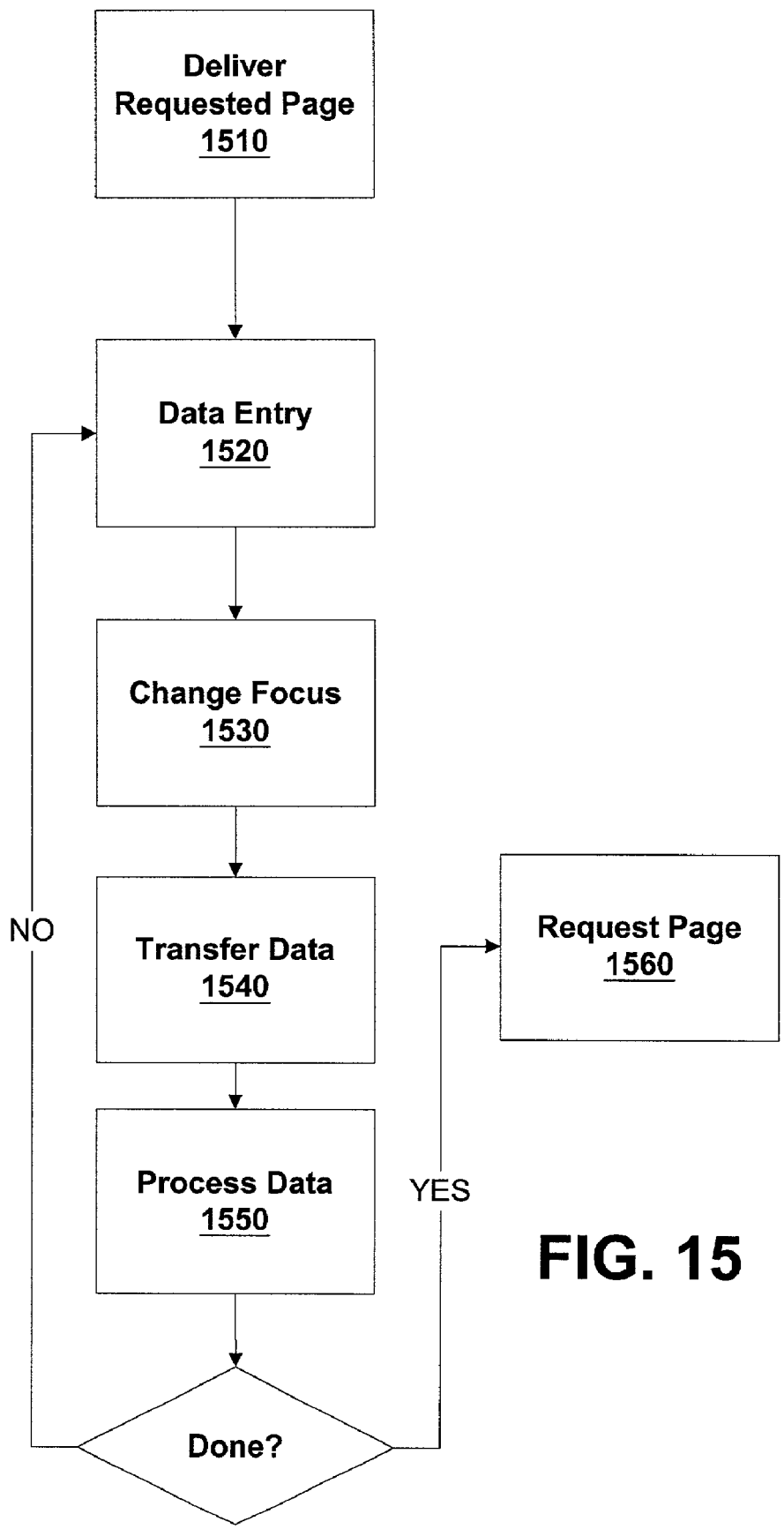
FIG. 15 illustrates an interaction model wherein data entered by a user is immediately transferred to the internet application system.

FIG. 15 illustrates one interaction model wherein data entered by a user is immediately transferred to internet application system 250. In a deliver requested page step 1510 application user interface 255 is delivered to the client. This application user interface 255 includes data entry elements such as text entry fields, check boxes, radio buttons, and the like. In a data entry step 1520 a user enters data into one of the data entry elements. This data entry includes entering text, changing a check box or radio button, or the like. In a change focus step 1530 the focus on the current user interface is changed to a user interface element other than the one used for data entry in step 1520. The change of focus indicates that data entry step 1520 is completed. In a transfer data step 1540 the user-entered data is transferred, using standard network protocols, to internet application system 250. In an optional process data step 1550 the transferred data is processed by internet application system 250. This processing includes actions such as range checking, delivery to application engine program 440, authentication, and the like. The processing optionally results in a response from internet application system 250 that is returned to application user interface 255. For example, if a value entered by a user is outside of an allowed range, an error message can be generated and sent to application user interface 255. Communication between application user interface 255, internet application system 250, and application server 309 can take a significant amount of time, thus slowing the data entry processes. Typically the page delivered in step 1510 includes several data entry elements. The steps 1520 through 1550 are repeated for each element until the data entry process is completed. If data entry is complete then a new page is requested in an optional request page step 1560.

Figure 16:
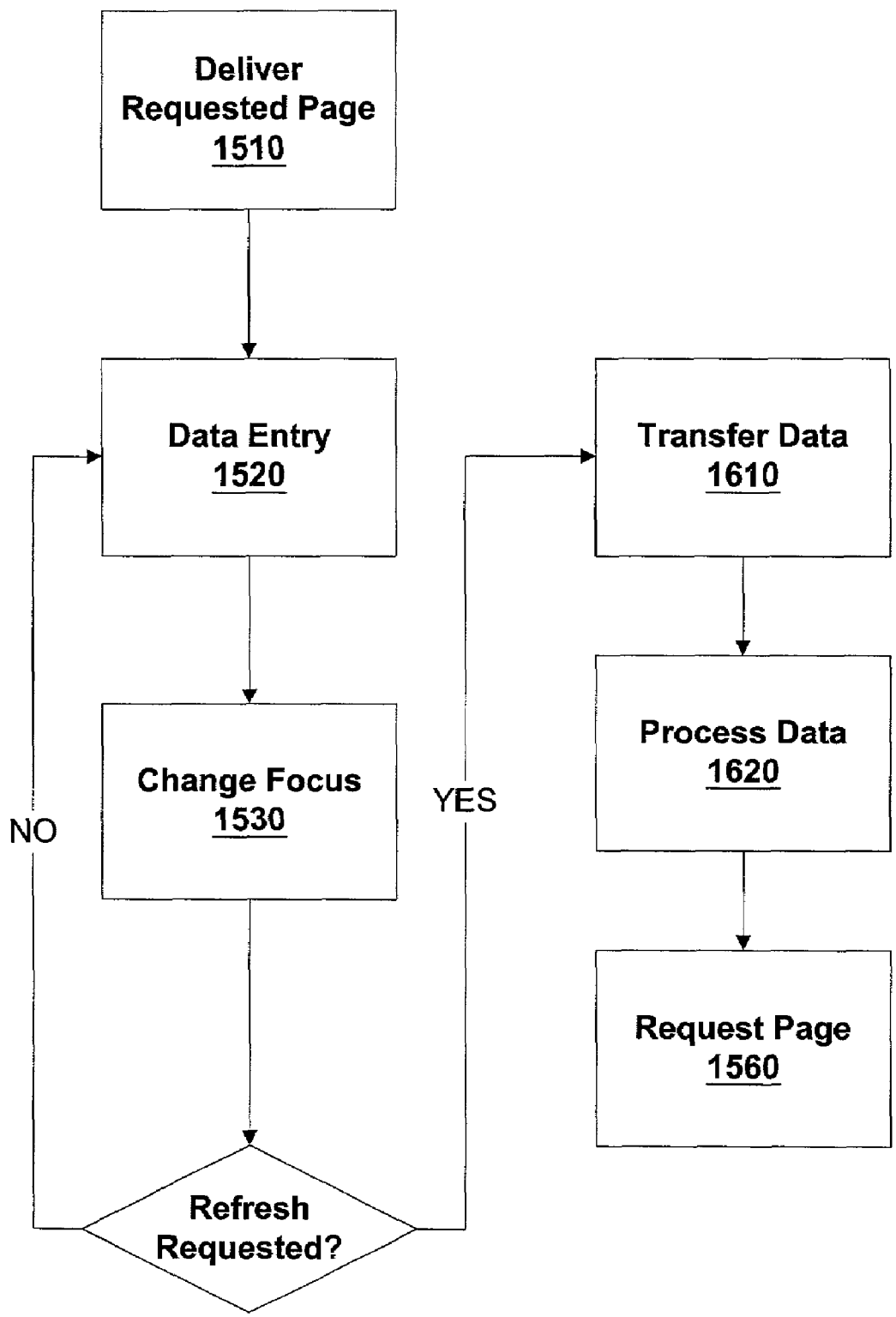
FIG. 16 illustrates an interaction model wherein communication between an application user interface and an internet application system is delayed.

FIG. 16 illustrates an alternative interaction model wherein communication between application user interface 255 and internet application system 250 is deferred. In this model steps 1510 through 1530 are performed in a manner analogous to the steps illustrated in FIG. 15. After change focus step 1530 the process returns to step 1520 unless a refresh has been requested. A refresh is specifically requested by a user, for example, by clicking a "refresh" button. A refresh is also initiated when a user requests a new user interface or when a user completes entering data in a user interface element or application component incorporating the interaction model illustrated in FIG. 15. User interface elements on a single instance of application user interface 255 optionally use different interaction models. If a refresh request is received then data is transferred between application user interface 255 and internet application system 250 in a transfer data step 1610. The data transferred in step 1610 includes data entered since the last data transfer between application user interface 255 and internet application system 250. The data may, therefore, include data entered into several data entry elements. In a step 1620, the data transferred in step 1610 is optionally processed by internet application system 250 in a manner analogous to step 1550 (FIG. 15). A next page is requested in an optional request page step 1560.

The "immediate" interaction model illustrated by FIG. 15 typically requires more frequent communication between application user interface 255 and internet application system 250 than does the "deferred" interaction model illustrated by FIG. 16. Consistent users may, therefore, prefer the deferred interaction model. However, the immediate interaction model allows more immediate recognition of errors in data entry than does the deferred interaction model. Casual users may, therefore, prefer the immediate interaction model.

One embodiment of the invention allows users to choose between these two interaction models. This choice includes customization (choice of model) by element, by type, by individual application user interface 255, by user, by application component, or by internet application.

Figure 17A:
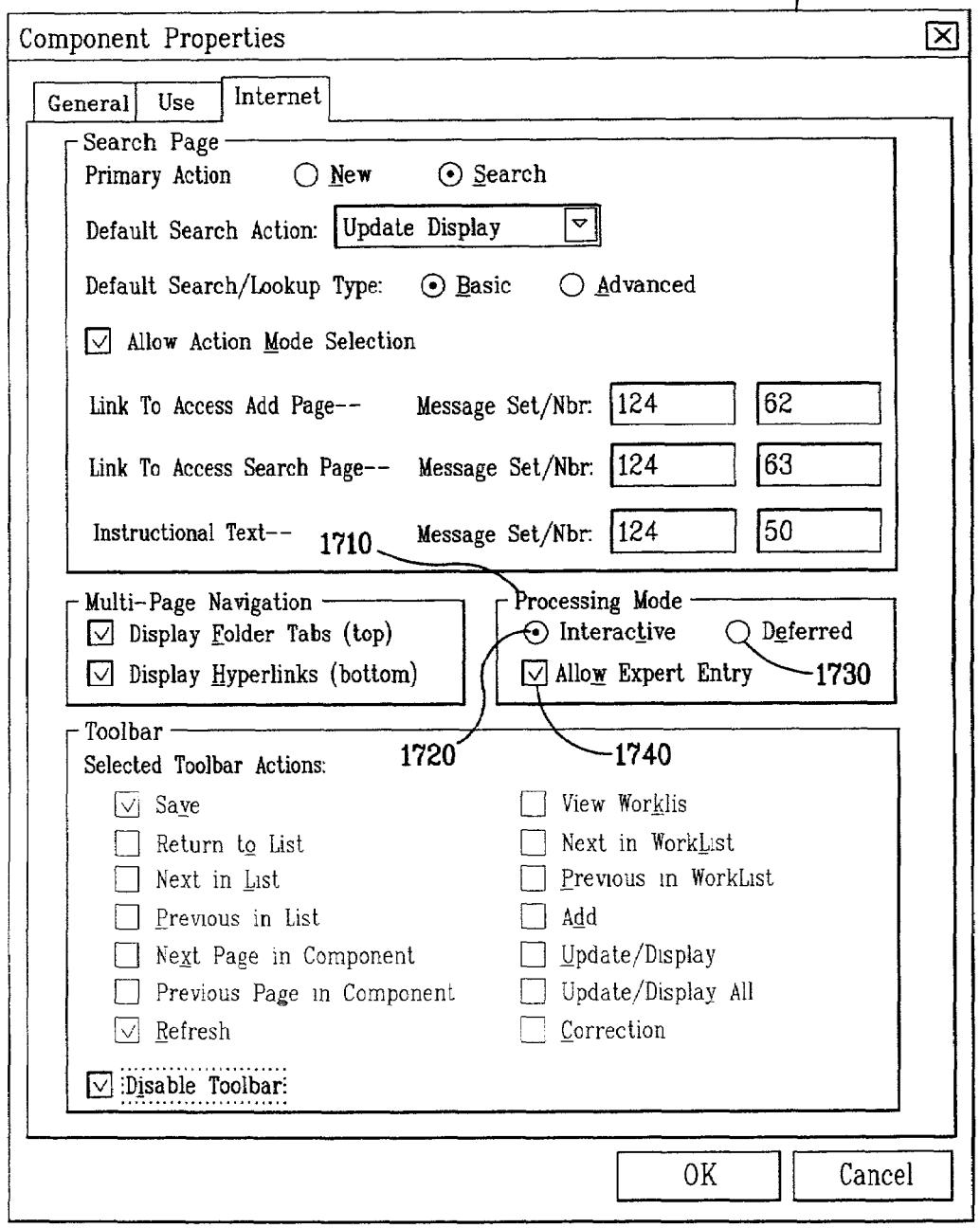
FIG. 17A illustrates an embodiment of a configuration interface arranged to allow customization of the interaction model used by an application component.

FIG. 17A illustrates an embodiment of configuration interface 275 arranged to allow customization of the interaction model used by an application component. A processing mode menu 1710 includes an interactive radio button 1720, a deferred radio button 1730, and an allow expert entry check box 1740. If the deferred radio button 1730 is selected, the deferred interaction model is used for the application component. Customization at the component level is subject to modification via further customization of more specific elements, such as individual application user interfaces 255 and user interface elements, within the component. If interactive radio button 1720 is selected the immediate interaction model is used for the component. When the interactive radio button 1720 is selected the allow expert entry checkbox is also available for checking or un-checking. If checked, then component interfaces of this application component will include an option that allows a user to change the interaction model while the internet application is running. An example of this option is illustrated in FIG. 17B.

FIG. 17B illustrates an instance of application user interface 255 for entering address data. An expert entry checkbox 1760 allows users to change the interaction model from "Expert Entry" (immediate) to "Standard Entry" (deferred) during execution of the internet application. The expert entry checkbox is an embodiment of an interaction model control command. Checking the expert entry checkbox 1760, which has an effect similar to selecting the deferred radio button 1730 (FIG. 17A) in a page development step 100, configuration step 110, or personalization step 130, places application user interface 255 in the Expert Entry mode. For example, in the Expert Entry mode, entering an invalid date (such as a date in the future) in date entry field 1770 does not immediately result in an error message when the user moves the user interface focus to the text entry field 1780. The error message is not displayed because the business logic routine, designed to check for an invalid date, is not invoked until a submit checkbox 1790 is checked. In contrast, the Standard Entry mode is used if the expert entry checkbox 1760 is not checked and the interactive radio button 1720 (FIG. 17A) is not selected. In this mode an error message is immediately displayed when an improper date is entered in date entry field 1770 and focus is changed from date entry field 1770 to, for example, text entry field 1780.

The systems and methods of the present invention are used to customize other aspects of internet applications. For example, "Internationalization" includes alternative currencies, date formats, time calculations, and text language. Aspects of internationalization such as these are customized in methods similar to those used for configuration of other user interface elements. In another example, user interface elements are adjusted to conform to the Americans with Disabilities Act. These adjustments include increases in user interface element size, changes in text size, and optimized cursor placement (focus) that reduces the effort required for a user to navigate a user interface. They are also used to adjust application user interface 255 to be more amenable to screen reading software.

Embodiments of the invention include instances of application user interface 255, or similar HTML based interfaces, with customizable features designed for access using text based and/or audio access devices. These devices preferably receive an HTML based interface as streaming text. For audio devices, such as those used by visually impaired users, the streaming text is optionally "read" out loud using a text reader. The customizable features allow a user to customize an HTML based interface to be more easily interpreted, when delivered via streaming text, than would an un-customized version.

In some embodiments, a user may customize customizable application system 200 to deliver application user interface 255 to a client, such as programmable device 323 (FIG. 3), in at least a "standard layout mode" and an "accessible layout mode." Accessible layout modes include modifications or added components configured to improve the accessibility of the interface to users with one or more specific disability or to users desirous of operating in a non-visual mode (e.g. while vision is used for operating machinery or driving a vehicle). The standard layout mode is configured for visual display including graphics such as in a graphical user interface. The improvement is made relative to the standard layout mode in which application user interface is delivered and displayed for a typical user without disabilities. There may be a plurality of accessible layout modes including several levels of accessibility features that can be selected by a user. The plurality of layout modes is optionally specified and defined by an application developer using IDE 235 (FIG. 2). In this example, IDE 235 is used to specify data characterizing one or more of the plurality of layout modes. The specified data may include, for example, PeopleCode® defining algorithms for determining user interface element order, data used in executing rules for modifying HTML, data for defining positions of user interface elements within an HTML based interface, data for removing HTML tables from an HTML based interface, or the like.

Access devices that benefit from the accessible layout mode include systems with an audio only output or systems with text only or limited graphics displays. Systems with audio only output include, for example, loudspeakers, earphones, standard telephones, radios, music players and the like. These audio systems typically operate by reading a stream of text and generating a verbal interpretation. Devices with text only or limited graphics displays include alphanumeric handheld devices, personal digital assistants, telephones with a digital display, and the like.

Figure 18A:
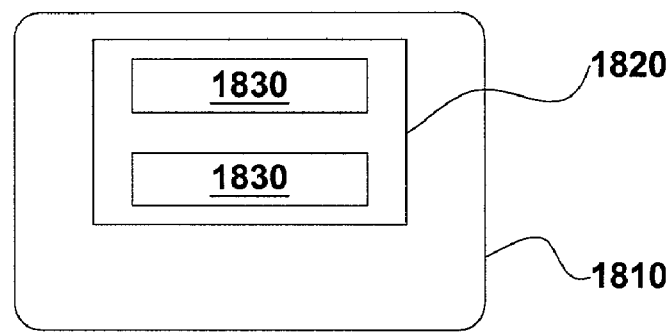
FIG. 18A illustrates a handheld device with a display configured for two lines of text.
Figure 18B:
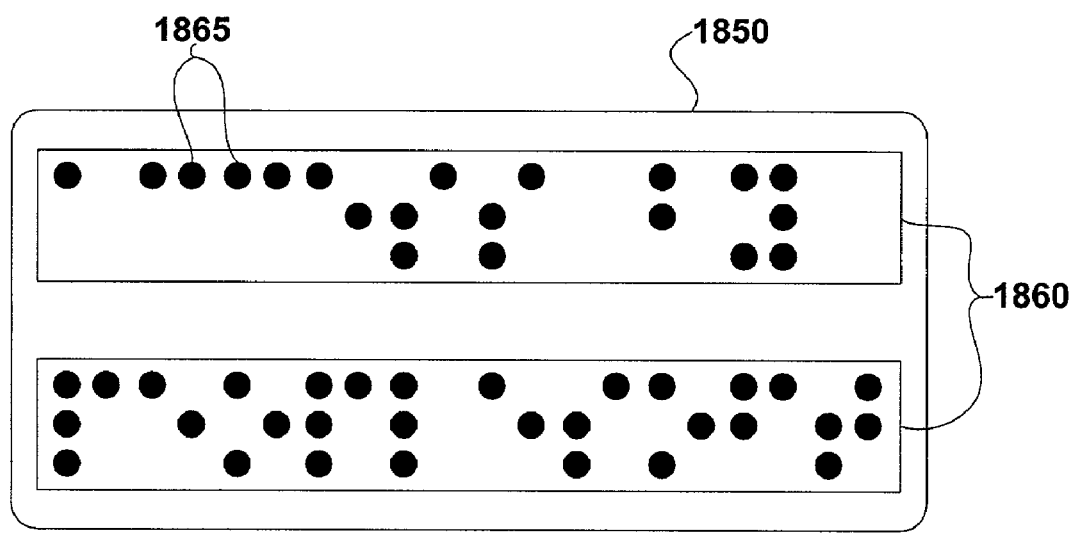
FIG. 18B illustrates a Braille reader.

FIGS. 18A and 18B illustrate embodiments of text based access devices on which application user interface 255 or similar HTML based interface may be viewed as streaming text. FIG. 18A shows a handheld device 1810 with a display 1820 configured for two lines 1830 of text. When or after receiving streaming text, handheld device 1810 scrolls characters across display 1820 where they can be viewed by a user. FIG. 18B shows a Braille reader 1850 wherein streaming text is converted to rows 1860 of small bumps 1865 designed for tactile interpretation. To display streaming text, Braille reader 1850 either updates rows 1860 periodically or moves small bumps 1865 such that characters move beneath a reader's finger.

Figure 19:
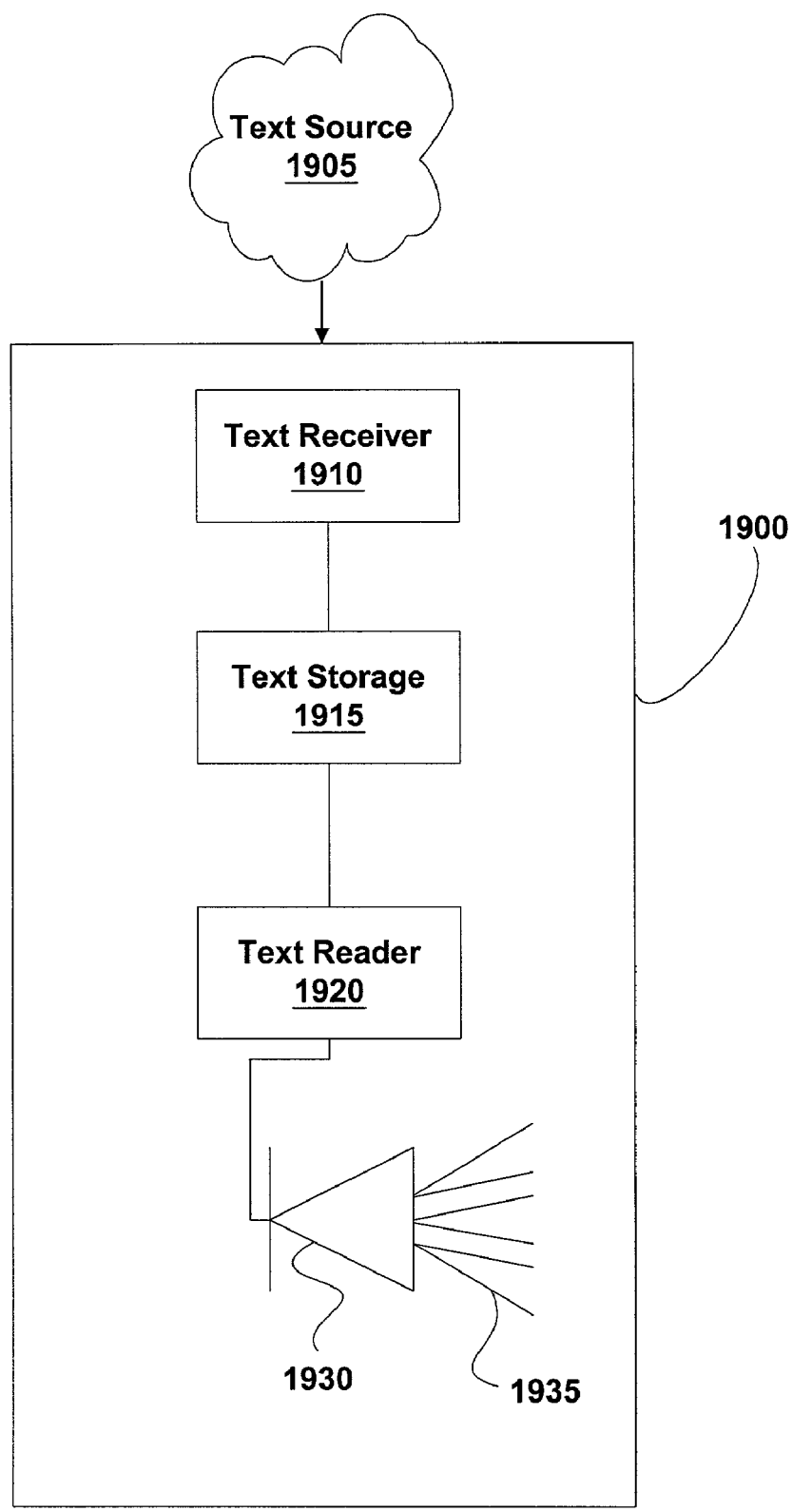
FIG. 19 is a block diagram of an access device 1900 with an audio output.

FIG. 19 is a block diagram of an access device 1900 with an audio output. Access device 1900 includes a text receiver 1910 configured to receive a streaming text version of application user interface 255 from a text source 1905 such as customizable application system 200. The received text is stored in an optional text storage 1915 before being sent to a text reader 1920. Text reader 1920 is optionally a commercial application such as Microsoft Reader®, HelpRead™ or TextAssist®. Text reader 1920 generates an electronic signal used to drive a speaker 1930. The electronic signal is configured such that the received text is converted to sound 1935 that can be heard by a user. In alternative embodiments text reader 1920 is located within a separate device.

Audio output access devices benefit from embodiments of application user interface 255 customized for delivery as text streams. Reading programs such as text reader 1920 are designed to convert HTML text into a verbal recitation of the user interface. For example, using an HTML reading program a blind user can listen to the contents of a web page being read to them. Typical reading programs are configured to skip most markup language within the HTML source code of an HTML based interface, such as application user interface 255, and convert the remaining text to speech.

Conversion of an HTML based user interface to a text stream typically results in loss of information. For example, images or graphics are simply replaced by "ALT" text that attempt to convey information about the image contents. In addition, reading programs generate audio output responsive to the order in which user interface components appear in the HTML source file. This order may be substantially different from the organization of components as visually displayed on an instance of application user interface 255 using the standard layout mode. For example, common practice includes arranging user interface elements in both vertical and horizontal relationships. This arrangement is often facilitated using HTML's standard table structure. Consider, as an example, an order entry page where a "buy" button may be located either in a column to the right of an item description or, alternatively, in a row below the item description. Without visual clues, such as their relative physical location or the spacing between the button, the description and other elements of the interface, the association between an item description and a button is lost and the HTML based interface loses its utility. This loss occurs in standard methods wherein the HTML based interface is blindly converted to text or audio output in a standard way.

Figure 20A:
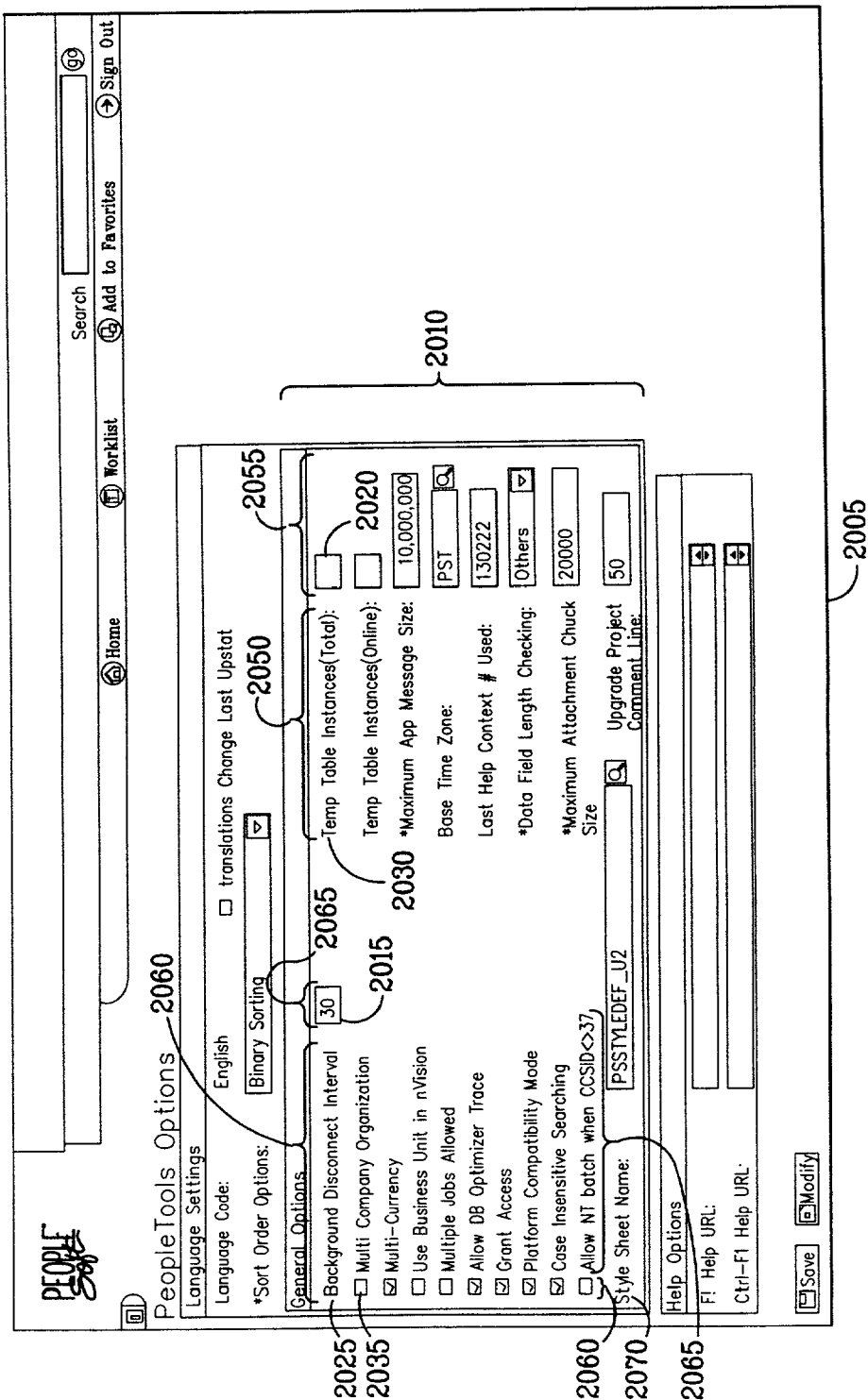
FIG. 20A illustrates an interface displayed in a standard layout mode.

FIG. 20A illustrates an interface 2005, optionally an instance of application user interface 255, displayed in a standard layout mode. This embodiment of an HTML based interface includes a region 2010 configured using an HTML table structure via the standard <table> and </table> tags. Within the HTML source code used to generate region 2010, the order of user interface elements is text input box 2015, text input box 2020, text 2025, text 2030, check box 2035, and text 2040, etc. Since a streaming text interpretation interface 2005 serially interprets HTML source code, the above order is reflected in the streaming text output. Interpretation of this HTML by a reading program, therefore, results in an output wherein the associations between input boxes and text labels are lost. For example, a streaming text interpretation of FIG. 20A may include the text, "Text input, text input, background disconnect interval: Temp Table Instances (Total), checkbox, multi-company organization." The user interface element order as perceived by the ear would be substantially different than that intended by a developer of interface 2005. For instance, in an audio presentation, text input box 2015 is separated from its label text 2025 by text input box 2020. The visually apparent association between text input box 2015 and text 2025 is, therefore lost in presentations based on streaming text.

FIG. 20B illustrates an embodiment of interface 2005 of FIG. 20A displayed in an accessible layout mode. This instance of interface 2005 is displayed when a user or a privileged user has used configuration system 225, personalization system 220 or the like to select an accessible layout mode. The accessible layout mode is optionally customized to apply only to a specific user, user group, client, application, application component, or version of application user interface 255.

The version of interface 2005 shown in FIG. 20B differs from the version shown in FIG. 20A. For example, the table format is no longer used to arrange interface elements. The tags, such as <table>, used to specify an HTML table have been removed from the HTML source code. In the "table free" source code used to generate this accessible version of interface 2005, the user interface element order is text 2025, text input field 2015, check box 2035, text 2040, check box 2045 and text 2050, etc. A streaming text interpretation may therefore include the text: "Background Disconnect Interval: text input box, checkbox, Multi-Company Organization, checkbox, Multi-Currency." The order of user interface elements is different than that resulting from the layout shown in FIG. 20A. In contrast with the streaming text interpretation of FIG. 20A, each input field is immediately before or after its associated label. The intended logical relationships between user interface elements are therefore more easily understood by a user. In the accessible layout version, elements that were within the third column 2050 and forth column 2055 of the table of region 2010 in FIG. 20A are instead located following most elements of the first column 2060 and second column 2065. For example, text 2030 and text input box 2020 are placed below a row 2070 as shown in FIG. 20B. Rearrangement of these columns are based on table deconstruction methods described further below.

When interpreted as streaming text or heard in an audio format, the version of interface 2005 illustrated in FIG. 20B more clearly preserves relationships between interface elements than the version illustrated in FIG. 20A. For example, as discussed above, text input field 2015 is intended to be associated with text field 2025. However, as explained above, in an audio interpretation of the version of FIG. 20A based on streaming text, unrelated text input field 2020 would be described by a text reader between text input field 2015 and text field 2025. In contrast, an audio interpretation of the version illustrated in FIG. 20B describes text input filed 2015 immediately following a description of text 2025. The order of FIG. 20B preserves more clearly the association intended by the application interface developer. Therefore, as viewed as streaming text or heard by a user, the order of FIG. 20B is more easily understood than the order of FIG. 20A.

Element order in accessible layout mode is optionally determined by element groupings indicated by an application interface developer. These groupings are defined using HTML tags generated using IDE 235 or the like. For example, in one embodiment the application interface developer executes IDE 235 commands to place the HTML tags "<Fieldset>" and "</Fieldset>" around groups of elements. In accessible layout mode, user interface generator 340 detects these tags and keeps the tag surrounded groups of user interface elements together in the generated HTML. These user interface elements are, therefore, also kept together in audio or streaming text versions of application user interface 255. In the example illustrated by FIG. 20B <Fieldset> and </Fieldset> tags could be used to keep the user interface elements within the "Language Settings" box 2075 together and to keep the user interface elements within the "General Options" box 2080 together.

In some embodiments of the present invention tab-order is used to determine element order in accessible layout mode. In these embodiments, the order of user interface elements may be set equal to the tab-order, when a tab-order is indicated. Tab-order may be determined by an application interface developer or, as described herein, customized by a user or privileged user. In this way, a user or privileged user can customize the order of user interface elements in accessible layout mode by customizing tab-order of the user interface elements. The customized order is reflected in streaming text and audio presentations of application user interface 255 or other HTML based interfaces.

Figure 21:
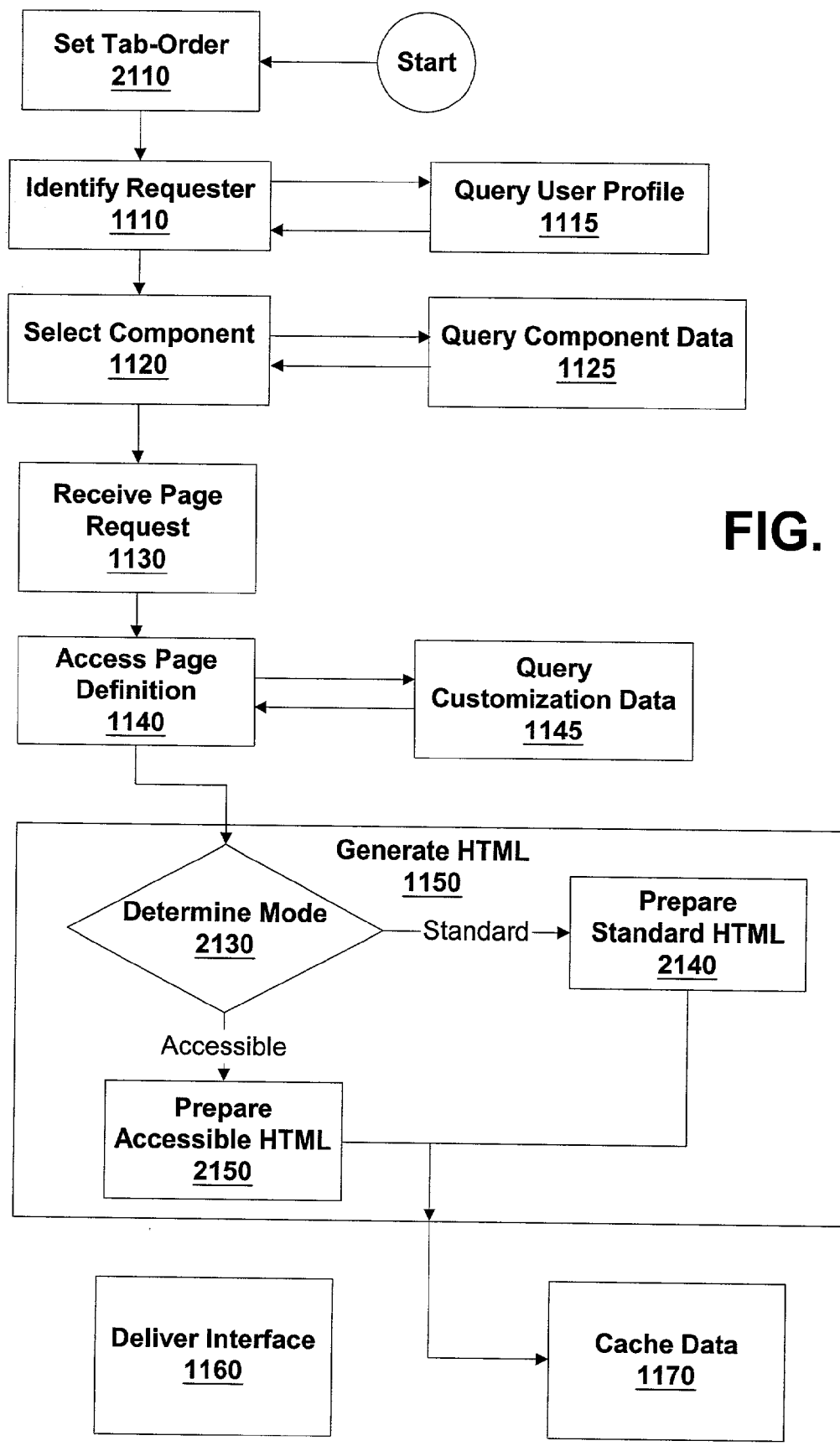
FIG. 21 illustrates a method by which tab-order is used to determine user interface element order in an accessible layout mode.

FIG. 21 illustrates an embodiment of a method by which tab-order is used to determine user interface element order in an accessible layout mode. In a set tab-order step 2110 the tab-order of user interface elements within an HTML based interface, such as application user interface 255, is set. The tab-order is optionally set by an application interface developer at the time the interface is developed. The application interface developer can use IDE 235 to set a standard HTML "tabindex" value for interface elements. In set tab-order step 2110 the tab-order may also be customized by a privileged user or a user using configuration system 225, personalization system 220 or the like.

The method proceeds using steps 1110 through 1170 of FIG. 11. In this embodiment, referring again to FIG. 21, generate HTML step 1150 includes a determine mode step 2130, a prepare standard HTML step 2140 and a prepare accessible HTML step 2150. In determine mode step 2130, internet application system 250 determines if the application user interface 255 is to be displayed in standard layout mode or an accessible layout mode. The mode to be used for display is optionally predetermined either by indicating a preference using configuration system 225 or personalization system 220 (FIG. 2) and saving the preference in configuration data 440, personalization data 473, data repository 240 (FIG. 4) or the like. In this case, determine mode step 2130 includes reading the saved preference. Alternatively, a preferred mode may be indicated by storing appropriate data in a client-side cookie accessible to internet application system 250 or by posting data with a hyperlink. In these cases, determine mode step 2130 includes accessing the cookie data or responding to the selected hyperlink.

Prepare standard HTML step 2140 is executed if the standard mode is found in determine mode step 2130. The standard mode does not include modification of HTML for the purposes of changing accessibility. Alternatively, prepare accessible HTML step 2150 is executed if an accessible layout mode is indicated in determine mode step 2130. In prepare accessible HTML step 2150, HTML is modified to increase accessibility through text based and/or audio devices. These modifications include changes in user interface elements and user interface element order, such as those discussed herein. In one embodiment, step 2140 or 2150 is followed by deliver interface step 1160 or cache data step 1170.

In an alternative embodiment an HTML based interface is generated by first using prepare standard HTML step 2140 to generate the HTML based interface in standard layout mode. The generated HTML based interface is then converted to an accessible layout mode using processes similar to prepare accessible HTML step 2150.

In various embodiments of the present invention the accessible layout mode includes page content specified by an application developer for use in accessible layout mode. This content is configured to orient a user receiving streaming text or listening to an audio presentation of application user interface 255. For example, in one embodiment of an accessible layout mode standard ALT text is associated with images, image pushbuttons or hyperlinks, and is included in HTML delivered as part of streaming text. In standard layout mode and in a graphical display this text is not normally seen by a user unless, for example, an image is not found or a the cursor is held over an object. In alternative embodiments an application developer specifies a plurality of alternative text that may be included in the HTML responsive to the current layout mode. For example, the application developer may specify "Buy" as ALT text to be displayed in standard layout mode and "Buy Button for Preceding Item" as alternative ALT text to be displayed in an accessible layout mode. Thus, the ALT text used in an accessible layout mode optionally includes more specific information than the ALT text used in standard layout mode. In the accessible layout mode the alternative ALT text is included in delivered HTML as text that will be presented as streaming text output or read by a text reader such as text reader 1920 (FIG. 19). ALT text is optionally stored in a database, such as in a database of data repository 240, and retrieved at the time of HTML generation.

Figure 22:
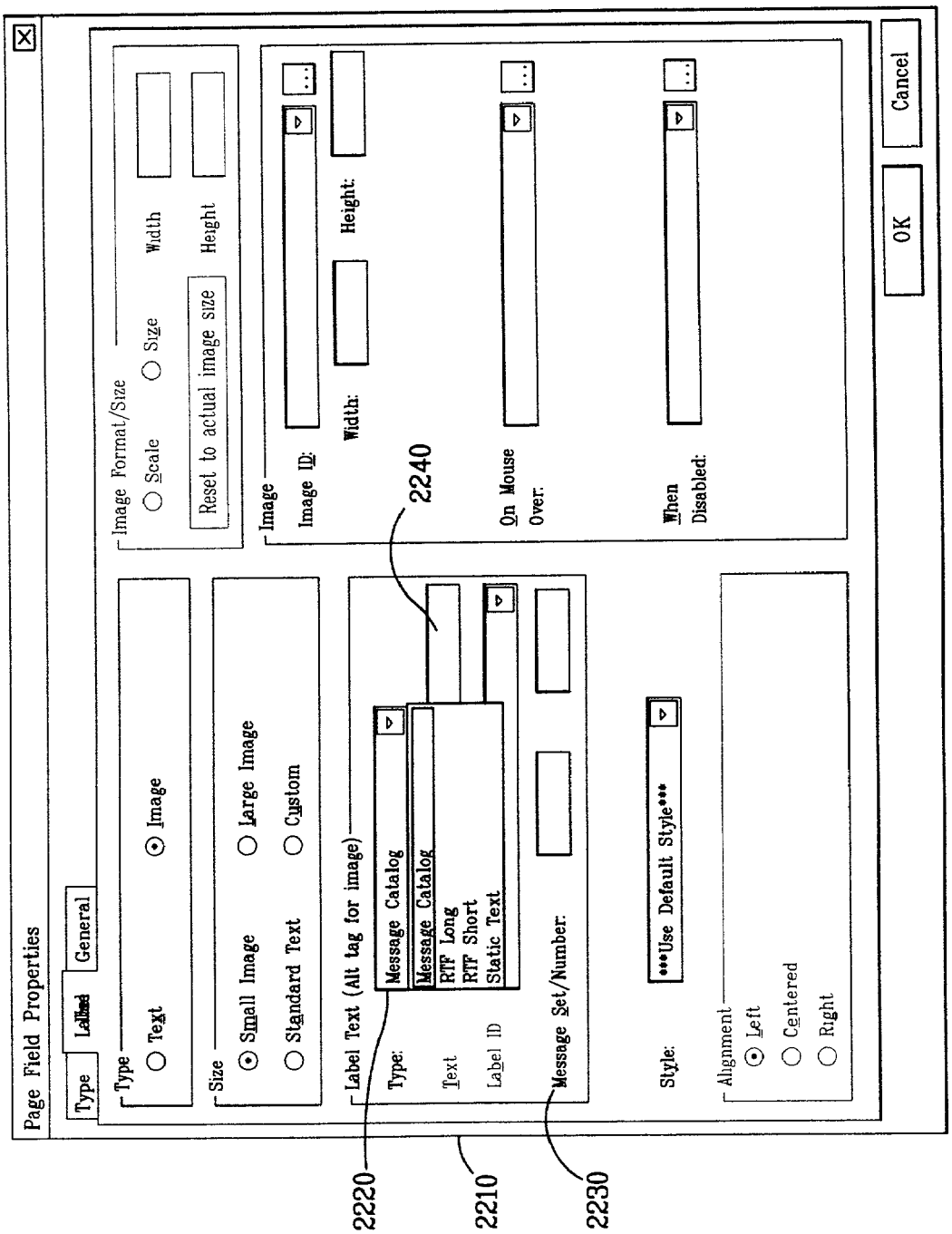
FIG. 22 illustrates a data entry window used to specify ALT text.

FIG. 22 illustrates a data entry window 2210 used to specify ALT text. Window 2210 is included in some embodiments of application development system 210 and is configured to specify ALT text for text, image or other interface elements. A dropdown box 2220 allows selection of ALT text type. Options include "Static Text" which includes plain ASCII text and "RFT Long" and "RFT Short" which include Rich Text. If these text types are used, a text entry field 2240 is made available to specify particular ALT text as desired. Also available is a "Message Catalog" text type. Using the Message Catalog option ALT text can be retrieved, using a "Message Set/Number" index 2230, from a text database. The text database includes previously specified text and is optionally included in DBMS server 245 and optionally includes ALT text for use in specific layout modes.

In various embodiments of the present invention instances of application user interface 255 or other HTML based interfaces include other additional page content designed to help indicate relationships between interface elements when presented in accessible layout mode. This additional content is automatically supplied by user interface generator 340 and need not be specified by an application developer using application development system 210. User interface generator 340 produces additional content by interpreting HTML that would be included in an unaltered instance of the application user interface 255. For example, in embodiments of prepare accessible HTML step 2150 (FIG. 21), textual page content is added to the application user interface 255 being prepared. An illustration is shown in FIGS. 23A and 23B below.

Figure 23A:
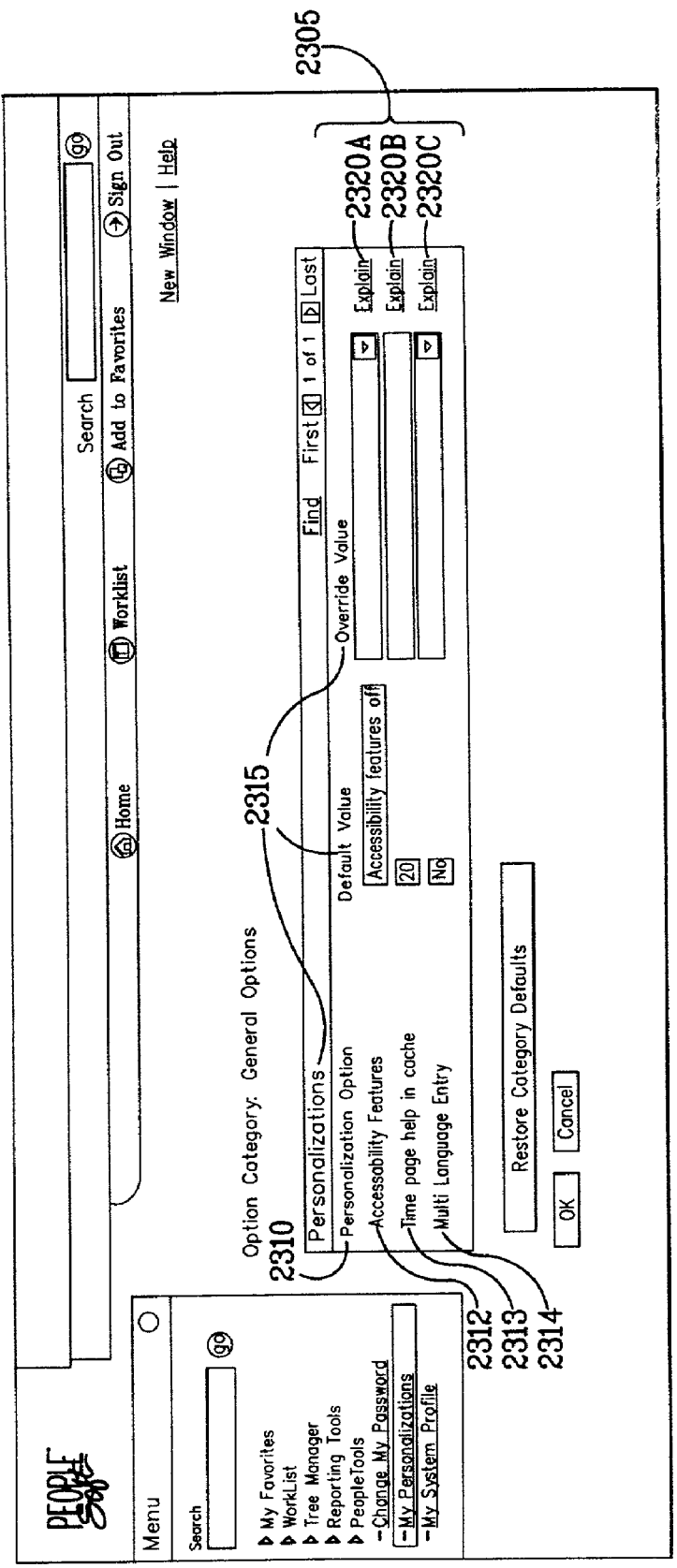
FIG. 23A illustrates an application user interface including a four row table.

FIG. 23A illustrates an application user interface 255 including a four row table 2305. The first row 2310 includes column headers 2315 "Personalization Option," "Default Value" and "Override Value." The second 2312, third 2313 and fourth 2314 rows each include three text strings and a data entry field. One of the text fields, "Explain," 2320A–C is used in each of these rows. When delivered as streaming text, HTML based interfaces that include tables, such as illustrated in FIG. 23A are confusing because a user does not know where one row ends and the next begins. In addition, the meaning of text that is repeatedly used, such as "Explain," "Help" or "Buy," is often dependant on the other elements of a row. For example, in FIG. 23A, the first occurrence of Explain, 2320A, is intended to be used for explaining "Accessibility Features," while the second instance of Explain, 2320B, is intended to be used for explaining "Time page held in cache." When the application user interface 255 of FIG. 23A is accessed using a text based display or a streaming text reader these relationships are not clear because there are no visual clues indicating to which row each Explain 2320A–C applies. For example, a listener may not be able to tell if Explain 2320A applies to explaining "Accessibility Features" or "Time page held in cache."

Figure 23B:
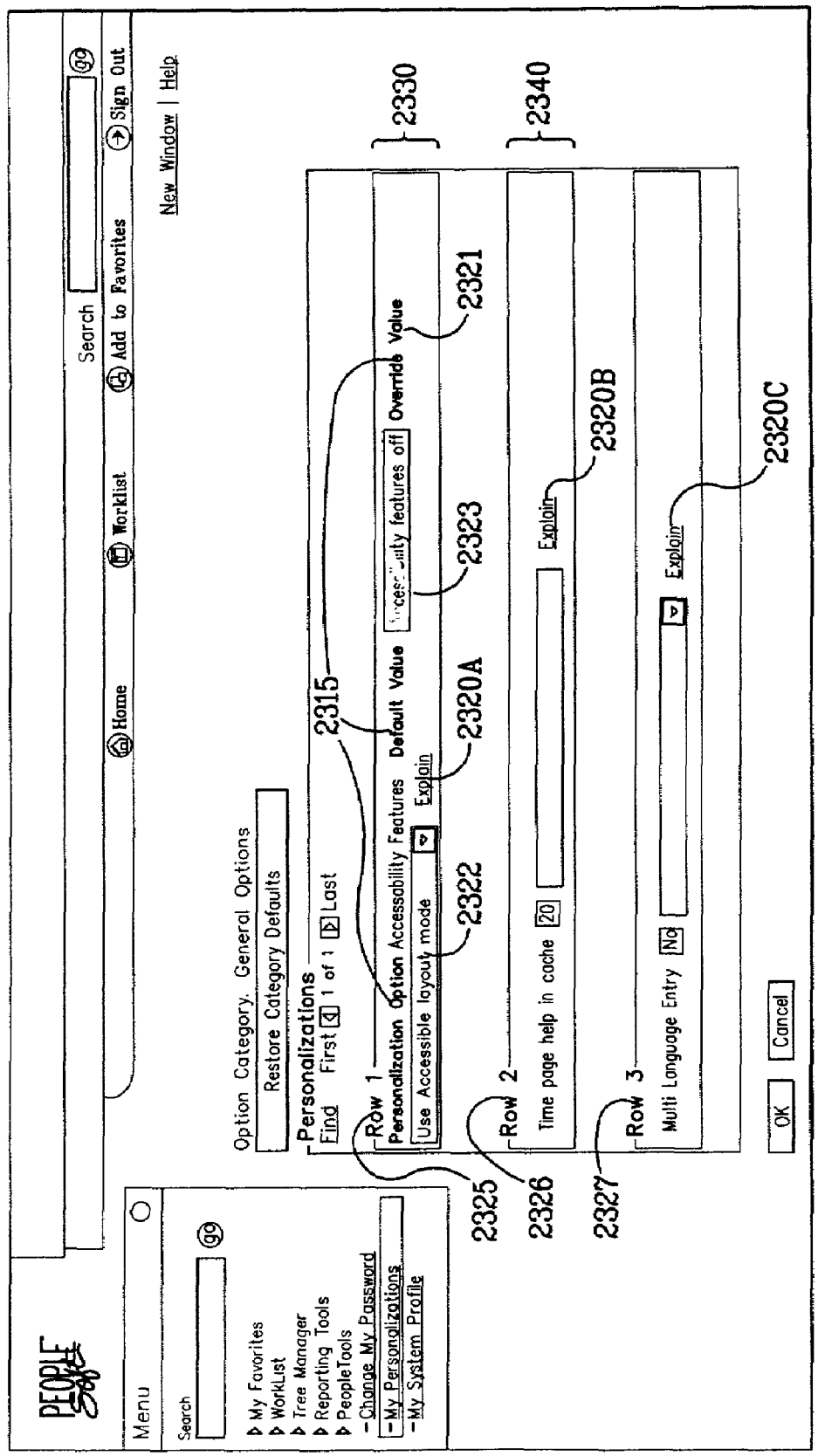
FIG. 23B illustrates the application user interface of FIG. 23A as arranged in an accessible layout mode.

FIG. 23B illustrates the application user interface 255 of FIG. 23A as arranged in an accessible layout mode. In this embodiment, a user has set "Override Value" 2321 to "Use accessible layout mode" 2322, thus overriding the default value of "Accessibility features off" 2323. Additional content has been automatically added by user interface generator 340 (FIG. 3). This content includes row headings "Row 1," "Row 2" and "Row 3," designated 2325, 2326 and 2327 respectively. The added row headings 2325, 2326 and 2327 are intended to indicate, to a user, the beginning of each new row. Therefore, when interpreted as streaming text or by a text reader, the instance of application user interface 255 illustrated in FIG. 23B includes an indication of each user interface element's locations within the original table 2305 as shown in FIG. 23A. For example, the text "Row 1" 2325 will precede the elements within a row 2330. In FIG. 23B these elements are wrapped to form two lines. Likewise, the text "Row 2" 2326 will precede the elements within row 2340. This additional text makes the row with which each element is associated clear. In some embodiments these indications include both a row value, "Row 1" and a column value, "Column 1." User interface generator 340 inserts this additional content while disassembling the original table 2305. The text of these new user interface elements is responsive to the positions of preexisting user interface elements within the original table 2305. For example, row heading 2326 includes the text "Row 2" because the user interface elements that immediately follow were originally in the second row of table 2305 (row 2313 of FIG. 23A) that included content other than column headings. User interface generator 340 uses standard row/column information included in the original table 2305 to determine locations of user interface elements.

In addition to row identifiers, user interface generator 340 may intersperse column headers 2315 of the HTML based interface of FIG. 23A between interface elements in the HTML based interface of FIG. 23B. For example, in row 2330 of FIG. 23B column headers 2315 are placed immediately before interface elements located in each respective column. (e.g. "Default Value" is located just before "Accessibility features off" 2323 and "Override Value" 2321 before "Use accessible layout mode" 2322.) The location of column headings before interface elements helps a user interpret the meaning of each interface element and helps associate user interface elements with specific columns. In other embodiments, column headers are also included in subsequent rows (not shown) of the HTML based interface of FIG. 23B. In tables with more than three rows, insertion of column headers are optionally repeated periodically.

User interface generator 340 optionally automatically inserts other additional content as ALT text in HTML based interfaces. For example, when an interface element is repeated in an instance of application user interface 255 each occurrence of that element optionally includes ALT text indicating the location of the interface element. In the instance of application user interface 255 illustrated in FIG. 23B, each occurrence of the user interface element including a hyperlink and the text "*Explain*" 2320A–2320C, optionally includes row information. In this embodiment a streaming text interpretation of user interface element 2320A would include the phrase "Explain row one" and user interface element 2320B would include the phrase "Explain row two." The added content indicates, to a user, to which row each "Explain" refers. The additional content is inserted by user interface generator 340 based on standard row/column information include in the original table 2305.

Embodiments of accessible layout modes include customization of other aspects of HTML based interfaces. These aspects include increases in user interface element size, changes in text size, and optimized cursor placement (focus) that reduces the effort required for a user to navigate a user interface.

Embodiments of the present invention include customization of error messages, warnings, and confirmation messages. For example, a consistent user may prefer to receive only critical error messages. In contrast another user may prefer to also see hints, warnings and confirmation messages. Configuration system 225 and personalization system 220 are used to select from among various message options that determine the types and importance of messages sent to a user. In one embodiment users can personalize their interaction with the internet application by selecting among several alternative "message levels." These levels include, for example, a "show all messages" option, a "show important messages" option, and a "show only critical messages" option. Referring again to FIG. 10B, an example is illustrated in which a user can select to see confirmation messages when saving data. Only if a save conformation property 1060 is selected, will the user receive a confirmation when data has been saved. In an alternative embodiment, selection of accessible layout mode automatically determines message level, such that fewer messages are shown in accessible layout mode than in standard layout mode. Elimination of non-essential messages is advantageous to disabled users and text only displays because the audio and text forms have limited bandwidth.

The new approach to designing, implementing, and using user interfaces described herein introduces a new model for customization of internet applications and HTML based interfaces in general. This customization is optionally accomplished within an HTML/JavaScript environment and therefore is only dependent on a client having standard browser compatibility. The customization may be independent of browser add-ons, such as plug-ins or downloaded Java applets or ActiveX controls, and also independent of the client-side environment, such as operating system, processing capabilities, or memory, that are beyond what is required to support the standard browser compatibility. The customization includes modification of user interface element functionality and is thus of significant benefit to consistent users. Various embodiments of the present invention include the use of customization in user interfaces used for communication between a user and an internet application.

Several embodiments are specifically illustrated and/or described herein. However, it will be appreciated that modifications and variations are covered by the above teachings and within the scope of the appended claims without departing from the spirit and intended scope thereof. For example, the various computer systems described herein may be implemented as distributed systems; likewise the location of specific data records is optionally varied among a variety of alternative locations. The use of "user interface" or "web page" to describe an HTML based interface is not meant to restrict the interface to distribution over the World Wide Web or any other specific network. Modification or preparation of an HTML based interface with respect to a layout mode is not restricted to application user interface 255 but may apply to HTML based interfaces in general. Adaptation of an HTML based interface to a specific layout mode may occur at the time the interface is first prepared or through later modification and thus may be accomplished by means other than user interface generator 360. Likewise, an "internet" application is not meant to restrict use of the present invention to applications using the Internet or World Wide Web. An internet application includes applications designed to execute over networks, such as intranets, extranets, wide area networks, or the like, that use communication protocols compatible with a standard browser. The "user" interacting with or using aspects of the present invention may be a person, or alternatively may be another computing system or program. Properties selected as being customizable, and later customized, may apply to any aspect of an internet application and are not restricted to those properties of individual user interface elements shown in the various figures. Customization of "Keystrokes" as described herein is optionally extended to include customization of mouse buttons, touch screens, or alternative data entry systems. Likewise, functionality such as tab-over need not be tied to a specific button, key or keystroke combination, such as the "Tab" key. Rather a customizable property may include a response to any user input device. Microsoft Windows®, Microsoft FrontPage®, ActiveX®, Visual Basic®, Microsoft Reader® and Microsoft Internet Explorer® are registered trademarks of Microsoft Corporation. Java® and JavaScript® is a registered trademark of Sun Microsystems, Inc. Tuxedo is a registered trademark of BEA Systems, Inc. WebSphere is a registered trademark of International Business Machines, Corporation. PeopleCode and PeopleSoft are registered trademarks of PeopleSoft, Inc. TextAssist® is a registered trademark of Creative Technology, Ltd. HelpRead is a trademark of the Hawaii Education Literacy Project (HELP).

We claim:

1. A system for generating an HTML based interface, the system comprising:
a data repository configured to store data defining the HTML based interface, the stored data being modifiable by a user of the interface; and
a user interface generator configured to generate the HTML based interface in a selected mode of a first layout mode and a second layout mode and in response to a request from a user, the user interface generator configured to use the stored data to determine the selected mode at substantially the time of the request and generate markup language for the interface in response to the determination, the first layout mode configured for presentation of the HTML based interface as streaming text with elements of the interface being arranged in a first order, the second layout mode configured for presentation of the HTML based interface as a graphical user interface with elements of the interface being arranged in a second order, the ordering of elements in the first and second layout modes being selected for ease of identifying relationships between the elements in the respective layout mode.

2. The system of claim 1, wherein the first order of user interface elements is configured according to a tab-order.

3. The system of claim 1, wherein the first order of user interface elements is configured according to an HTML tag specifying a grouping of user interface elements.

4. The system of claim 1, wherein the user interface generator is further configured to, responsive to the first layout mode, automatically add text to the HTML based interface, the added text to indicate relationships between user interface elements.

5. The system of claim 1, wherein the user interface generator is further configured to, responsive to the first layout mode, automatically add text to the HTML based interface, the added text to indicate a row associated with a user interface element.

6. The system of claim 5, wherein the user interface generator is further configured to add the text based on the position of the user interface element in an HTML table.

7. The system of claim 1, wherein the HTML based interface generated responsive to the first layout mode is input to a text reader configured to convert the generated HTML based interface to an audio output.

8. The system of claim 1, wherein the data repository includes a user customizable value configured to specify the first layout mode or the second layout mode.

9. The system of claim 1, further including a programmable device configured to present the generated HTML based interface to a user.

10. The system of claim 9, wherein the programmable device is a handheld device.

11. The system of claim 9, wherein the programmable device configured to present the generated HTML based interface to a user is a text reader configured to convert the streaming text to audio output.

12. The system of claim 9, wherein the programmable device configured to present the generated HTML based interface to a user is a Braille reader configured to convert the streaming text to Braille.

13. The system of claim 1, further including an application server configured to support the user interface generator.

14. The system of claim 1, wherein the HTML based interface generated responsive to the first layout mode includes first ALT text and the HTML based interface generated responsive to the second layout mode includes second ALT text, the first ALT text being different than the second ALT text.

15. The system of claim 1, wherein the data defining the HTML based interface includes ALT text and the user interface generator is further configured to modify the ALT text to indicate a row associated with a user interface element in the generated HTML based interface.

16. The system of claim 1, further including means for generating the HTML based interface responsive to the first layout mode by converting the generated HTML based interface responsive to the second layout mode.

17. The system of claim 1, wherein the HTML based interface is an application user interface configured to access an internet application.

18. A system for developing an application user interface, the system comprising:
an integrated development environment configured for a developer to specify a first layout mode and a second layout mode for the application user interface, the application user interface being an interface between a user and an internet application generated in response to a request from the user, the first layout mode configured for presentation of the user interface as streaming text with elements of the user interface being arranged in a first order, the second layout mode configured for presentation of the user interface as a graphical user interface with elements of the interface being arranged in a second order, the ordering of elements in the first and second layout modes being selected for ease of identifying relationships between the user interface elements in the respective layout mode;
a data repository including a data record configured to store a value used to determine, at substantially the time of the request, which of the first layout mode or the second layout mode to use when the application user interface is generated in response to the user request, the value being user modifiable; and
an application designer configured to produce metadata for accessing the data record.

19. The system of claim 18, further including an internet application system configured to support the internet application.

20. The system of claim 18, wherein the integrated development environment is further configured for a developer to specify generation of the user interface responsive to the first layout mode or generation of the user interface responsive to the second layout mode, dependant on an identity of the user.

21. A computer program product stored on a computer readable medium for generating a customized user interface in response to an internet request, the computer program product comprising:
computer program code configured to run on an internet application system and operable to provide for generation of an application user interface for presentation in an accessible layout mode or a standard layout mode in response to a request from a user, the accessible layout mode configured for presentation of the user interface as streaming text with elements of the interface being arranged in a first order, the standard layout mode configured for presentation of the user interface as a graphical user interface with elements of the interface being arranged in a second order, the ordering of elements in the first and second layout modes being selected for ease of identifying relationships between the user interface elements in the respective layout mode; and data defining the application user interface, the data for use by a user interface generator to, at substantially the time of the request, access a user modifiable data record to determine which of the accessible layout mode and the standard layout mode to use for presentation of the application user interface and then generate markup language for the interface using the determined layout mode.

22. The computer program product of claim 21, wherein the data further defines a data record to specify presentation of the application user interface in the accessible layout mode or the standard layout mode responsive to an identity of a client.

23. The computer program product of claim 21, wherein the computer program code defines a configuration interface for modifying the user modifiable data record.

24. The computer program product of claim 21, further including means for generating the application user interface.

25. A method of developing data defining an HTML based interface, the method comprising the steps of:

specifying data defining a user interface element for inclusion in the HTML based interface;

specifying data characterizing an accessible layout mode and a standard layout mode for presentation of the HTML based interface, each of the accessible layout and standard layout modes including an order of user interface elements selected for ease of identifying relationships between the user interface elements in the respective layout mode;

specifying data for accessing a user modifiable data record, the user modifiable data record for determining, at substantially the time of a request from the user for the interface, which of the accessible layout mode and standard layout mode to use for presentation of the HTML based interface; and specifying the data defining the HTML based interface such that the markup language for the HTML based interface is generated and the interface is presented using the accessible layout mode or the standard layout mode dependant on the user modifiable data record.

26. The method of claim 25, wherein the accessible layout mode is for presentation of the HTML based interface as streaming text.

27. The method of claim 26, wherein an order of user interface elements in the streaming text is responsive to a tab-order.

28. The method of claim 25, wherein the standard layout mode is for presentation of the HTML based interface as a graphical user interface.

29. The method of claim 25, wherein the step of specifying the data defining the HTML based interface includes specifying ALT text for inclusion in the HTML based interface based on the accessible layout mode or the standard layout mode.

30. The method of claim 25, wherein the HTML based interface is for presentation to a user.

31. A method for generating an HTML-based interface, the method comprising:

accessing a page definition stored in a data repository in response to a request from a user;

determining a layout mode for the HTML based interface, the layout mode being one of an accessible layout mode or a standard layout mode and including an order of user interface elements selected for ease of identifying relationships between the user interface elements in the respective layout mode;

generating, at substantially the time of the request, HTML responsive to the determined layout mode and the page definition; and including the HTML in the HTML based interface.

32. The method of claim 31, wherein the accessible layout mode is for presentation of the HTML based interface as streaming text and the standard layout mode is for presentation of the HTML based interface as a graphical user interface.

33. The method of claim 32, further including determining an order of user interface elements within the HTML based interface, when generated responsive to the accessible layout mode, using an HTML tag which specifies a grouping of user interface elements.

34. The method of claim 32, wherein the HTML based interface, when generated responsive to the accessible layout mode, includes an order of user interface elements, the order being responsive to a position of a user interface element within an HTML table.

35. The method of claim 32, wherein the HTML based interface for presenting as streaming text is presented to a text reader for conversion to audio output.

36. The method of claim 31 further including determining the order of user interface elements using a tab-order.

37. The method of claim 36, further including user customization of the tab-order.

38. The method of claim 31, further including automatically adding text to the HTML responsive to the accessible layout mode, the added text to indicate relationships between user interface elements.

39. The method of claim 31, further including automatically adding text to the HTML responsive to the accessible layout mode, the added text to indicate a row associated with a user interface element.

40. The method of claim 39, wherein automatically adding text to the HTML is further responsive to the position of the user interface element in an HTML table.

41. The method of claim 31, further including customizing data within the data repository, the customized data for use in determining a layout mode for the HTML based interface.

42. The method of claim 31, further including presenting the HTML based interface to a programmable device for displaying the HTML based interface to a user.

43. The method of claim 42, wherein the accessible layout mode is for presentation of the HTML based interface as streaming text and the programmable device is a handheld device.

44. The method of claim 42, wherein the programmable device includes a text reader for converting streaming text to an audio output.

45. The method of claim 42, wherein the programmable device includes a Braille reader for converting streaming text to Braille.

46. The method of claim 31, wherein accessing the page definition includes reading ALT text for addition to the HTML, and modifying the ALT text to indicate an association of a user interface element with a row.

47. The method of claim 31, further including converting the HTML based interface from the standard layout mode to the accessible layout mode.

48. The method of claim 31, wherein the HTML based interface is an application user interface for accessing an internet application.

49. A method of customizing the presentation of an HTML based interface, the method comprising the steps of:
- accessing a configuration system;
- selecting, using the configuration system, a layout mode from a plurality of layout modes, the plurality of layout modes including an accessible layout mode and a standard layout mode, the selected layout mode being used to present the HTML based interface using an order of user interface elements selected for ease of identifying relationships between the user interface elements in the selected layout mode; and
- specifying configuration data using the configuration system, the configuration data characterizing the selected layout mode,
- wherein the selected layout mode is operable to be determined in response to a request from a user, and the selected layout mode and configuration data are operable to be used to generate markup language for the interface in response to the request.

50. The method of claim 49, further including a step of presenting the HTML based interface responsive to the selected layout mode, wherein the selected layout mode is the accessible layout mode for presentation of the HTML based interfaces as streaming text.

51. The method of claim 50, further including a step of converting the streaming text to an audio output.

52. The method of claim 49, further including a step of presenting the HTML based interface responsive to the selected layout mode, wherein the selected layout mode is the standard layout mode for presentation of the HTML based interface as a graphical user interface.

53. The method of claim 49, wherein the HTML based interface is an application user interface.

54. A computer readable medium including an internet application, the internet application comprising:
- data defining an application user interface including a plurality of layout modes, the application user interface configured for delivery to a client and configured to operate as an interface between a user and the internet application, the plurality of layout modes including layout modes resulting in different orders of user interface elements when the application user interface is generated, the different orders selected for ease of identifying relationships between the user interface elements in the respective layout modes; and
- a user interface generator configured to generate, in response to a user request for the interface, markup language for the application user interface using one of the plurality of layout modes, the user interface generator being further configured to select the one of the plurality of layout modes at substantially the time of the request using a user modifiable data record.

55. An application execution system comprising:
- means for supporting an internet application;
- means for generating markup language for an application user interface in response to a request from a user using a user modifiable data record configured to store data characterizing a layout mode, the layout mode being one of a plurality of layout modes resulting in different orders of user interface elements when used to generate the application user interface, the orders of user interface elements for each layout mode being selected for ease of interpretation of the user interface elements in the respective layout mode; and
- means for presenting the application user interface to a user.

56. A method for generating an HTML based interface, the method comprising:
- defining a standard layout mode and an accessible layout mode for presentation of the HTML based interface, the standard layout mode for presentation of the HTML based interface as a graphical user interface and including an HTML table of user interface elements, the accessible layout mode being for presentation of the HTML based interface as streaming text or audio and including means for identifying, to a user, relationships between the user interface elements;
- generating metadata characterizing the HTML based interface;
- storing the metadata in a data repository;
- associating the standard layout mode and the accessible layout mode with a user modifiable data record;
- receiving a request for the HTML based interface from a user;
- reading the metadata from the data repository in response to the user request;
- using the metadata to read a value from the data record, the value specifying presentation of the HTML based interface in the standard layout mode or the accessible layout mode;
- generating, at substantially the time of the request, HTML responsive to the specified layout mode and the metadata; and
- including the HTML in the HTML based interface.

* * * * *